United States Patent [19]
Sato et al.

[11] Patent Number: 5,819,202
[45] Date of Patent: Oct. 6, 1998

[54] APPARATUS FOR DETECTING AN ABNORMALITY OF A CONTROL SYSTEM

[75] Inventors: Tomonori Sato; Takashi Iwasaki, both of Hyogo, Japan

[73] Assignee: Mitsubishi Denki Kabushiki Kaisha, Tokyo, Japan

[21] Appl. No.: 850,865

[22] Filed: May 2, 1997

Related U.S. Application Data

[63] Continuation of Ser. No. 540,097, Oct. 6, 1995, abandoned.

[30] Foreign Application Priority Data

Jun. 14, 1995 [JP] Japan ................................ 7-147800

[51] Int. Cl.⁶ .................................................. G05B 23/02
[52] U.S. Cl. .................. 702/33; 364/528.1; 364/474.19; 364/474.26; 408/10; 408/17
[58] Field of Search ..................................... 364/184–187, 364/551.01, 551.02, 474.26, 474.2, 474.35, 474.17, 474.19, 474.02, 505, 506, 550, 146, 474.12; 408/17, 10, 11; 388/903, 907.5, 909, 923, 937; 318/568.1, 568.13, 560, 561, 570, 565–567, 574, 575, 563, 569; 82/1.11, 1.2–1.5, 134, 901, 904, 905; 219/69.16, 69.13, 69.17, 69.19, 69.2

[56] References Cited

U.S. PATENT DOCUMENTS

| | | | |
|---|---|---|---|
| 4,123,188 | 10/1978 | Deremo et al. | 408/17 |
| 4,362,444 | 12/1982 | Watkins | 408/17 |
| 4,656,868 | 4/1987 | Azuma et al. | 408/11 |

(List continued on next page.)

FOREIGN PATENT DOCUMENTS

| | | |
|---|---|---|
| 59-232749 | 12/1984 | Japan . |
| 61-16581 | 5/1986 | Japan . |
| 5-54131 | 8/1993 | Japan . |
| 6-8111 | 1/1994 | Japan . |
| 6-155246 | 6/1994 | Japan . |
| 6-170697 | 6/1994 | Japan . |
| 6-59595 | 8/1994 | Japan . |

OTHER PUBLICATIONS

Holtz, Speed Estimation and Sensorless Control of AC Privers, Mar. 1993 IEEE, pp. 649–654.

Instruction Manual of 300/300–V Series (Mitsubishi Denki, Inc.), describing the Mitsubishi Numerical Control Apparatus MELDAS (No Translation) (No date with month).

Instruction Manual of 320L (Mitsubishi Denki, Inc.), describing the Mitsubishi Numerical Control Apparatus MELDAS (No Translation) (No date with month).

Itoh and Moriwaki, *Kosaku Kikai Kogaku*, Coronoa–sha, pp. 105–106 (No Translation) (No date).

Nippon Robot Gakkai–shi, *Journal of the Robotics Society of Japan*, vol. 11, No. 4 (1993), p. 488 (No Translation) (No date with month).

"Realization of an Acceleration Controller by a Disturbance Observer", *Journal of the Robotics Society of Japan*, vol. 11, No. 4, pp. 486–493., May 1993, Relevant Portions Only Translated.

*Primary Examiner*—Emanuel Todd Voeltz
*Assistant Examiner*—Hal D. Wachsman
*Attorney, Agent, or Firm*—Burns, Doane, Swecker & Mathis, LLP

[57] ABSTRACT

In an apparatus for detecting an abnormality of a control system, the internal property calculating section thereof calculates an internal property of the control system only on the basis of a command value representing a position or a speed of the control system, and the abnormality judging section judges the existence of abnormalities of the control system on the basis of an internal property calculated by the internal property calculating section and an actual internal property of the control system. Consequently, the apparatus can precisely detect abnormalities without being influenced by an observed noise or an operational error.

11 Claims, 44 Drawing Sheets

U.S. PATENT DOCUMENTS

| | | | |
|---|---|---|---|
| 4,835,671 | 5/1989 | Sato et al. | 364/186 |
| 5,077,507 | 12/1991 | Mitani et al. | 364/184 |
| 5,079,489 | 1/1992 | Ishii | 318/560 |
| 5,089,984 | 2/1992 | Struger et al. | 364/185 |
| 5,113,728 | 5/1992 | Medeksza | 82/1.11 |
| 5,142,210 | 8/1992 | Kojima et al. | 318/566 |
| 5,274,546 | 12/1993 | Kinoshita | 364/186 |
| 5,313,403 | 5/1994 | Fujita et al. | 364/474.26 |
| 5,349,337 | 9/1994 | McCormick | 408/17 |
| 5,479,354 | 12/1995 | Husslein | 364/146 |
| 5,513,113 | 4/1996 | Ohada et al. | 364/474.35 |
| 5,583,409 | 12/1996 | Kurakake et al. | 364/474.26 |

CHARACTERISTIC QUANTITY OF INTERNAL PROPERTY OF MAIN SHAFT DRIVE SYSTEM

CHARACTERISTIC QUANTITY OF INTERNAL PROPERTY OF MAIN SHAFT DRIVE SYSTEM

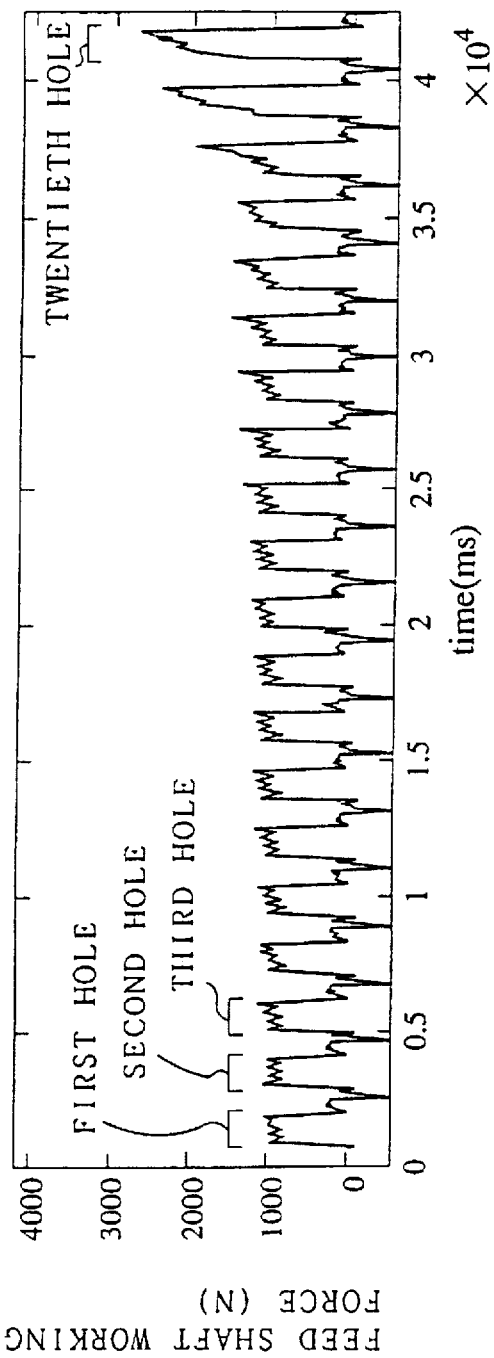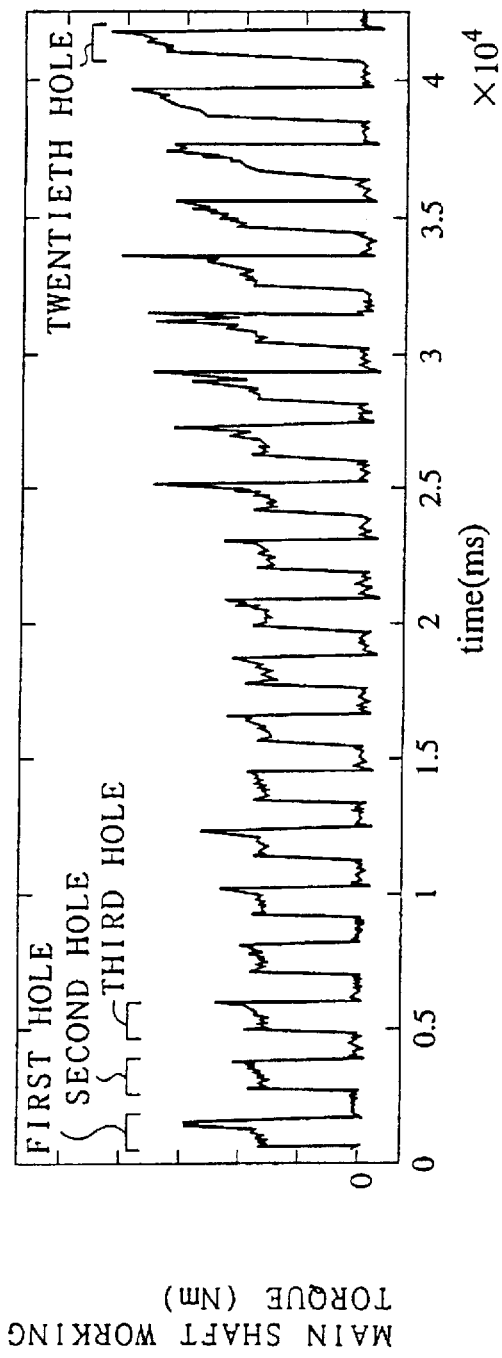

FIG. 60
(PRIOR ART)
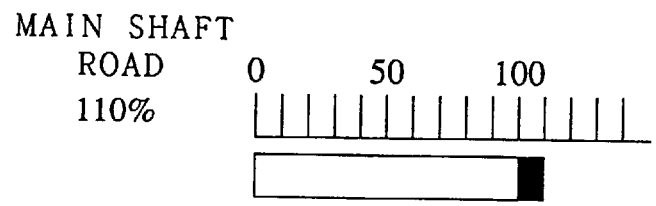
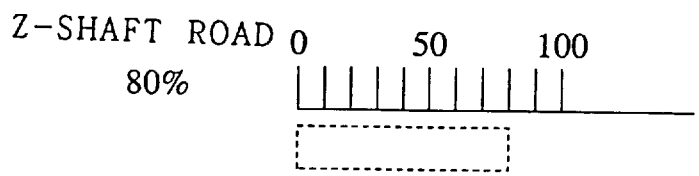
FIG. 61
(PRIOR ART)
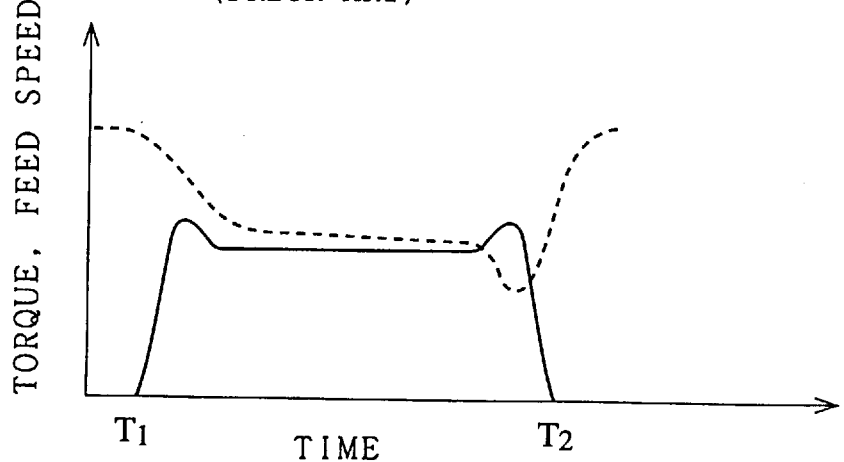

APPARATUS FOR DETECTING AN ABNORMALITY OF A CONTROL SYSTEM

This application is a continuation of application Ser. No. 08/540,097, filed Oct. 6, 1995, now abandoned.

BACKGROUND OF THE INVENTION

1. Field of the Invention

This invention relates to an apparatus for detecting an abnormality of a control system such as a machine tool, a robot and an elevator having a drive and mechanism section for executing driving operation and a control section for controlling the operation of the drive and mechanism section.

2. Description of the Prior Art

FIG. 45 is the block diagram of a first prior art apparatus for detecting an abnormality of a control system disclosed in Nippon Robot Gakkai-shi (Journal of the Robotics Society of Japan), vol. 11, No. 4 (1993), p.488. In the figure, reference numeral 11 denotes a machine tool as a control system having a drive and mechanism section for executing the driving operation of a lathe, a drilling machine, or the like and a control section for controlling the operation of the drive and mechanism section; reference numeral 12 denotes a signal representing a command value for commanding a position or a speed of the machine tool 11, which signal 12 is inputted into the control section of the machine tool 11 by an inputting device not shown. Reference numeral 13 denotes a disturbance such as the breakage of a bit, which disturbance is applied to the machine tool 11; reference numeral 14 denotes noise such as a radio wave getting into the machine tool 11 to be observed; reference numeral 41 denotes a subtracter for subtracting a signal 45 representing a position or a speed of the actual operation of the machine tool 11 from the signal 12; reference numeral 43 denotes a drive and mechanism section for executing driving operation; reference numeral 42 denotes a control section for controlling the operation of the drive and mechanism section 43; reference numeral 44 denotes an actual working operation section such as an electric circuit, a sensor, an element such as a transducer which is apt to be influenced by noise, or a bite; and reference numeral 45 denotes a signal representing a position or a speed of the working operation of the working operation section 45, which signal 45 is detected by a detector not shown to be fed back to the subtracter 41. Reference numeral 15 denotes a signal representing an actual internal property such as a working position, a working speed, the torque or a working force of the machine tool 11; reference numeral 451 denotes a disturbance observer for obtaining an estimate of a disturbance on the basis of the signal 45; reference numeral 452 denotes an inverted model of the drive and mechanism section 43; reference numeral 453 denotes a subtracter for calculating the difference between the signal 15 and an output signal of the inverted model 452 to obtain the signal 454 representing an estimate of a disturbance; and reference numeral 18 denotes an abnormality judging section for judging the existence of an abnormality in the operation of the machine tool 11 on the basis of the signal 454.

In operation, the control section 42 of the machine tool 11 generates the signal 15 representing the quantity of an actual internal state on the basis of the difference between the signal 12 and the signal 45, which difference is obtained by the subtracter 41. The drive and mechanism section 43 executes a working operation in conformity with the signal 15. The state of the operation of the machine tool 11 is observed as the signal 45 representing a position or a speed of the working operation, which signal 45 includes the noise 14; the signal 45 is fed back to the control section 42 through the subtracter 41. On the other hand, the signal 45 is inputted into the inverted model 452 of the drive and mechanism section 43, and then the inverted model 452 outputs a signal corresponding to the signal 15 representing the quantity of the internal state at which quantity the signal 45 including the noise 14 is to be outputted. Thus, the signal 454 representing an estimate of a disturbance is obtained from the difference between the corresponding signal and the original signal 15 by means of the subtracter 453. In some cases, a low-pass filter not shown is applied to the signal 454. In those cases, the low-pass filter is included in the disturbance observer 451 to be referred to as a disturbance observer as a whole. The abnormality judging section 18 judges abnormalities on the basis of the signal 454.

FIG. 46 is a block diagram showing a second prior art apparatus for detecting an abnormality of a control system disclosed in Japanese Published Unexamined Patent Application No. 232749/84 (Tokkai-Sho 59-232749). In the figure, reference numeral 461 denotes a motor; reference numeral 462 denotes a torque detector; reference numeral 463 denotes a belt; reference numerals 464 and 465 each denote a pulley; reference numeral 466 denotes a speed reduction ratio display unit; reference numeral 467 denotes a chuck of a bit 468; reference numeral 469 denotes a work piece; reference numeral 470 denotes a bit's cutting torque (main shaft working torque) conversion unit; reference numeral 471 denotes an idling torque elimination unit; reference numeral 472 denotes a high-pass filter; reference numeral 473 denotes a peak value detector; reference numeral 474 denotes an optimum cutting torque calculating unit; reference numeral 475 denotes a first evaluation unit; reference numeral 476 denotes a second evaluation unit; reference numeral 477 denotes a bit strength calculating unit; reference numeral 478 denotes a third evaluation unit; reference numeral 479 denotes a bit feed control unit; and reference numeral 480 denotes a low-pass filter.

In operation, the torque of the motor 461 is transmitted to the chuck 467 through the pulley 464, the belt 463 and the pulley 465, and the bit 468 held by the chuck 467 works the work piece 469. The torque $\tau_m$ of the motor 461 is detected by the torque detector 462. The speed reduction ratio is detected by the speed reduction ratio display unit 466. The cutting torque conversion unit 470 converts the torque $\tau_m$ of the motor 461 into the torque $\tau_s$ of the bit 468 by multiplying the torque $\tau_m$ by the speed reduction ratio. The idling torque elimination unit 471 obtains the true cutting torque by subtracting the idling torque $\tau_o$ measured just before the working from the torque $\tau_s$ to output the true cutting torque. The magnitude of the vibration components of the true cutting torque is detected by means of the high-pass filter 472 and the peak value detector 473, and abnormalities closely connected to the vibration such as chip packing are detected by the first evaluation unit 475. And, low frequency components of the true cutting torque are detected by the low-pass filter 480, and abnormalities closely connected to the low frequency components such as the wear of the bit 468 are detected by the second evaluation unit 476. The threshold value of comparison in the first evaluation unit 475 is calculated by the optimum cutting torque calculating unit 474, and the threshold value of comparison in the second evaluation unit 476 is substituted by a value of the threshold value to the high frequency components multiplied by some ratio. In addition, the magnitude of the true cutting torque is evaluated by the third evaluation unit 478 as it is without filtering to detect abnormalities closely connected to the magnitude as it is such as the breakage of the bit 468. The threshold value of comparison in the third evaluation unit 478 is calculated by the bit strength calculating unit 477. Abnormalities thus detected are shown on a display unit which is not shown in the figure.

The judging method of abnormalities in the present prior art is, in short, one which compares several kinds of detection quantities such as torque (e.g. main shaft working torque) and thrust (e.g. feed shaft working force) with respective threshold values (or prescribed values set in advance) for displaying in the case of detection of abnormalities at each case corresponding to each detected quantity. That is to say, this method can be illustrated as shown in FIG. 47. FIG. 47 is a region diagram showing abnormal regions in case of two detection quantities. The detection quantity 1 is compared to the threshold value 1; the detection quantity 2 is compared to the threshold value 2. Abnormalities are judged by combining each result of judgement (4 ways). In other words, the prior art apparatus judges abnormalities by comparing each detection quantity with each threshold value independently and by operating the logical AND or the logical OR of the results of each comparison. Therefore, if an abnormal state occurs in a nonlinear (namely, not independent from each detection quantity) complex region, the prior art apparatus is likely to misjudge the abnormal state because it cannot judge the state correctly.

The above problem will be described with reference to some experimental data. FIG. 48(1) and FIG. 48(2) are waveform diagrams showing experimental data of drill workings of drilling a hole having the same size continuously twenty times under the same working conditions with a new bit. FIG. 48(1) shows a waveform of the feed shaft working force; FIG. 48(2) shows a waveform of the main shaft working torque. In this experiment, the bit was broken during the working of the twentieth hole. The maximum values of the main shaft working torque and the feed shaft working force in regard to each hole are shown in FIG. 49. The horizontal axis of FIG. 49 indicates the main shaft working torque and the vertical axis thereof indicates the feed shaft working force. FIG. 49 shows the data obtained by repeating the experiment illustrated in FIG. 48(1) and FIG. 48(2) four times (the bits used in the experiments are of course exchanged to new ones in each experiment). In FIG. 49, symbol ○ denotes a datum at the beginning of working; symbol + denotes a datum at a stably working time; symbol x denotes a datum at a time just before breakage; and symbol * denotes a datum at the time of breakage. Each region corresponding to each group of data is enclosed by an ellipse, provided that data x and data * are collected into one group. Each region enclosed by an ellipse is denoted by initial region 491, stable working region 492 and just before breakage region 493 severally. If the method of the present prior art is applied to the data, it is clear that abnormalities cannot be distinguished from normal states by a straight line perpendicular to the axis of the main shaft working torque because the ranges of each region overlap each other as to the main shaft working torque. On the other hand, from the view point of the feed shaft working force, since there is no overlap between the just before breakage region 493 and the stable working region 492, both regions can be separated by a straight line perpendicular to the axis of the feed shaft working force such as the line referred to as the threshold 2. However, since the stable working region 492 and the initial region 491 overlap each other, both regions cannot be separated by a straight line perpendicular to the axis of the feed shaft working force. Since the difference between the maximum value of the feed shaft working force in the just before breakage region 493 and the minimum value of the feed shaft working force in the stable working region 492 is small even between the just before breakage region 493 and the stable working region 492, there is some possibility of misjudging only if a small measurement error is included. For example, since the datum $P_1$ and the datum $P_2$ exist near to the threshold 2, there is every possibility of misjudging. To sum up the above description, there are cases such that various states cannot be distinguished from each other by comparing in regard to each axis or that there are every possibility of misjudging caused by a small measurement error even if the distinction can be possible. In those cases, the present prior art cannot be applied for the judgement of abnormalities.

FIG. 50 is a block diagram of a third prior art apparatus for detecting an abnormality of a control system disclosed in Japanese Published Unexamined Patent Application No. 8111/94 (Tokkai-Hei 6-8111). In the figure, reference numeral 501 denotes a bit; reference numeral 502 denotes a main shaft; reference numeral 503 denotes a main shaft motor; reference numeral 504 denotes a control unit; reference numeral 505 denotes a torque (main shaft working torque) detector; reference numeral 506 denotes a thrust (feed shaft working force) detector; reference numeral 507 denotes a vibration detector; reference numeral 508 denotes a fast Fourier transformer (FFT); reference numeral 509 denotes filters; and reference numeral 510 denotes a composite analysis processing unit.

In operation, the control unit 504 drives the main shaft motor 503 to rotate the main shaft 502 holding the bit 501, and at the same time drives a motor for the feed shaft (on the z-axis) to move the motor 503 in the feed shaft direction. The composite analysis processing unit 510 judges abnormalities on the basis of a torque signal t, a thrust signal s and a vibration signal v detected by the torque detector 505, the thrust detector 506 and the vibration detector 507 respectively. The method of the judgement of the composite analysis processing unit 510 is shown in the following TABLE 1.

| SITUATION OF PROCESSING DATA | | | RESULT OF COMPOSITE |
|---|---|---|---|
| TORQUE | THRUST | VIBRATION | JUDGEMENT |
| varied | varied | varied | breakage of bit tip |
| varied | varied | stable | progressing of wear of bit tip |
| varied | stable | varied | processing of chipping of cutting blade |
| varied | stable | stable | chip packing, failure of lubrication |
| stable | varied | varied | chisel welding or breakage |
| stable | varied | stable | chisel welding |
| stable | stable | varied | chip packing, occurrence of chipping |
| stable | stable | stable | normal |

As shown in TABLE 1, the method is to judge whether each situation is stable or varied by comparing the three elements of torque, thrust and vibration to respective threshold values (prescribed values set in advance). The cases of the combinations of the three elements, which are stable or varied, become two cubed or eight ways; then the composite analysis processing unit 510 judges abnormality or normality corresponding to each of the eight cases in conformity with each combination of the three elements in the eight cases. For example, the wear of a tool is judged on whether torque and thrust exceed each threshold value or not.

The judging method shown in TABLE 1 is also one to detect abnormalities by classifying the results of the comparison of some kinds of detection quantities such as torque and thrust to each threshold value. In other words, it judges abnormalities by comparing each detection quantity independently to each threshold value and by operating the logical AND or the logical OR of the results of each comparison. Therefore, if an abnormal state is occurred in a nonlinear (namely, not independent from each detection quantity) complex region, the prior art apparatus is likely to misjudge the abnormal state because it cannot judge the state correctly.

FIG. 51 is a block diagram showing the operation of a fourth prior art apparatus for detecting an abnormality of a control system disclosed in Japanese Patent Publication No. 59595/94 (Tokko-Hei 6-59595). The operation thereof will be described with reference to the flowchart. At first, data (of torque (main shaft working torque) and thrust (feed shaft working force)) are taken in the apparatus at step ST511. At step ST512, the torque and the thrust, taken in, is multiplied by correction coefficients to be indicated by a pattern $P_T$ and pattern $P_S$, respectively. At step ST513, the subtraction of the pattern $P_S$ from the pattern $P_T$ is calculated to be used at step ST514. At steps ST514 through ST517, the pattern $P_T$ and the pattern $P_S$ are compared to one of three reference patterns for discrimination or a combination of them to judge abnormalities corresponding to each comparison. The reference patterns for discrimination, or the threshold values for the comparison, are prepared by obtaining patterns at normal conditions at first, and then by deforming a part of the patterns at normal conditions. FIG. 52 shows some of the waveforms of the reference patterns. In FIG. 52, both of the rotation loads (or main shaft working torque) and the feed shaft loads (or feed shaft working force) show patterns the values of which become larger at points of time or thereabouts passing the middle points on time axes; the enlarging corresponds to abnormalities such as chip packing and the seizure of a bit.

FIG. 53 is a block diagram showing a fifth prior art apparatus for detecting an abnormality of a control system disclosed in Japanese Patent Publication No. 54131/93 (Tokko-Hei 5-54131). In the figure, reference numerals 541 denotes a main shaft motor; reference numerals 542 through 54n denote feed shaft motors; reference numeral 531 denotes a current detector; reference numeral 532 denotes an analogue-to-digital converter; reference numeral 533 denotes a load factor computing unit; reference numeral 534 denotes a switching unit; reference numeral 535 denotes a model working state memory; reference numeral 536 denotes a display control section; reference numeral 5361 denotes a CRT display unit; reference numeral 5371 denotes a keyboard; reference numeral 537 denotes a memory for observing zones and limiting values; reference numeral 538 denotes a comparator; and reference numeral 5381 denotes a warning unit.

In operation, the current flowing in the main shaft motor 541 and the feed shaft motors 542–54n is detected by the current detector 531 to be converted into digital signals by the analogue-to-digital convertor 532; then they are converted into ratios to a rated current value (or load factors) by the load factor computing unit 533. Successively, by the switching unit 534, the waveforms of the load factors are stored in the model working state memory 535 in case of model working. The display control section 536 displays the load factor waveforms stored in the model working state memory 535 on the CRT display unit 5361. Looking at the load factor waveforms, an operator moves the cursor with the keyboard 5371 to set observing zones and limiting values of the waveforms. When working is actually done, the display control section 536 displays load factor waveforms under working together with the load factor waveforms stored in the model working state memory 536, and the comparator 538 judges abnormalities by comparing the load factors under working with the limiting values.

FIG. 54 is a waveform diagram for the illustration of the principle of the abnormality judgement of a sixth prior art apparatus for detecting an abnormality of a control system disclosed in Japanese Patent Publication 16581/86 (Tokko-Sho 61-16581). In the figure, reference character $I_R$ denotes a variation curve of the main shaft motor current at the time of test cutting; reference numeral $I_D$ denotes an allowable value curve to be used as a threshold value of the abnormality judgement of the current; both of them are functions of time.

In operation, the allowable value curve $I_D$ at each time is obtained on the basis of the variation curve $I_R$ at each time measured at the time of test cutting. The obtained allowable value curve $I_D$ is memorized in a memorizing device. The allowable value curve $I_D$ has values obtained by adding a constant to the values of the variation curve $I_R$ or by multiplying them by a constant, for example. During actual working, the values of the allowable value curve $I_D$ at each time are read from the memorizing device in order to judge abnormalities by comparing them to the values of the main shaft motor current under working. The present prior art apparatus employs a system to change the reference time of judgement with a keyboard by an operator.

FIG. 55 is a waveform diagram for the illustration of the principle of the abnormality judgement of a seventh prior art apparatus for detecting an abnormality of a control system disclosed in Japanese Published Unexamined Patent Application No. 170697/94 (Tokkai-Hei 6-170697). FIG. 55 shows a variation of the load current of a motor at the time of perforating. In the figure, reference numeral 551 denotes the waveform of the load current in a normal operation; reference numeral 552 denotes a waveform of the load current at the time of the occurrence of chip packing. Reference character $z_0$ denotes a rest position before the beginning of the perforation; reference character $z_{01}$ denotes a position when the tip of a bit touches the surface of a work piece; reference character $z_1$ denotes a position when the tip of the bit gets into the work piece and the end of the periphery of the bit is positioned on the surface of the work piece; reference character $z_2$ denotes a position when the end of the periphery perforated by the predetermined depth $h_1$ from the surface of the work piece; and reference character $z_3$ denotes a position where the end of the periphery of the bit reaches to the deepest position. Reference numeral $I_0$ denotes a predetermined threshold value of the load current.

In operation, the threshold value of the load current $I_0$ is set to a value obtained by multiplying an average value of the load current of the range from the position $z_1$ to the position $z_2$ by a constant such as 1.1. The length from the position $z_1$ to the position $z_2$, or the depth $h_1$, is presumed as a length during which chips of drilling are not packed, and is taken as a length of, for example, about the diameter of the bit. The prior art apparatus judges abnormalities by comparing the load current to the threshold value $I_0$ while the working of the work piece is continued.

FIG. 56 is an operation route map for the illustration of the operation of an eighth prior art apparatus for detecting an abnormality of a control system disclosed in the instructions for programming in the instruction manual of 300/300-V series (Mitsubishi Denki, Inc.) of Mitsubishi Numerical Control Apparatus MELDAS (Registered Trade Mark). In the figure, reference numeral 262 denotes a tool such as a bit; reference numeral 341 denotes an initial point, the setting position of the tool 262, above the beginning position of working; reference numeral 342 denotes R-point, a position right below the initial point 341 and very close to the work piece; and reference numeral 326 denotes a target hole depth position in the work piece. In addition wavy lines denote the fast-forwarding of the tool 262; and a notched line denotes a feed while cutting.

The operation of the apparatus is executed in the order of the numerals enclosed with square brackets "[" and "]". At first, the tool 262 is positioned to the initial point 341 distant from the work piece by a distance $r_1$ by being fast-forwarded along the route [1]. Next, the tool 262 is descended up to the R-point 342 by being fast-forwarded along the route [2] to begin the working of the work piece. Then, the work piece is worked by being fed while being cutting along the route [3]. When the working reaches to the target hole depth position 326 at the depth $z_b$, the tool 262 is returned to the initial point 341 (in case of G98 mode) or the R-point 342 (in case of G99 mode) by being fast-forwarded along the routes [4].

FIG. 57 is an operation route map for the illustration of the operation of a ninth prior art apparatus for detecting an abnormality of a control system disclosed in the instructions for programming in the above described instruction manual of 300/300-V series (Mitsubishi Denki, Inc.) of Mitsubishi Numerical Control Apparatus MELDAS. In the figure, reference character $q_1$ denotes a cutting quantity at each working of the tool 262 to the work piece; reference character m denotes a clearance quantity of the tool 262. The clearance quantity m is a quantity to be appointed for beginning a feed while cutting from a little shallower position than the position cut last time. Since the other reference characters are the same as those of FIG. 56, the description of them is omitted.

The operation of the apparatus is executed in the order of the numerals enclosed with square brackets "[" and "]". Different from the prior art apparatus shown in FIG. 56, the tool 262 repeats the movements of advancing by the cutting quantity of $q_1$+m (or $q_1$ for only the first time) by being fed while cutting and returning by the clearance quantity m by fast-forwarding, and finally reaches to the target hole depth position 326.

FIG. 58 is an operation route map for the illustration of the operation of a tenth prior art apparatus for detecting an abnormality of a control system disclosed in the instructions for programming in the above described instruction manual of 300/300-V series (Mitsubishi Denki, Inc.) of Mitsubishi Numerical Control Apparatus MELDAS. Since the reference characters are the same as those of FIG. 57, the description of them is omitted. The tool 262 repeats the movements of advancing by the cutting quantity of $q_1$+m (or $q_1$ from the R-point 342 for only the first time) from a shallower position by the clearance quantity m than the position cut last time by the clearance quantity m by being fed while cutting, and returning to the R-point 342 by fast-forwarding once, and further advancing to the position shallower by the clearance quantity m than the position cut last time by fast-forwarding, and finally reaches to the target hole depth position 326.

FIG. 59 is an operation route map for the illustration of the operation of an eleventh prior art apparatus for detecting an abnormality of a control system disclosed in Japanese Published Unexamined Patent Applications No. 170697/95 (Tokkai-Hei 6-170697) and No. 155246/95 (Tokkai-Hei 6-155246). In the figure, reference character $z_c$ denotes the depth at the point of time when chip packing is detected; reference numeral 591 denotes the position at that time. Since the other reference characters are the same as those of FIG. 56, the description of them is omitted. The tool 262 discontinues the working of the work piece at the position 591 where chip packing is detected for the time being, and returns to the R-point 342 or the initial point 341 by fast-forwarding. After having returned to the R-point 342 or the initial point 341, the tool 262 re-executes the same working. If chip packing is detected again before the tool 262 reaches to the target hole depth position 326 after it re-executed the same working, the tool 262 discontinues the working and returns to the R-point 342 or the initial point 341 to re-execute the same working on all such occasions.

FIG. 60 is an explanatory view showing the display section of a twelfth prior art apparatus for detecting an abnormality of a control system disclosed in the instruction manual of 320L (Mitsubishi Denki, Inc.) of the above described Mitsubishi Numerical Control apparatus MELDAS. The display section displays bar graphs of a main shaft load and a feed shaft road. The bar graph of the main shaft load shows the present value of the main shaft road; the bar graph of the feed shaft road shows the present value of the feed shaft road. An operator of the prior art apparatus tries to judge the abnormalities thereof on the basis of the displayed values of the main shaft load and the feed shaft road, but it is hard to recognize the combination of the main shaft load and the feed shaft load visually because they are displayed as bar graphs. Consequently, the operator is apt to recognize only each magnitude of the main shaft load and the feed shaft load independently.

FIG. 61 is a waveform diagram showing the operation of thirteenth prior art apparatus for detecting an abnormality of a control system disclosed in Itoh and Moriwaki, "Kosaku Kikai Kogaku", Corona-sha, pp. 105–106. In the figure, the full line denotes torque (main shaft working torque); the broken line denotes a feed speed. In operation, the prior art apparatus controls the feed speed so that the torque takes a predetermined value from the beginning time of cutting (the point of time $T_1$) to the ending time of cutting (the point of time $T_2$).

Since the prior art apparatus for detecting an abnormality of a control system are constructed as described above, they have the following problems.

That is to say, the first prior art apparatus has the following problems.

In the first place, since a disturbance is estimated by using the signal 45, an observed quantity, the disturbance is not estimated accurately because the components of observed noise, if they are included in the signal 45, are included in the estimate of the disturbance. Generally, an observed quantity includes some electrical noise always. Besides, quantization errors are always included in digital measuring apparatus and converters such as encoders and analogue-to-digital converters, and it is impossible to eliminate the quantization errors completely.

In the second place, since a disturbance is estimated by using an observed quantity, the calculation of an inverted model is inevitably included. Since a differential calculation, which has a nature to enlarge high frequency component noise, is included in the calculation of the inverted model in many cases, a great amount of noise is included in the high frequency components of the estimate of the disturbance. In particular, since machine tools, which are required to process data at a high speed, use numeric representation by integers not by floating points in many cases, noise is apt to be a problem. To avoid this problem, there are some methods for removing the calculation of an inverted direction by devising constructions. But, these methods essentially use the inverted calculation, and consequently, the influences of observed noise are reduced only a little, not greatly, not to speak of completely, even if constructions are devised.

In the third place, since a disturbance is estimated by using an observed quantity, calculations can not be executed offline, but it is needed to execute the calculations online always. If the calculations are attempted to be executed offline, the amount of calculations for the estimation of a disturbance cannot be increased so much because of the restriction of the calculation ability of the computer thereof. Consequently, so much complicated models of the drive and mechanism section 43 cannot be used. As a result of that, the accuracy of the estimation of a disturbance becomes worse.

In the fourth place, since the model of the control section 42 is not included, the prior art apparatus cannot detect abnormalities when problems of the control section 42 itself such as errors of operation, overflow, mistakes in communication, and breakdowns of electric parts.

The second and the third prior art apparatus have the following problems. That is to say, since these prior art apparatus employ a method to detect abnormalities by comparing several kinds of detection qualities such as torque (main shaft working torque) and thrust (feed shaft working force) to each threshold value and by classifying the results of the comparison, they are likely to misjudge abnormal states because of being unable to judge correctly if abnormal states are in non-linear (i.e. not independent from each detection quantity) complicated regions. Besides, since the threshold values are constants, these prior art apparatus cannot be applied to the observation of the breakage of tools, the seizure of the tips of tools and so forth because threshold values must be changed according to the depth of holes.

Since the second prior art apparatus simply compares detection values to threshold values, it has also a problem that it cannot operate in accordance with the degree of the wear of tools or display the state on the basis of grasping the state exactly.

Since the third prior art apparatus employs a method to judge the amount of wear quantities on whether the increments of the main shaft working torque or the thrust (feed shaft working force) over each threshold value exceed threshold values or not as to the wear of tools, the prior art apparatus cannot judge that the wear of a tool is a certain millimeter for the discrimination of the largeness of the wear as long as the method of comparing the detection values to threshold values is employed. The increments are actually sums of influences of working conditions, the quality of the material of a work piece, and the other various causes which are not considered yet. Moreover, there are several kinds of the wear of tools such as the wear of the tip of a bit, the wear of the periphery of a bit and the wear of cutting blade of a bit as to a bit actually, and these several kinds of wear develop in parallel. There is a problem that it is difficult to detect the quantity of wear exactly under such a situation. The situation is commonly true in the cases of the estimation of values unobservable directly such as the temperature of the tip of the blade of a tool.

The fourth prior art apparatus has the following problem. That is to say, the prior art apparatus judges abnormalities by comparing each detection quantity (or the rotation load and the feed shaft load) to each reference pattern for discrimination and classifying each case. The method of the prior art apparatus is a technique for sampling features of each detection quantity from them, and it is not different in comparing each detection quantity to each threshold value independently and judging abnormalities by operating the logical AND or the logical OR of the results of each comparison after that. Consequently, the prior art apparatus is likely to misjudge abnormalities because of being unable to judge correctly if abnormal states are in non-linear (i.e. not independent from each detection quantity) complicated regions like ones shown in FIG. 49. Moreover, since it is needed to prepare reference patterns to each working (to each hole in case of a drill working), the prior art apparatus cannot judge abnormalities before a working ends (namely, it cannot judge abnormalities in real time). Since it takes time to judge abnormalities after the abnormalities actually occurred, the treatment to cope with the abnormalities such as the stoppage of feeding is delayed. As a result, the prior art apparatus has also an important problem that there is the possibility of the serious breakdown of a machine, a work piece or a tool.

Although the prior art apparatus sets threshold values on the basis of the detection quantities at a time of normal operation, the detection quantities at a time of normal operation quite differ in accordance with the working condition and the quality of the material of a working piece even if normal working is carried out. On the other hand, for example, the phenomenon of the breakage of a bit occurs at the time when the force imposed on the bit simply exceeds the permissible force of the bit regardless of the working condition. Even if good working conditions are kept, a force stronger than the permissible force of a bit imposed on the bit would break down the bit. To the contrary, even if good working conditions are not kept owing to chip packing, the wear of a tool or the like, a bit is not broken down if the permissible force of the bit is sufficiently larger than the force imposed on it. A similar thing is true of the permissible temperature for the seizure of the tip of a tool, and so forth. It is a fundamentally irrational notion to obtain threshold values on the basis of the detection values at the time or a normal operation, consequently, the method is evaluated only that it is simple to set the threshold values on the basis of the detection values at the time of a test cutting.

The fifth prior art apparatus has the following problems. That is to say, the present prior art apparatus sets each threshold value of constants to each waveform of detection quantities such as torque (main shaft working torque) and thrust (feed shaft working force). Consequently, it is impossible to set the threshold values as straight lines if abnormal states are not independent from each detection quantity and complicated regions like the ones shown in FIG. 49. Besides, the prior art apparatus has a problem that it is troublesome for an operator to handle a cursor by means of a keyboard while he or she looks at the waveforms.

The sixth prior art apparatus has the following problems. That is to say, since all the waveforms of the allowable value curve $I_D$ of current must be stored in a memorizing device, a memorizing device having a vast capacity is needed. The prior art apparatus sets the allowable value curve $I_D$ on the basis of the data at the time of test cutting, but actual working conditions such as a feed speed are different at the time of test cutting and the time of working in many cases because of overrides and the like. In that case, there is a possibility of misjudging because the data at the time of test cutting and the data at the time of working are different in magnitude or timing than each other. The present prior art apparatus employs a system to change the allowable value curve $I_D$ variably in response to the situation at the time of test cutting, but the object of that is to adjust the allowable value curve $I_D$ in accordance with the actual situation at the time of setting the allowable value curve $I_D$ on the basis of the data at the time of test cutting to the last, and then the prior art apparatus is not changed in storing all the waveforms of the allowable value curve $I_D$ in the memorizing device, consequently the above described problem is not resolved. Moreover, since the present prior art apparatus obtains the threshold values on the basis of the detection quantities at the time of the normal operation thereof similarly to the fourth prior art apparatus, the present prior art apparatus has also the identical problems as those of the fourth prior art apparatus.

The seventh prior art apparatus has the following problems. That is to say, if the ratios of the deep parts of the holes (the right sides of each middle point) to the shallow parts of the holes (the left sides of each middle point) of the main shaft working torque waveforms of each hole shown in FIG. 48(2) are examined, the ratio of the first hole shows a large value, the ratios of the holes of the second through the eleventh show small values, the ratios of the holes of the twelfth through the sixteenth again show large values, and the ratios of the holes of the seventeenth through the twentieth again show small values. If the fact that the breakage of the bit occurred at the twentieth time is considered, it is known that the ratio of the deep part of a hole to the shallow part of the hole is not large at the time of the breakage (the twentieth time) or the just before the breakage (the nineteenth time). The enlargement of the ratios of the deep parts of holes to the shallow parts of the holes can be considered to be caused by chip packing, and consequently, the detection of abnormalities by means of the ratios is to detect the chip packing to the last, not to detect or predict breakdowns. Besides, since the prior art apparatus utilizes the ratios of the deep parts of holes to the shallow parts of the holes, the apparatus cannot detect the abnormalities while working the shallow parts of holes.

Since from the eighth to the tenth prior art apparatus continues their operation even if chip packing occurs, they have a problem that there is the possibility that the breakdown of a tool occurs or the accuracy of working is deteriorate.

The eleventh prior art apparatus has the following problems. That is to say, the present prior art employs a policy to carry out working until chip packing occurs, and execute a stopping operation or a returning operation after chip packing when it occurred, and further repeat the working and the stopping or returning operations. Namely, the policy is a standpoint to tolerate chip packing. A first time chip packing is inevitable, but the prior art apparatus cannot essentially avoid chip packing after that. In particular, in the case of the working of a deep hole chip packing occurs several times before finishing the working to a target hole depth position. As a result, there is a possibility that the breakage of a tool is caused or the accuracy of working is worsened.

The twelfth prior art apparatus has the following problems. That is to say, since the display of the main shaft load and the display of the feed shaft load is separated into different bar graphs, if abnormal states are in complicated regions as shown in FIG. 49, it is difficult for an operator to judge abnormal states by glancing at them. Besides, it is impossible to display normal ranges and abnormal ranges by means of bar graphs, if abnormal states are in complicated ranges as shown in FIG. 49.

The thirteenth prior art apparatus has the following problems. That is to say, the present prior art controls the feed speed so that the torque takes a constant value, in the case where the torque varies because of the process of the ordinary wear and in the case where the torque varies because of a cause other than the process of the ordinary wear. Generally, providing that feed speeds are the same, the main shaft working torque increases according to the wear of a tool. If the present prior art apparatus is applied to that case, the apparatus controls the feed speed to be decreased. As a result, the prior art apparatus has a problem that working efficiency decreases.

SUMMARY OF THE INVENTION

In view of the foregoing, it is an object of the present invention to provide an apparatus for detecting an abnormality of a control system which is little influenced by observed noise or operation errors of the computer thereof at the time of the estimation of disturbances, and which is capable of executing the above operation offline and detecting the abnormalities of the control section thereof.

It is another object of the present invention to provide an apparatus for detecting an abnormality of a control system which can judge abnormalities even if abnormal states are in complicated regions, which can cope with the cases where motion speeds vary, and which can be used in real time.

It is a further object of the present invention to provide an apparatus for detecting an abnormality of a control system which can automatically set abnormal regions if abnormal states are in complicated regions, and which does not require a memorizing device having a great capacity.

It is a further object of the present invention to provide an apparatus for detecting an abnormality of a control system which can precisely detect a breakdown phenomenon, a seizure phenomenon of the tip of a tool and the like, to which phenomena it is necessary to change threshold values in accordance with the depth of working holes.

It is a further object of the present invention to provide an apparatus for detecting an abnormality of a control system which can precisely detect abnormalities by separating working conditions, various wear of tools, temperatures of tips of blades of tools, and the like.

It is a further object of the present invention to provide an apparatus for detecting an abnormality of a control system which can avoid the breakage of a tool and the deterioration of the accuracy of working by adaptably continuing working without causing chip packing for the more than one time.

It is a further object of the present invention to provide an apparatus for detecting an abnormality of a control system which display characteristic quantities of plural axes for enabling easy judgement of abnormalities.

It is a further object of the present invention to provide an apparatus for detecting an abnormality of a control system which can display or be manipulated in accordance with each step of the degree of abnormality by grasping the precise degree of abnormality.

It is a further object of the present invention to provide an apparatus for detecting an abnormality of a control system which does not decrease the efficiency of working and can cope with abnormalities other than a specified abnormality by controlling the operation of a machine tool to permit the specified abnormality and to return the operation to the transition route of the specified abnormality in case of the occurrence of abnormalities other than the specified abnormality.

According to the first aspect of the present invention, for achieving the above-mentioned objects, there is provided an apparatus for detecting an abnormality of a control system comprising an internal property calculating section for calculating an internal property of the control system by using only an command value inputted into the control section thereof and representing a position or a speed of the control system, and an abnormality judging section for judging abnormalities of operation of the control system on a basis of an internal state calculated by the internal property calculating section and an actual internal state of the control system.

As stated above, the apparatus for detecting an abnormality of a control system according to the first aspect of the present invention calculates an internal property of the control system by using only a command value representing a position or a speed of the control system, and judges abnormalities of the operation of the control system on a basis of the calculated internal property and the actual internal property of the control system. Consequently, the apparatus can precisely detect an abnormality without being influenced by noise components superposed on observed data, and can calculate the internal property even offline.

According to the second aspect of the present invention, there is provided an apparatus for detecting an abnormality of a control system, the internal state calculating section of which comprises a control section model being a model of a control section of the control system, and a drive and mechanism model being a model of the drive and mechanism section of the control system.

As stated above, the apparatus for detecting an abnormality of a control system according to the second aspect of the present invention calculates an internal state quantity on the control section model and the drive and mechanism model. Consequently, the apparatus can detect an abnormality of the control section itself, too, and can precisely detect an abnormality because it does not use any inverted model.

According to the third aspect of the present invention, there is provided an apparatus for detecting an abnormality of a control system, wherein a driving means of the drive and mechanism section thereof is an electric motor, and wherein the internal state quantity of the control system is one of a command value of a drive current of the electric motor, a feedback value of the drive current, a command value of produced torque to the electric motor and a feedback value of the produced torque, or a combination of them.

As stated above, the apparatus for detecting an abnormality of a control system according to the third aspect of the present invention uses one of a command value of a drive current of the electric motor, a feedback value of the drive current, a command value of produced torque to the electric motor and a feedback value of the produced torque, or a combination of them as an internal property. Consequently, the apparatus can precisely detect an abnormality without being influenced by noise components.

According to the fourth aspect of the present invention, there is provided an apparatus for detecting an abnormality of a control system comprising an operation region memorizing section for memorizing an abnormal operation region in which characteristic quantities of internal state quantities calculated by the internal state quantity calculating section thereof in order to correspond to operation at a time of abnormal operation of the control system are distributed, or memorizing a normal operation region in which characteristic quantities of internal state quantities calculated by the internal state quantity calculating section in order to correspond to operation at a time of normal operation of the control system are distributed, wherein the abnormality judging section thereof calculates a characteristic quantity of a plural axes driving means in the drive and mechanism section of the control system from the internal property calculated by the internal property calculating section, and judges the operation of the control system to be abnormal when the calculated characteristic quantity is in the abnormal operation region memorized in the operation region memorizing section or when the calculated characteristic quantity is not in the normal operation region memorized in the operation region memorizing section.

As stated above, in the apparatus for detecting an abnormality of a control system according to the fourth aspect of the present invention, the abnormality judging section calculates a characteristic quantity of a plural axes driving means and judges the operation of the control system to be abnormal when the calculated characteristic quantity is in the abnormal operation region memorized in the operation region memorizing section or when the calculated characteristic quantity is not in the normal operation region memorized in the operation region memorizing section. Consequently, the apparatus can correctly judge an abnormality even if abnormal states are given in complicated regions, and can carry out the judgement of an abnormality even if the speed of operation varies.

According to the fifth aspect of the present invention, there is provided an apparatus for detecting an abnormality of a control system which comprises an abnormality detecting section for detecting an abnormality and generating an abnormality detection signal, a plural axis characteristic quantities memorizing section for memorizing characteristic quantities of plural axes, and an operation region modifying section for modifying an abnormal operation region or a normal operation region memorized in the operation region memorizing section thereof on a basis of the characteristic quantities of plural axes memorized in the plural axis characteristic quantities memorizing section at a time of receiving the abnormality detection signal outputted from the abnormality detecting section.

As stated above, the apparatus for detecting an abnormality of a control system according to the fifth aspect of the present invention memorizes characteristic quantities of plural axes in the plural axis characteristic quantities memorizing section, and modifies an abnormal operation region or a normal operation region memorized in the operation region memorizing section on a basis of the characteristic quantities memorized in the plural axis characteristic quantities memorizing section at a time of the detection of the abnormal operation of a machine tool by the abnormality detection section. Consequently, the apparatus can automatically set an abnormal operation region or a normal operation region even if abnormal states are given in complex regions, and does not need a memory having a large capacity.

According to the sixth aspect of the present invention, there is provided an apparatus for detecting an abnormality of a control system which comprises a tool depth calculating section for calculating a tool depth from a surface of a work piece to a blade tip of a tool of the control system or a peripheral end of the tool, and an operation region modifying section for modifying an abnormal operation region or a normal operation region memorized in the operation region memorizing section thereof in accordance with a tool depth calculated by the tool depth calculating section.

As stated above, the apparatus for detecting an abnormality of a control system according to the sixth aspect of the present invention calculates a tool depth from the surface of a work piece to the blade tip of a tool of the control system or the peripheral end of the tool, and modifies an abnormal operation region or a normal operation region memorized in the operation region memorizing section in accordance with the calculated tool depth. Consequently, the apparatus can precisely detect the breakage phenomenon of the tool, the seizure of the tip of the tool and the like.

According to the seventh aspect of the present invention, there is provided an apparatus for detecting an abnormality of a control system, wherein the internal property calculating section thereof or the abnormality judging section thereof includes a working process model being a model of a working process of a machine tool.

As stated above, in the apparatus for detecting an abnormality of a control system according to the seventh aspect of the present invention, the internal property calculating section or the abnormality judging section includes a working process model being a model of a working process. Consequently, the apparatus can separate a working condition, various tool wear, the temperature of the blade tip of a tool, and the like to detect each of them precisely.

According to the eighth aspect of the present invention, there is provided an apparatus for detecting an abnormality of a control system, wherein the abnormality judging section thereof comprises a working process abnormality judging section for judging abnormalities of a working process of a machine tool on a basis of an internal property of the working process model of the machine tool.

As stated above, in the apparatus for detecting an abnormality of a control system according to the eighth aspect of the present invention, the working process abnormality judging section included in the abnormality judging section judges abnormalities of a working process of a machine tool on a basis of an internal property of the working process model of the machine tool. Consequently, the apparatus can separate a working condition, various tool wear, the temperature of the blade tip of a tool, and the like to detect each of them precisely.

According to the ninth aspect of the present invention, there is provided an apparatus for detecting an abnormality of a control system, wherein the apparatus comprises a chip packing detecting section for detecting the chip packing of a tool of a machine tool, and a control section controlling the tool to be fed at a feed step different from a feed step at a time of an ordinary operation.

As stated above, the apparatus for detecting an abnormality of a control system according to the ninth aspect of the present invention detects the chip packing of a tool, and feeds the tool at a feed step different from a feed step at a time of an ordinary operation. Consequently, the apparatus can avoid the breakage of a tool and the deterioration of the accuracy of working by adaptably continuing working without causing chip packing more than one time.

According to the tenth aspect of the present invention, there is provided an apparatus for detecting an abnormality of a control system, wherein the apparatus comprises a diagramming means for diagramming an abnormal working region and present characteristic quantities of plural axes of a machine tool on a graph having plural dimensions, which graph is composed of plural axes corresponding to the characteristic quantities of the plural axes.

As stated above, the apparatus for detecting an abnormality of a control system according to the tenth aspect of the present invention can diagram an abnormal working region and present characteristic quantities of plural axes on a graph having plural dimensions. Consequently, the apparatus enables easy judgement of abnormalities of a machine tool at the present time.

According to the eleventh aspect of the present invention, there is provided an apparatus for detecting an abnormality of a control system comprising a judging section for judging an operation state of the drive and mechanism section thereof from present positions of plural characteristic quantities of plural internal properties of the drive and mechanism section of the control system on a transition route pursued by the characteristic quantities from a normal operation state of the drive and mechanism section up to an abnormal operation state thereof on a basis of the plural characteristic quantities, and a display and manipulation section for displaying an operation state judged by the judging section and inputting an instruction signal to the judging section or the control system.

As stated above, the apparatus for detecting an abnormality of a control system according to the eleventh aspect of the present invention judges an operation state from present positions of plural characteristic quantities on a transition route pursued by the characteristic quantities from a normal operation state up to an abnormal operation state, and can be manipulated by means of display on a result of the judgement. Consequently, an operator can easily perceive the operation state of the control system for decreasing the possibility of mis-manipulation, and further can display or be manipulated in accordance with each step of the degree of abnormality.

According to the twelfth aspect of the present invention, there is provided an apparatus for detecting an abnormality of a control system comprising a judging section for judging an operation state of the drive and mechanism section of the control system from present positions of plural characteristic quantities of plural internal properties of the drive and mechanism section on a transition route pursued by the characteristic quantities from a normal operation state of the drive and mechanism section up to an abnormal operation state thereof on a basis of the plural characteristic quantities outputted from the first control section of the control system, and a second control section for controlling an operation of the control system so that the plural characteristic quantities shift along the transition route on a basis of an operation state judged by the judging section.

As stated above, the apparatus for detecting an abnormality of a control system according to the twelfth aspect of the present invention judges the operation state of the control system from present positions of plural characteristic quantities on a transition route from a normal operation state up to an abnormal operation state, and controls the operation of the control system so that the plural characteristic quantities shift along the transition route on a basis of a judged result. Accordingly, the apparatus does not decrease the efficiency of working and can cope with abnormalities other than a specified abnormality by controlling the operation of the control system to permit the specified abnormality and to return the operation to the transition route of the specified abnormality in case of the occurrence of abnormalities other than the specified abnormality.

BRIEF DESCRIPTION OF THE DRAWINGS

Further objects and advantages of the present invention can be more fully understood from the following detailed description taken in conjunction with the accompanying drawings, in which:

FIG. 48(1) and FIG. 48(2) each are a waveform diagram showing an example of experimental data of drill workings;

FIG. 60 is an explanatory view showing the display section of a twelfth prior art apparatus for detecting an abnormality of a control system; and FIG. 61 is a waveform diagram showing the operation of thirteenth prior art apparatus for detecting an abnormality of a control system.

DETAILED DESCRIPTION OF THE PREFERRED EMBODIMENTS

Preferred embodiments of the present invention will hereinafter be described in detail with reference to the accompanying drawings.

EMBODIMENT 1.

Figure 1:
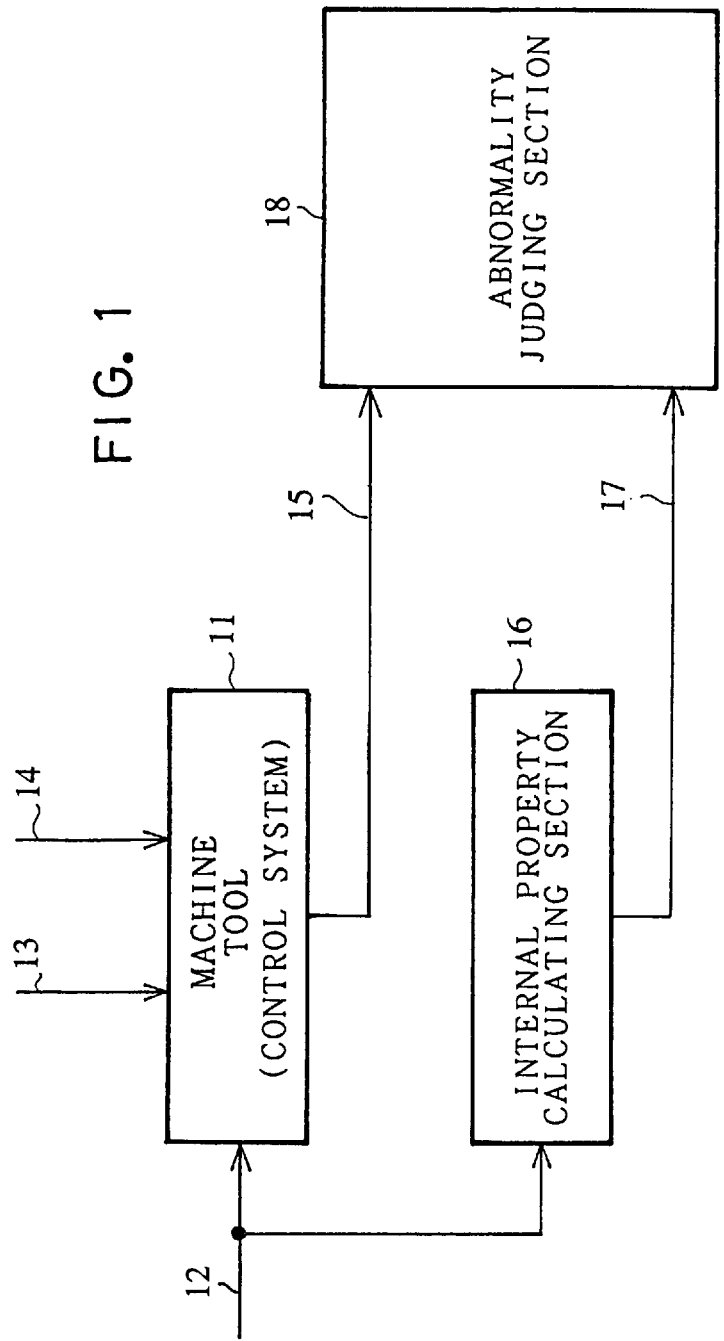
FIG. 1 is a block diagram showing the construction of a first embodiment (embodiment 1) of the present invention.

FIG. 1 is a block diagram showing the construction of the embodiment 1 of the present invention. In the figure, reference numeral 11 denotes a machine tool having a drive and mechanism section for executing the driving operation of a lathe, a drilling machine, or the like and a control section for controlling the operation of the drive and mechanism section as a control system; reference numeral 12 denotes a signal representing a command value for commanding a position or a speed of the machine tool 11, which signal 12 is inputted into the control section of the machine tool 11 by an inputting device not shown. Reference numeral 13 denotes a disturbance such as the breakage of a bit, which disturbance is applied to the machine tool 11; reference numeral 14 denotes noise such as a radio wave getting into the machine tool 11 to be observed; reference numeral 15 denotes a signal representing an actual internal property such as a working position, a working speed, the torque or a working force of the machine tool 11; reference numeral 16 denotes an internal property calculating section for calculating an internal property of the machine tool on a basis of the signal 12; reference numeral 17 denotes a signal representing an internal property calculated by the internal property calculating section 16; and reference numeral 18 denotes an abnormality judging section for judging the existence of an abnormality in the operation of the machine tool 11 on the basis of the signals 15 and 17.

In operation, the machine tool 11 is controlled so as to follow the signal 12 representing a position command or a speed command in a state of being influenced by the disturbance 13 and the noise 14. But, since the internal property calculating section 16 calculates an internal property of the machine tool on the basis of the signal 12, the internal property calculating section 16 is not influenced by the disturbance 13 and the noise 14. Consequently, the signal 17 outputted from the internal property calculating section 16 is an estimate of the internal property of the machine tool 11 in a state of lacking the disturbance 13 and the noise 14. Besides, as described above, the signal 15 outputted from the machine tool 11 represents a measured value of the internal property in a state of including the disturbance 13 and the noise 14.

The abnormality judging section 18 judges abnormalities by comparing the values of the signal 15 representing the actual state of the machine tool 11 and the signal 17 outputted from the internal property calculating section 16 in a state of lacking the disturbance 13 and the noise 14. This method of abnormality judging can be realized with a very simple construction. There is another abnormality judging method to eliminate computing errors and noise components or extract more characteristic components representing an abnormality of the machine tool 11 by executing a filtering processing, a statistical processing or both of them appropriate to each of the signals 15 and 17. By means of the method, the accuracy of detecting an abnormality can further be improved.

The apparatus for detecting an abnormality according to the present invention can be applied to a control system having a drive and mechanism section for executing driving operation and a control section for controlling the operation of the drive and mechanism section such as a robot, an elevator, an escalator, a sewing machine, a coordinate measuring machine, a plotter, a belt conveyor, an electric fan, a compressor, a moving body such as a car and a train, and an aircraft in addition to a machine tool.

EMBODIMENT 2.

Figure 2:
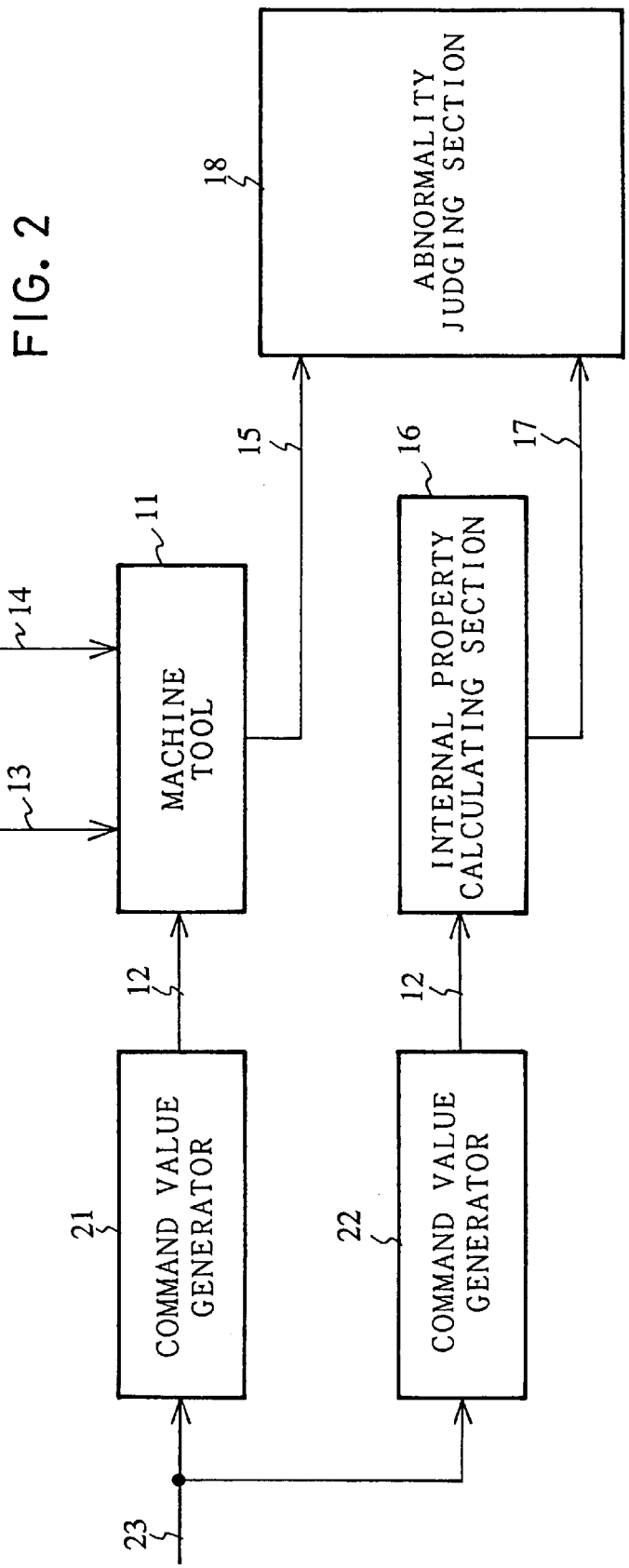
FIG. 2 is a block diagram showing the construction of a second embodiment (embodiment 2) of the present invention.

FIG. 2 is a block diagram showing the construction of the embodiment 2 of the present invention. In the drawings concerning all of the following embodiments, the same composing elements as those of the embodiments described before the embodiment concerned are denoted by the same reference characters, and the description thereof will be omitted.

In FIG. 2, reference numerals 21, 22 denote command value generators generating the signal 12 representing a command value for commanding a position or a speed to the machine tool 11; reference numeral 23 denotes a signal representing a moving route and an operation parameter of the machine tool 11, and the signal 23 is inputted into the command value generators 21 and 22.

In operation, the command value generators 21,22 generate the signal 12 representing a command value for commanding a position or a speed at which operation control such as coordinate transformations and adjustments of speeds is performed so that the machine tool 11 moves on a commanded moving route and so that designated operation parameters are satisfied in conformity with the inputted signal 23, and input the signal 12 into the control section of the machine tool 11.

In addition, the signal 12 represents speed information or position information in a more inclusive meaning including not only simple speed information or position information but also the information concerning the operation control such as coordinate transformations and adjustments of speeds. But, it is also possible to utilize a signal including a command value concerning speeds or positions in a more inclusive meaning than the signal 12 of the present embodiment, for example, the data of CAD or CAM. Identical effects to those of the present embodiments can be expected in case of utilizing the more inclusive signal.

EMBODIMENT 3.

Figure 3:
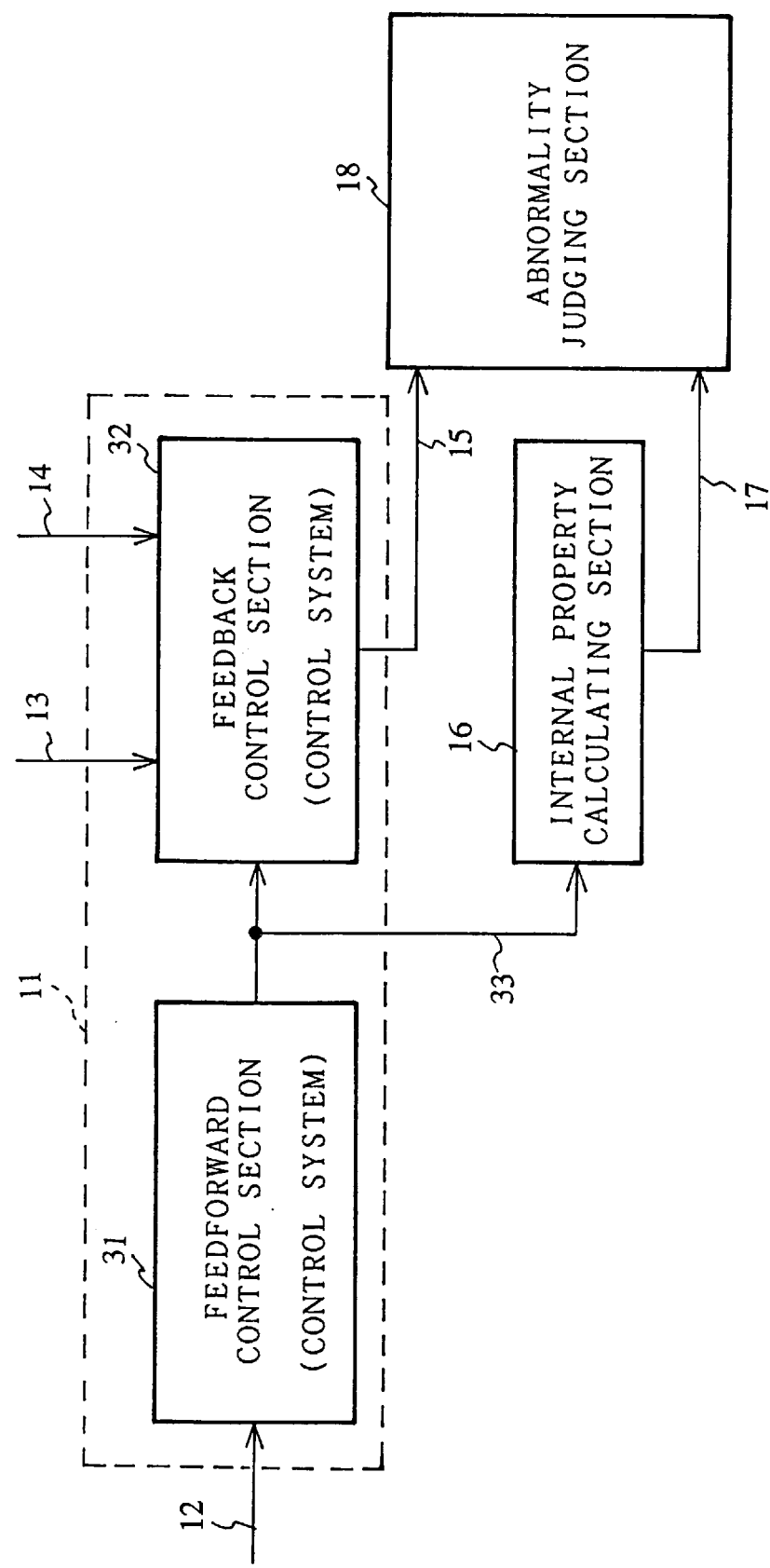
FIG. 3 is a block diagram showing the construction of a third embodiment (embodiment 3) of the present invention.

FIG. 3 is a block diagram showing the construction of the embodiment 3 of the present invention. In the figure, reference numeral 31 denotes a feedforward control section constituting a part of the machine tool 11 as a control system and operating in conformity with the feedforward control; reference numeral 32 denotes a feedback control section similarly constituting a part of the machine tool 11 as a control system and operating in conformity with the feedback control; and reference numeral 33 denotes a signal representing an internal command value of the machine tool 11 concerning a position or a speed. The present embodiment divides the machine tool 11 into the feedforward control section 31 and the feedback control section 32. The feedforward control section 31 contains only the part executing the calculations thereof on the basis of only the signal 12 representing a command value of a position or a speed. In contrast with this, the feedback control section 32 includes a part influenced by the disturbance 13 or the noise 14. The machine tool may be divided into the aforementioned two parts by any method provided that the aforementioned two conditions are satisfied.

In operation, the feedforward control section 31 executes feedforward control such as the filtering of the signal 12 representing a command value of a position or a speed to generate the signal 33 representing an internal command value concerning a position or a speed. The feedback control section 32 is controlled so as to follow the signal 33 concerning a position or a speed in a state of being influenced by the disturbance 13 and the noise 14. The internal property calculating section 16 calculates the signal 17 representing an internal property of the machine tool 11 on the basis of the signal 33.

The signal 33 is more restricted than the signal 12 of the embodiment 1 as to a speed and a position in a sense of being information actually utilized for controlling the feedforward control section 31 of the machine tool 11.

EMBODIMENT 4.

Figure 4:
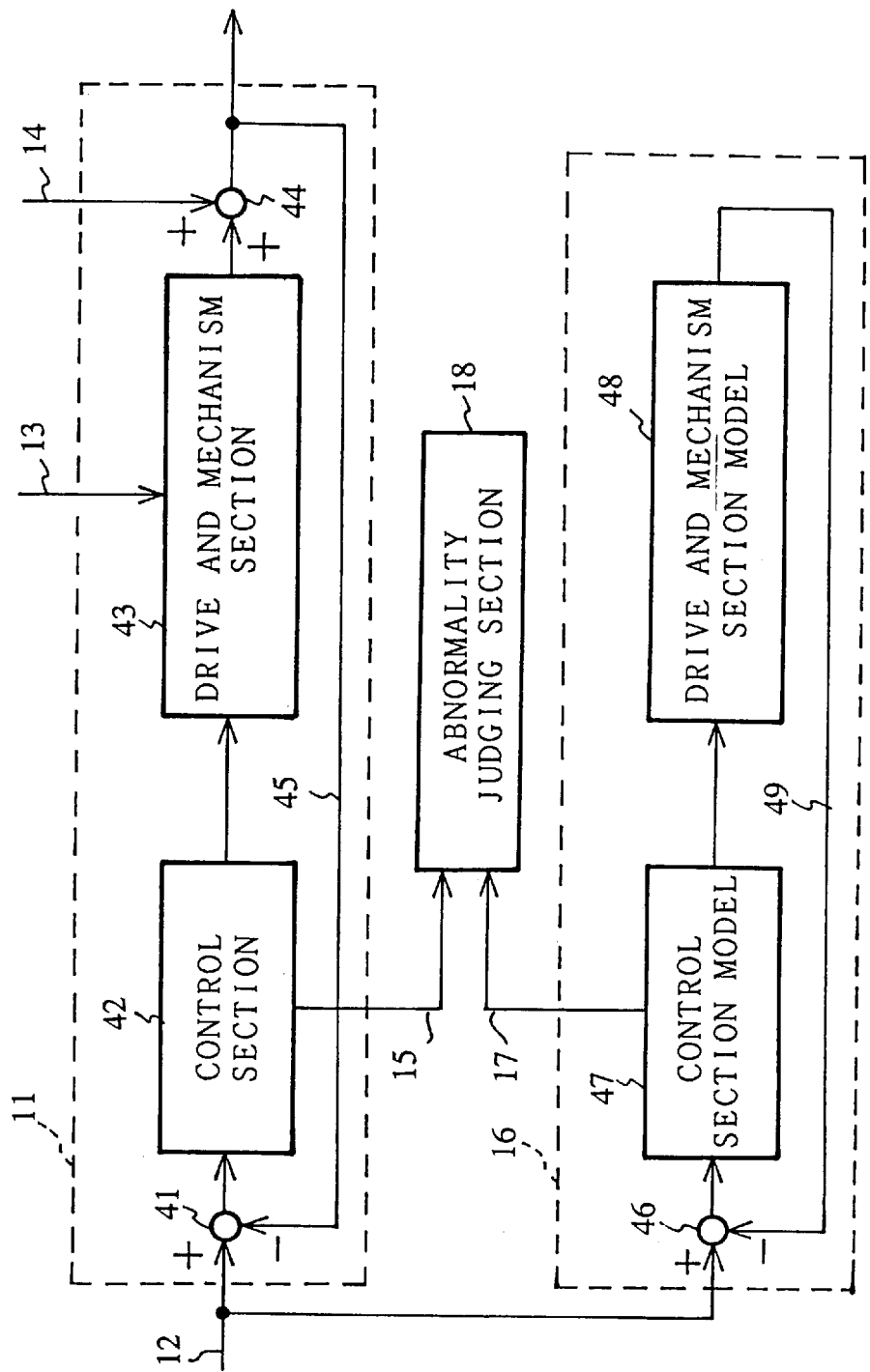
FIG. 4 is a block diagram showing the construction of a fourth embodiment (embodiment 4) of the present invention.

FIG. 4 is a block diagram showing the construction of the embodiment 4 of the present invention. In the figure, reference numeral 41 denotes a subtracter for subtracting the signal 45 representing a position or a speed of an operation of the machine tool 11 from the signal 12 representing a command value for commanding a position or a speed; reference numeral 43 denotes a drive and mechanism section for performing a drive operation; reference numeral 42 denotes a control section for controlling the operation of the drive and mechanism section 43; reference numeral 44 denotes an actual working operation section such as an electric circuit, a sensor, an element such as a transducer which is apt to be influenced by a noise, or a bite; and reference numeral 45 denotes a signal representing a position or a speed of a working operation of the working operation section 44, which signal 45 is detected by a detector (not shown) to be fed back to the subtracter 41. The subtracter 41, control section 42, drive and mechanism section 43 each form a part of the machine tool 11.

Reference numeral 46 denotes a subtracter for subtracting a calculated value representing a position or a speed of an operation of the machine tool 11, which calculated value is calculated by the internal property calculating section 16; reference numeral 47 denotes a control section model being a model of the control section 42; reference numeral 48 denotes a drive and mechanism section model being a model of the drive and mechanism section 43; the control section model 47 and the drive and mechanism section model 48 each constitute a part of the internal property calculating section 16. Reference numeral 49 denotes an output signal of the drive and mechanism model 48. The control section model 47 is formed by taking the same construction as the known control section 42 or extracting only the principal parts thereof as occasion demands. The drive and mechanism model 48 is formed by constructing or identifying each element obtained from the plan of the drive and mechanism section 43.

In operation, the control section 42 in the machine tool 11 controls and operates the drive and mechanism section 43 so as to conform to the signal 12 representing a command value of a position or a speed while receiving the disturbance 13 and the observed noise 14. The control section model 47 in the internal property calculating section 16 execute a calculation for controlling and operating the drive and mechanism section model 48 so as to conform to the command value signal 12 representing a position or a speed. In this case, the signal 17 representing an internal property calculated by the internal property calculating section 16 is an estimate of an internal property in a state of lacking the disturbance 13 and the noise 14. As described above, since the present embodiment employs a construction including both of the control section model 47 and the drive and mechanism section model 48, the embodiment can calculate the internal property signal 17 on the basis of the command value signal 12 representing a position or a speed more precisely.

Figure 5:
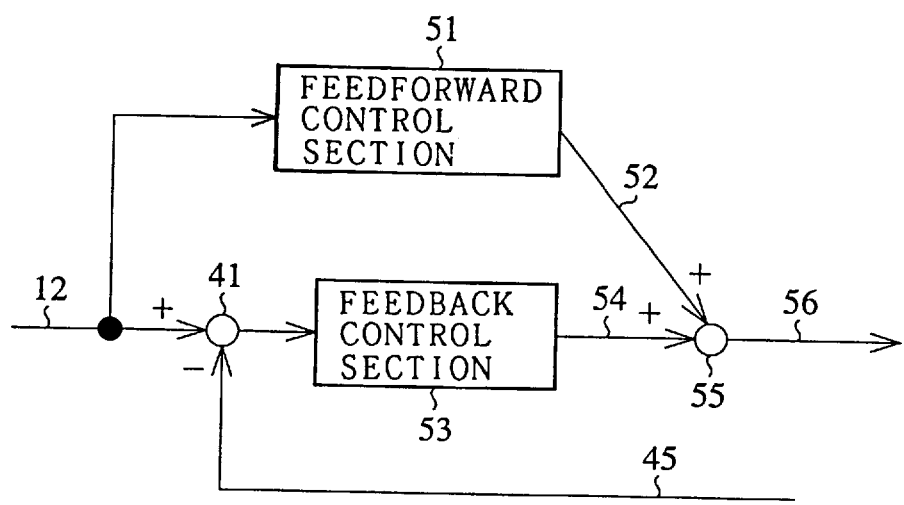
FIG. 5 is a block diagram showing the construction of the control system of the embodiment 4.

Next, the construction of the control section shown in FIG. 4 will be described in detail. The control section 42 employs a two degrees of freedom type construction; FIG. 5 is a block diagram showing the construction. In the figure, reference numeral 51 denotes a feedforward control section for executing a feedforward control operation; reference numeral 52 denotes a signal representing a feedforward control quantity outputted from the feedforward control section 51; reference numeral 53 denotes a feedback control section for executing a feedback control operation; reference numeral 54 denotes a signal representing a feedback control quantity outputted from the feedback control section 53; reference numeral 55 denotes an adder for adding the feedforward control quantity signal 52 and the feedback control quantity signal 54 together to output them; and reference numeral 56 denotes a control quantity added and outputted to the drive and mechanism section 43 by the adder 55.

In operation, the feedforward control section 51 calculates a feedforward control quantity on the basis of the command value signal 12 representing a position and a speed. And, the feedback control section 53 executes a feedback control on the signal representing the difference between the signal 12 calculated by the subtracter 41 and the signal 45 to calculate a feedback control quantity. The adder 55 operates the sum of the feedforward control quantity signal 52 and the feedback control quantity signal 54 to output it to the drive and mechanic section 43 as the control quantity signal 56.

Moreover, the control section 42 employs a two degrees of freedom type construction, but it may employ other type constructions. For example, the abnormality detecting apparatus of the present invention can employ a one degree of freedom type control section, a PID control section, a state feedback type control section, an H $\infty$ control section, a repeat control section, a sliding mode control section or a control section using one of them with an observer jointly, providing that the control section model 47 in the internal property calculating section 16 well approximate to the control section 42 of the machine tool 11 shown in FIG. 4.

Figure 6:
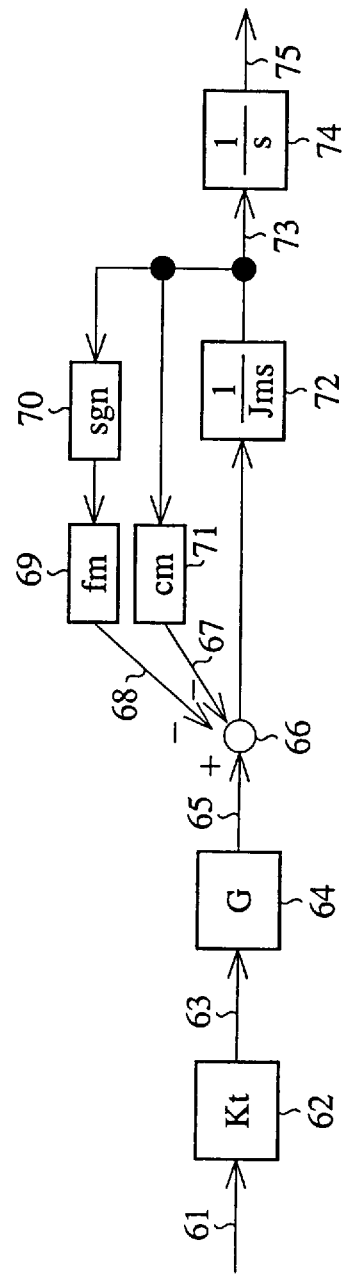
FIG. 6 is a block diagram showing a model of the drive and mechanism section of the embodiment 4.

Next, the operation of the drive and mechanism section 43 shown in FIG. 4 will be described in detail. FIG. 6 is a block diagram of a model of the drive and mechanism section 43 for analyzing the operation of the section 43. In the figure, reference numeral 61 denotes a current value of a drive current applied to an electric motor of the drive and mechanism section 43; reference numeral 62 denotes a torque constant of the electric motor; reference numeral 63 denotes generated torque generated by the electric motor; reference numeral 64 denotes a conversion constant; reference numeral 65 denotes generated torque or a generated force at a position of the machine where the electric motor has an action on the machine; reference numeral 66 denotes a subtracter; reference numeral 67 denotes viscous friction torque or a viscous friction force; reference numeral 68 denotes Coulomb's friction torque or a Coulomb's friction force; reference numeral 69 denotes a Coulomb's friction coefficient; reference numeral 70 denotes a code function; reference numeral 71 denotes a viscous friction coefficient; reference numeral 72 denotes an inertial element; reference numeral 73 denotes an observed value of a speed; reference numeral 74 denotes a differential operator; and reference numeral 75 denotes an observed value of a position.

Next, the operation of the drive and mechanism section 43 will be described on the block diagram. The electric motor generates the generated torque 63 proportional to the current value 61. The generated torque or generated force 65 at an acting position on a tool or a table which is an object of the drive control of the electric motor is a value obtained by multiplying the generated torque 63 of the electric motor by the conversion constant 64 which is determined by a transfer element of force or torque such as a gear ratio of a speed change gear or a pitch of a ball screw. The operating mechanism section of the electric motor is constituted by one inertial element 72. The inertial element 72 receives the viscous friction torque or viscous friction force 67 and the Coulomb's friction torque or Coulomb's friction force 68 in addition to the generated torque or generated force 65 at an acting position. The viscous friction torque or viscous friction force 67 is obtained by multiplying the observed value of a speed 73 by the viscous friction coefficient 71; the Coulomb's friction torque or Coulomb's friction force 68 is obtained by multiplying the code of the observed value of a speed 73 by the Coulomb's friction coefficient 69.

Figure 7:
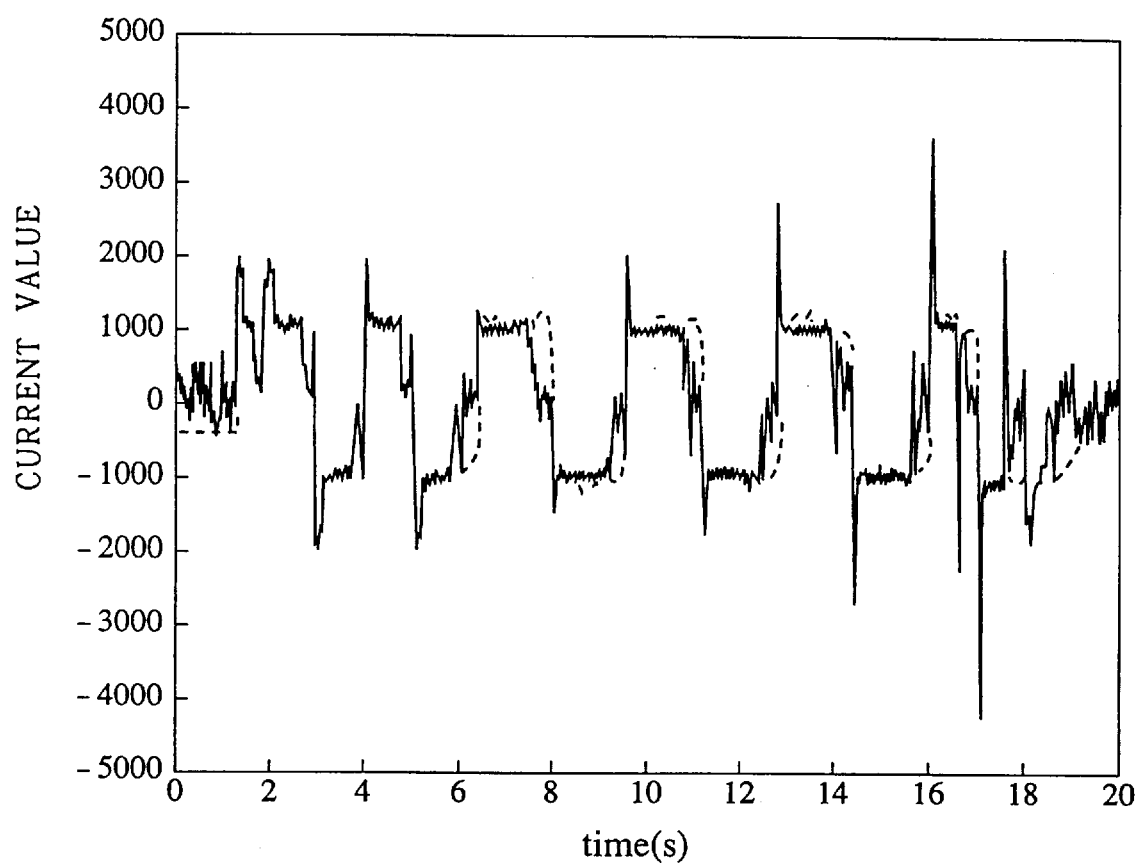
FIG. 7 is a waveform diagram showing a comparison between an estimate of current calculated backwards by using a model from a feedback value of an observed value of a speed and a measured value of current.

Next, an example of an experiment for verifying whether the block diagram of FIG. 6 represents the actual machine tool well or not will be shown. FIG. 7 is a waveform diagram showing a comparison between an estimate of a current calculated backwards by using a model from a feedback value of an observed value of a speed 73 in FIG. 6 and a measured value of the current. In the figure, the full line denotes the estimate; the broken line denotes the measured value. It is apparent that they almost accord with each other. Consequently, it can be concluded that the machine tool used in the experiment is well approximated by the block diagram of FIG. 6.

In FIG. 6, an example of model of the drive and mechanism section 43 is disclosed, but it is possible to make various models of the drive and mechanism section 43 in accordance with the kinds of the drive and mechanism section 43. For example, if a control system is an induction motor, it is proper to make a model the inputs of which are a current and a magnetic flux, and wherein the torque generated by an electric motor is proportioned to the product of the current and the magnetic flux. In control systems for controlling a perpendicular shaft of a machine tool, an arm of a robot, or the like, it is proper to use a model including the factor of gravity. If mechanism section has complicated friction characteristics, it is generally proper to make a model on which friction force proportioned to the nth power of a speed (n denotes an arbitrary real number) is applied. If the elasticity of a part of a mechanism section is small, it is proper to use a model including one spring element or more and plural inertia elements. The abnormality detecting apparatus of the present invention can be applied to any of the aforementioned control systems, providing that the actual drive and mechanism section of the control system well approximates to the drive and mechanism section model in the internal property calculating section.

EMBODIMENT 5.

Figure 8:
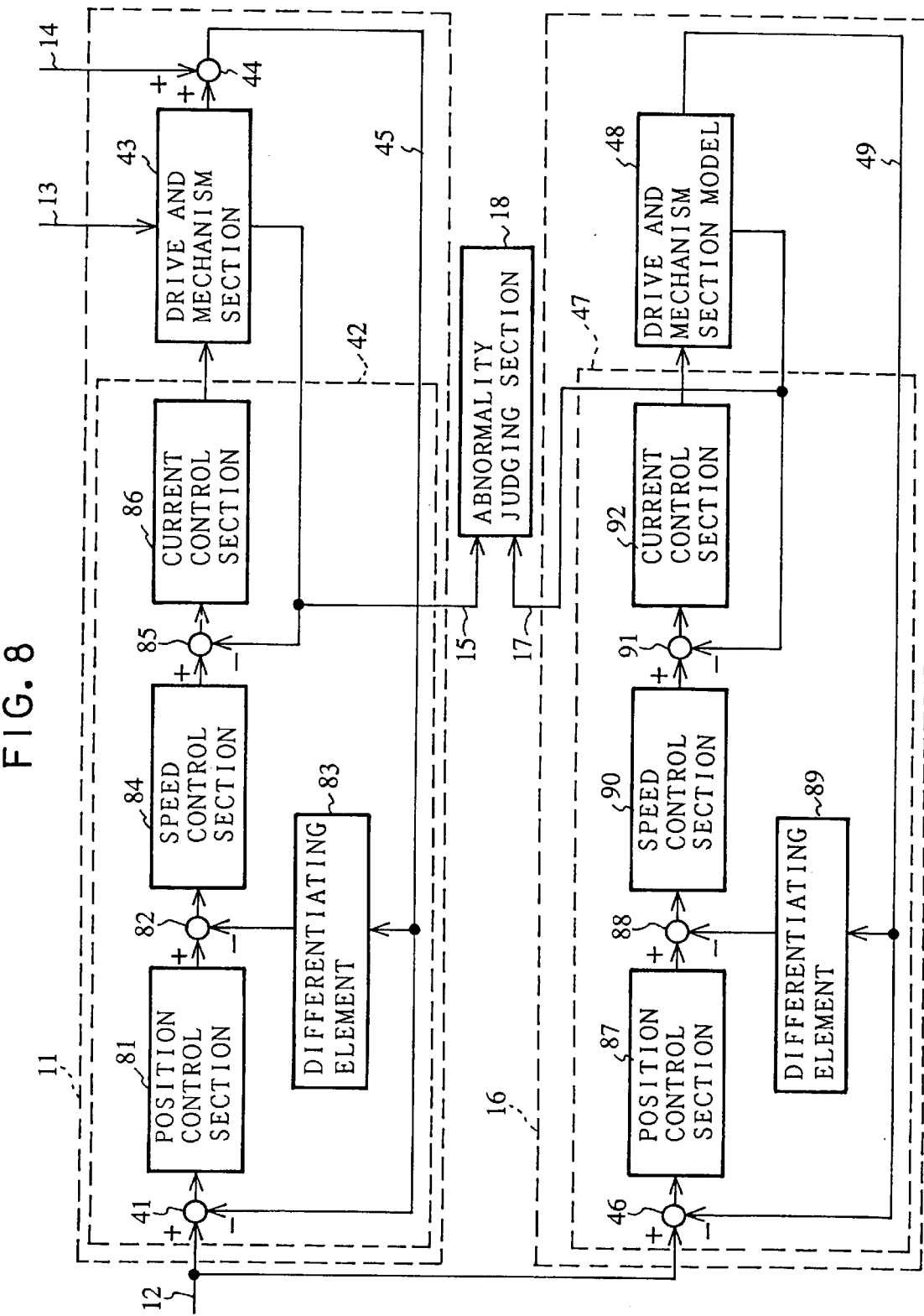
FIG. 8 is a block diagram showing the construction of a fifth embodiment (embodiment 5) of the present invention.

FIG. 8 is a block diagram showing the construction of the embodiment 5 of the present invention. In the figure, reference numeral 81 denotes a position control section for generating a position controlling signal on a basis of an output signal of the subtracter 41; reference numeral 82 denotes a subtracter; reference numeral 83 denotes a differentiating element for executing a differential operation; reference numeral 84 denotes a speed control section for generating a speed controlling signal on a basis of an output signal of the subtracter 82; reference numeral 85 denotes a subtracter; reference numeral 86 denotes a current control section for outputting a controlling current to drive and mechanism section 43 on a basis of an outputted signal from the subtracter 85; the position control section 81, subtracter 82, differentiating element 83, speed control section 84, subtracter 85 and current control section 86 form a control section 42. An electric motor is used as a drive means in the drive and mechanism section 43 of the machine tool 11 of the present embodiment. And, the signal 15 representing an internal property is a feedback value of a drive current of the aforementioned electric motor.

Reference numeral 87 denotes a position control section for generating a position controlling signal on the basis of an outputted signal from the subtracter 87; reference numeral 88 denotes a subtracter; reference numeral 89 denotes a differentiating element for executing a differential operation; reference numeral 90 denotes a speed control section for generating a speed controlling signal on a basis of an output signal of the subtracter 88; reference numeral 91 denotes a subtracter; reference numeral 92 denotes a current control section for outputting a controlling current to drive and mechanism section model 48 on a basis of an outputted signal from the subtracter 91; the position control section 87, subtracter 88, differentiating element 89, speed control section 90, subtracter 91 and current control section 92 form a control section model 47. The signal 17 representing an internal property calculated by the internal property calculating section 16 is a feedback value of a drive current of the drive and mechanism section model 48.

In operation, the subtracter 41 operates a difference between the command value signal 12 representing a position or a speed and the signal 45 representing an observed position value; the position control section 81 executes the position control of an electric motor on the basis of an output signal of the subtracter 41. The subtracter 82 operates a difference between a position controlling signal outputted from the position control section 81 and an observed value of a speed obtained by differentiating the signal 45; the speed control section 84 executes the speed control of the electric motor on the basis of a signal outputted from the subtracter 82. The subtracter outputs a difference between a speed controlling signal outputted from the speed control section 84 and an observed value of a drive current of the electric motor; the current control section 86 executes the current control of the electric motor on the basis of a signal outputted from the subtracter 85 to operate the electric motor. The control section model 47 operates similarly to the control section 42.

In the present embodiment, a position of the working operation section 44 is observed, and a speed of the working operation section 44 is obtained by differentiating the observed position. But, conversely, the speed of the working operation section 44 may be observed, and the position thereof may be obtained by integrating the observed speed. Besides, a signal concerning a position command is inputted as the signal 12, but a signal concerning a speed command may be inputted and a command value concerning a position may be obtained by integrating the speed commanding signal.

The abnormality judging section 18 judges abnormalities of the operation of the machine tool 11 on the basis of the signal 15 representing a current feedback value, one of the internal properties of the control section 42, and the signal 17 representing a current feedback value, one of the internal properties of the control section model 47. This abnormality judgement operation is performed in the following manner. That is to say, at first, a filtering processing or a statistical processing to the signal 15 and the signal 17 is performed as occasion demands. And then, the difference between both the signals is operated. Moreover, an appropriate filtering processing or a statistical processing to the characteristic quantity (or the aforementioned difference between both the signals) is performed as occasion demands. The characteristic quantity of each shaft of the electric motor is calculated by performing the aforementioned process to each shaft of the electric motor. The abnormality judging section 18 judges the operation of the machine tool 11 to be in an abnormal state when a combination of the values of the characteristic quantities of each shaft is in a region showing an abnormal state of the working operation.

Although a feedback value of a drive current is used as the signal 15 and the signal 17, the signal 15 and the signal 17 may be one of a command value of the drive current of the electric motor, a command value of generated torque to the electric motor, a feedback value of the generated torque, or a combination of them including a feedback value of the drive current. Similar effects can be obtained by using the aforementioned signals.

EMBODIMENT 6.

Figure 9:
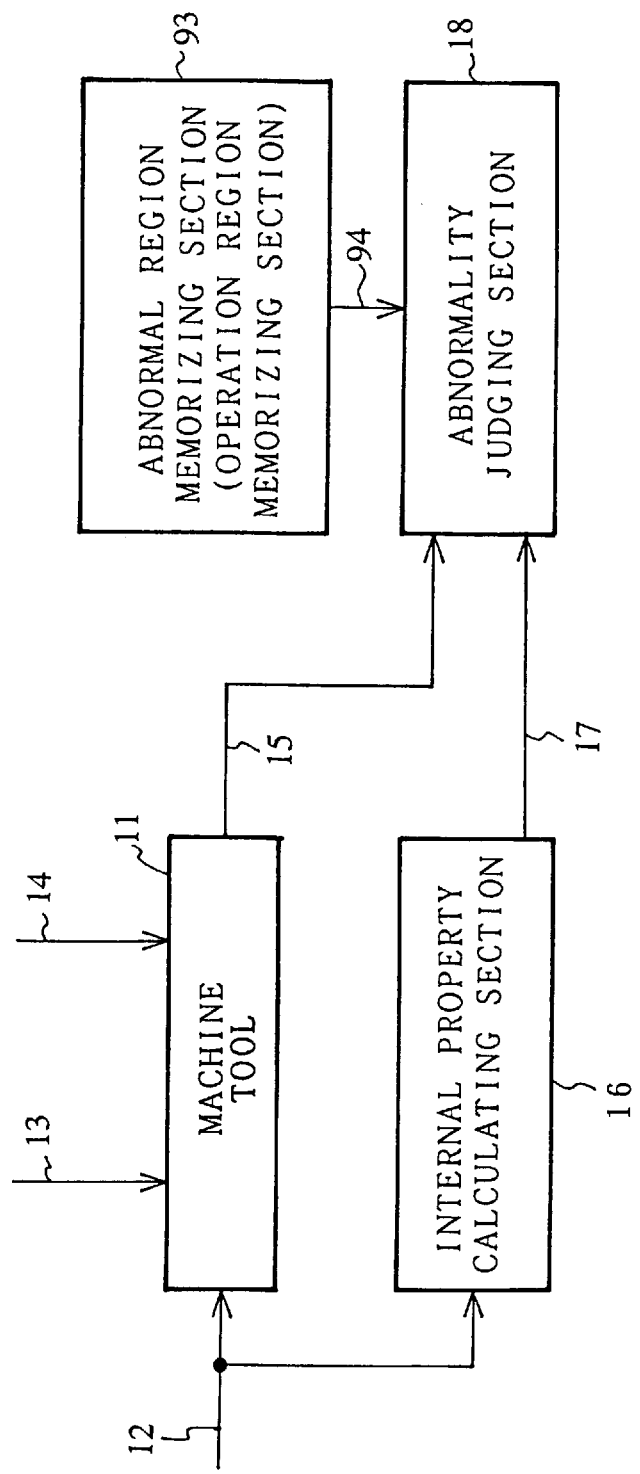
FIG. 9 is a block diagram showing the construction of a sixth embodiment (embodiment 6) of the present invention.

FIG. 9 is a block diagram showing the construction of the embodiment 6 of the present invention. In the figure, reference numeral 93 denotes an abnormal region memorizing section having previously memorized an abnormal region where characteristic quantities of internal properties at the time of an abnormal working operation of the machine tool 11 are distributed; reference numeral 94 denotes a signal representing an abnormal region and being outputted from the abnormal region memorizing section 94.

In operation, the drive and mechanism section of the machine tool 11 has a driving means for driving plural axes. And, the internal property calculating section 16 calculates the internal properties of the driving means to output the calculated internal properties as the signal 17. When the abnormality judging section 18 receives the signal 17, the section 18 calculates the characteristic quantity of the driving means for driving plural axes, and compares the calculated characteristic quantity with the signal 94 inputted from the abnormal region memorizing section 93 to judge whether the operation of the machine tool 11 is abnormal or not. The abnormality judging section 18 performs a filtering processing before comparing the signal 17 with the signal 94. The following filters are used for the filtering processing. That is to say, (1) a low-pass filter, the cut-off frequency of which does not exceed the cross frequency of the speed control section of the machine tool,
(2) a band-pass filter, the center frequency of which is equal to the resonance frequency of a tool in use, such as a mechanical system and a bit of the machine tool 11,
(3) a band-pass filter, the center frequency of which is equal to the revolution frequency of the main shaft of the machine tool 11 or a frequency obtained by multiplying the revolution frequency by an integer,
(4) a high-pass filter, the cut-off frequency of which does not exceed the resonance frequency of a mechanical system and a tool of the machine tool 11,
(5) a high-pass filter, the cut-off frequency of which does not exceed the revolution frequency of the main shaft of the machine tool 11 or a frequency obtained by multiplying the revolution frequency by an integer, or the like can be use in filtering processing in the abnormality judging section 18.

In the abnormal region memorizing section 93, plural abnormal regions corresponding to the kinds of abnormalities of the working operation of the machine tool 11 are memorized; the abnormality judging section 18 judges whether characteristic quantities of each shaft of the drive means of the machine tool 11 each are in each abnormal region or not for judging the abnormalities of the working operation.

Although the present embodiment judges the abnormality of a working operation by storing abnormal regions of the operation of the machine tool 11 in the abnormal region memorizing section 93, the judgement of the abnormality may be performed by storing normal regions of the working operation of the machine tool 11 in an operation region memorizing section and judging the working operation to be normal when characteristic quantities of plural axes are in the normal regions and to be abnormal when they are not in the normal regions.

Figure 10:
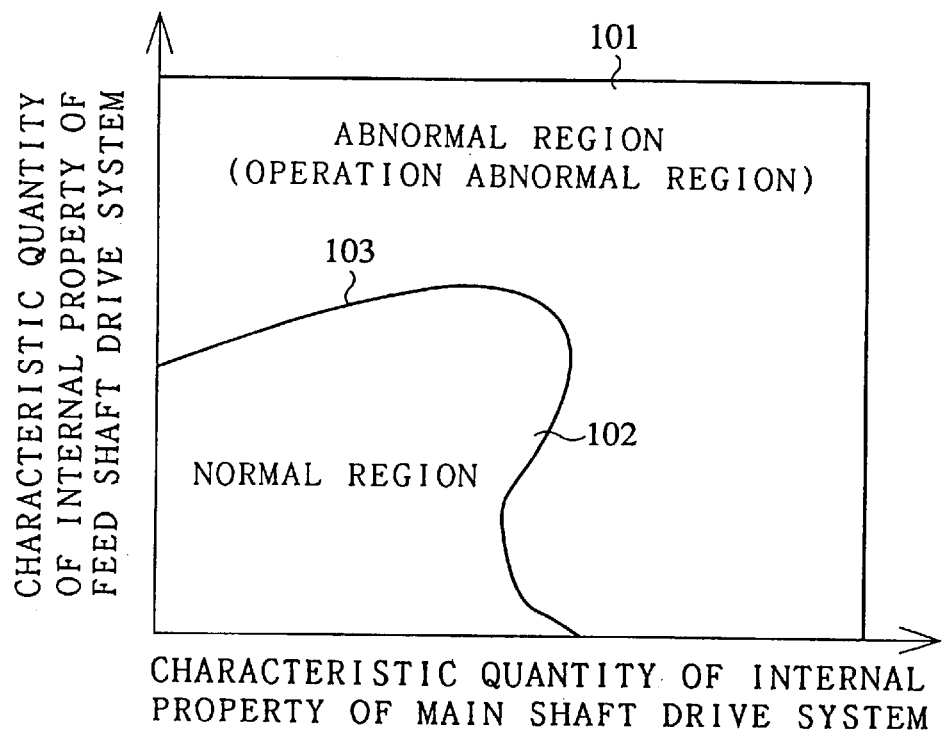
FIG. 10 is a region diagram showing a first actual example of an abnormal region of the embodiment 6.

FIG. 10 is a region diagram showing an actual example of an abnormal region. In the figure, reference numeral 101 denotes an abnormal region; reference numeral 102 denotes a normal region; and reference numeral 103 denotes the boundary between the abnormal region 101 and the normal region 102. If there are only an abnormal state and a normal state of working states as the present actual example, defining any one of the abnormal region 101, the normal region 102 or the boundary 103 determines the other two automatically. Accordingly it will do to define any of the aforementioned three.

Figure 11:
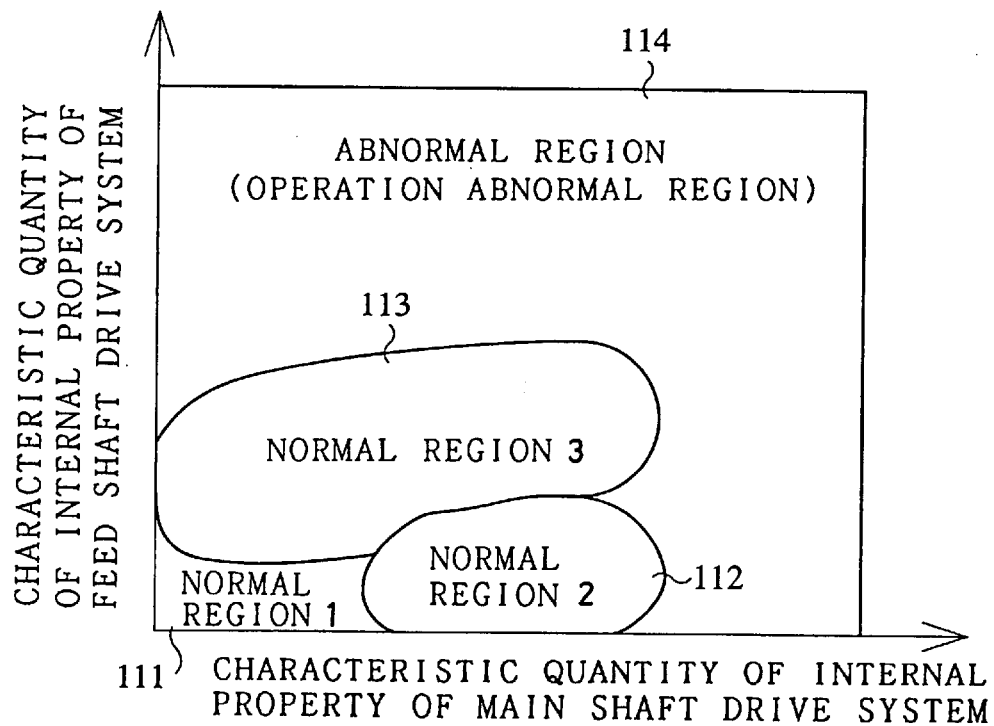
FIG. 11 is a region diagram showing a second actual example of an abnormal region of the embodiment 6.

FIG. 11 is a region diagram showing a second actual example of an abnormal region. In the figure, reference numeral 111 denotes a first normal region (normal region 1); reference numeral 112 denotes a second normal region (normal region 2); reference numeral 113 denotes a third normal region (normal region 3); and reference numeral 114 denotes an abnormal region. The present actual example is an example defining plural normal regions. Generally speaking, the number of regions regardless of being normal or abnormal is arbitrary. Plural regions are defined for classifying a state into some detailed states, for expressing a complicated shape of a region by combining simple shapes, or the like.

Figure 12:
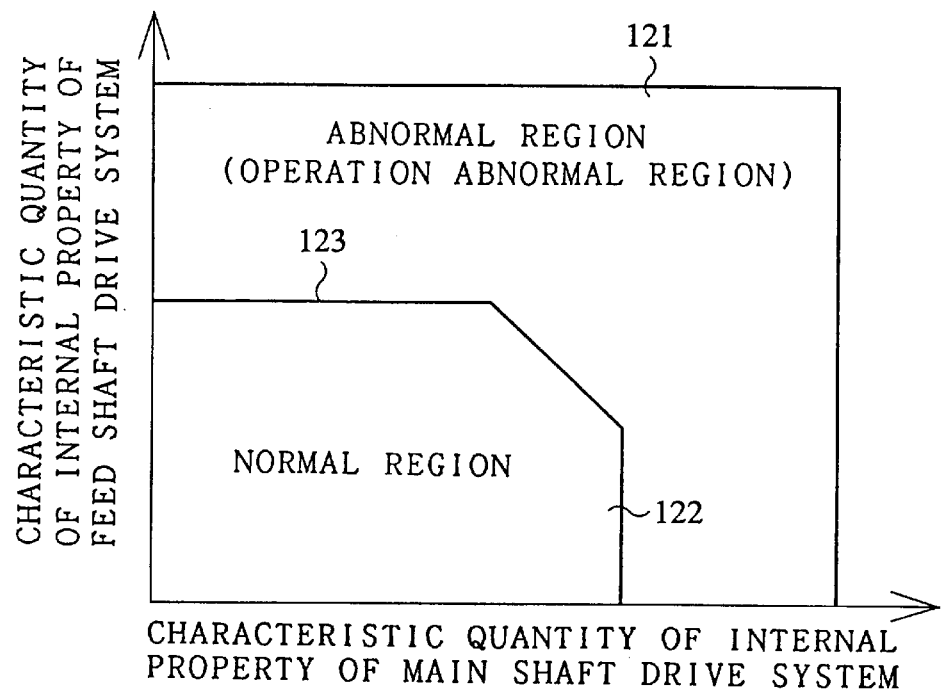
FIG. 12 is a region diagram showing a third actual example of an abnormal region of the embodiment 6.

FIG. 12 is a region diagram showing a third actual example of an abnormal region. In the figure, reference numeral 121 denotes an abnormal region; reference numeral 122 denotes a normal region; and reference numeral 123 denotes a boundary between the abnormal region 121 and the normal region 122. The shape of the normal region 122 is a pentagon. The shape of the boundary 123 is formed by adding a full line not perpendicular to each axis to full lines perpendicular to each axis. In many cases, data obtained theoretically or empirically can be utilized in obtaining the threshold values of each axis. For example, in case of drilling, Oxford expression, NATCO expression, MCTL expression and the like are known as an expression for determining a level at the normal time of drilling; these expressions are determined by a life adjustment factor for material of a work piece, working conditions and a shape of a bit. As for the level at the time of the breakage of a bit, it is difficult to determine simply because the states of stresses during drilling are various. But, an empirical expression concerning the case where the breakage of a bit is a torsional rupture caused by torque and a theoretical expression concerning the case where the breakage of a bit is buckling caused by a force in the direction of the shaft of the bit (z-axis) are known; both of them are determined by a life adjustment factor for material of a bit and the shape of the bit. On the other hand, the full line not perpendicular to each axis is determined by experiments or shaping the line so as to be analogous to a certain determined reference shape.

Figure 13:
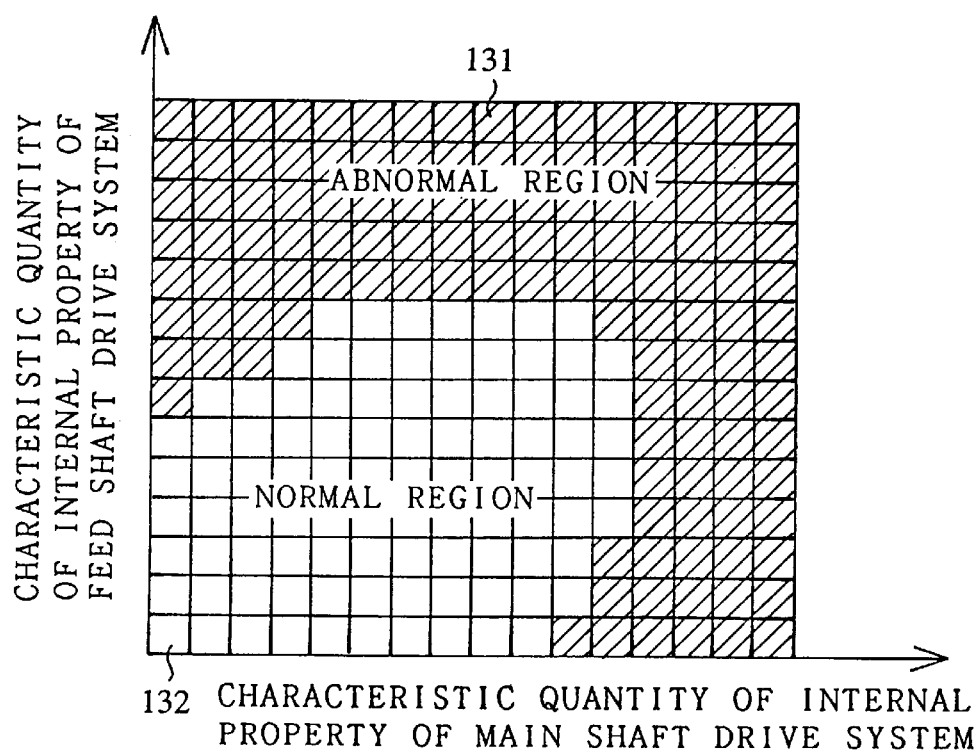
FIG. 13 is a region diagram showing a fourth actual example of an abnormal region of the embodiment 6.

The pentagonal shape is described above, but the shape is arbitrary providing that it is one modifying full lines perpendicular to each axis. For example, the following shapes will do: a polygon not less than a hexagon, a shape formed by adding an arbitrary shape to a polygon, a shape formed by performing a modification such as a revolution, a parallel shift, deformation and the like to a polygon or a shape formed by adding an arbitrary shape to a polygon. The present actual example is suitable for an object for defining a shape utilizing theoretical and empirical expressions and easy to be adjusted by experiments. FIG. 13 is a region diagram showing a fourth actual example of an abnormal region. In the figure, reference numeral 131 denotes an abnormal region; and reference numeral 132 denotes a normal region. The abnormal region 131 and the normal region 132 is set by combining segments composing a lattice. The present actual example fits to an object for defining a shape by experiments.

EMBODIMENT 7.

Figure 14:
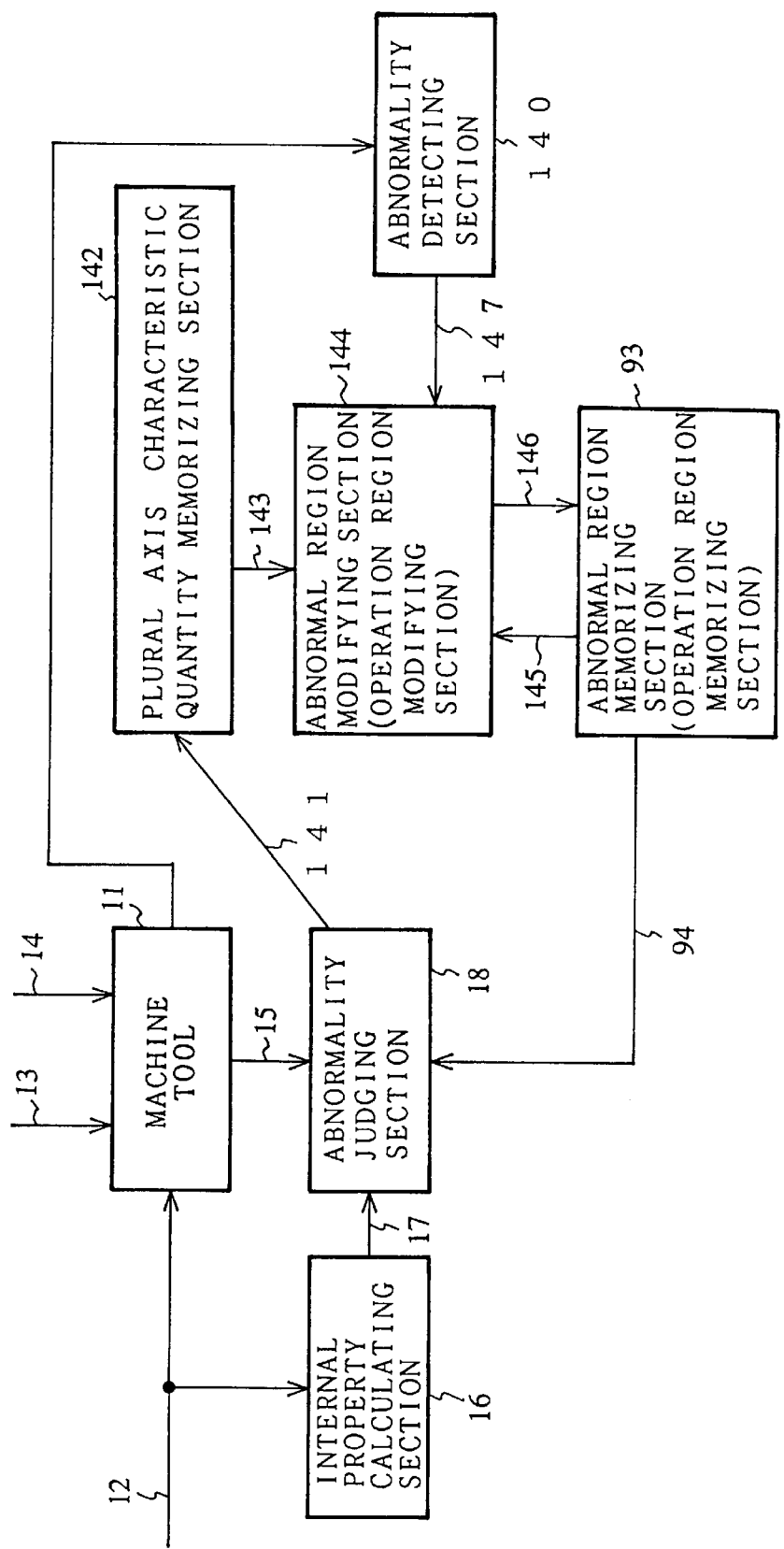
FIG. 14 is a block diagram showing the construction of a seventh embodiment (embodiment 7) of the present invention.

FIG. 14 is a block diagram showing the embodiment 7 of the present invention. In the figure, reference numeral 140 denotes an abnormality detecting section for detecting an abnormality of the machine tool 11; reference numeral 147 denotes an abnormality detection signal to be outputted from the abnormality detecting section 140 at a time of detecting an abnormality. Reference numeral 141 denotes a signal representing characteristic quantities of plural axes and being outputted from the abnormality judging section 18. Reference numeral 142 denotes a plural axis characteristic quantity memorizing section for memorizing plural axis characteristic quantities; reference numeral 143 denotes a plural axis characteristic quantity signal to be outputted from the plural axis characteristic quantity memorizing section 142; reference numeral 144 an abnormal region modifying section for modifying an abnormal operation region (or normal operation region in the case where a normal operation region is memorized in the abnormal region memorizing section 93 and the abnormality of the machine tool 11 is judged by referring to the normal operation region) memorized in the abnormality region memorizing section 93 on the basis of the plural axis characteristic signal 143; reference numeral 145 denotes a signal representing an abnormal region (or a normal region in the case where the abnormality of operation is judged by referring to the normal operation region) before being modified by the abnormal region modifying section 144; and reference numeral 146 denotes a signal representing an abnormal region (or a normal region) after being modified.

Figure 15:
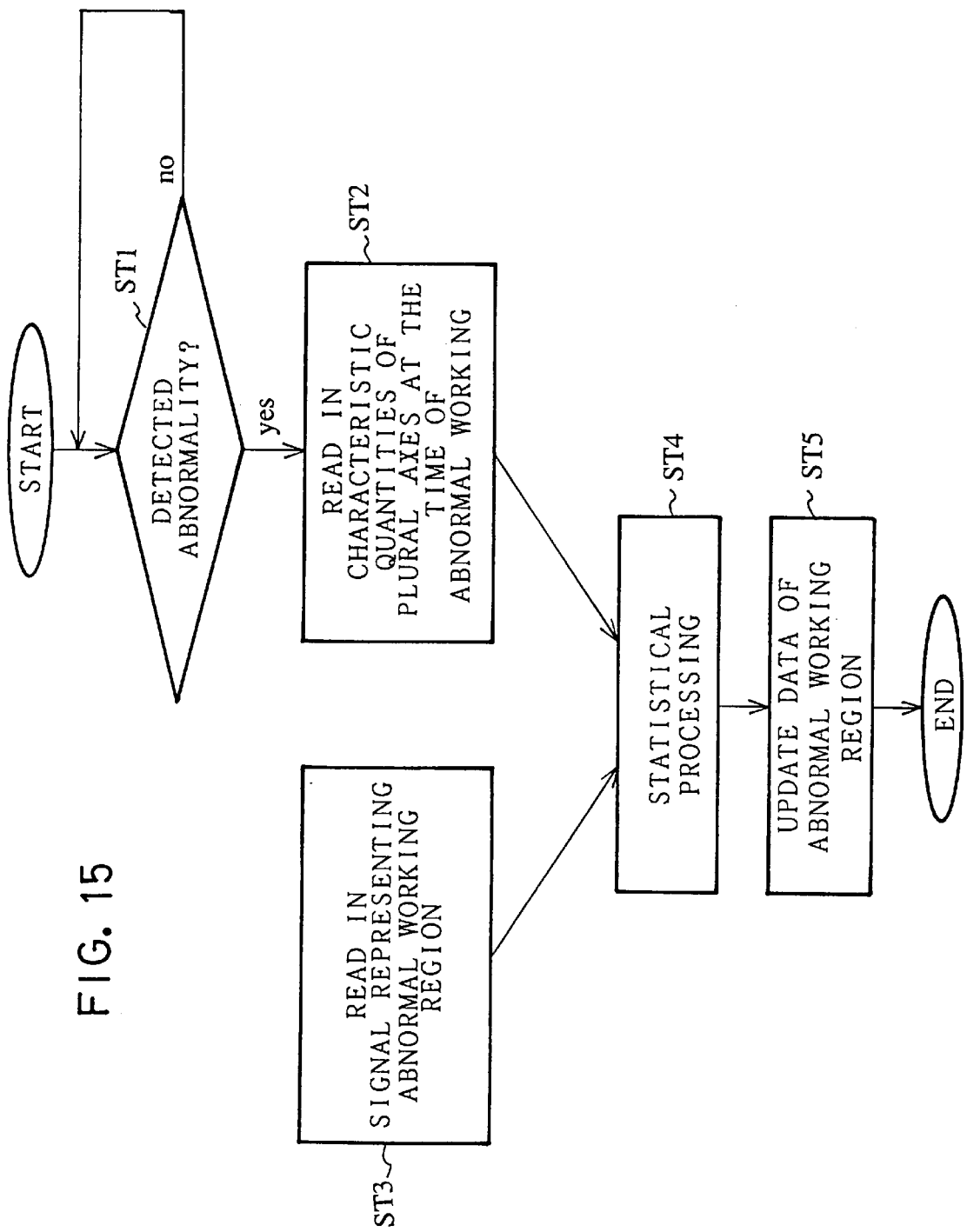
FIG. 15 is a flowchart showing the operation of the embodiment 7.

Next, the operation thereof will be described with reference to the flowchart of FIG. 15. When the operation is started and the abnormality detecting section 140 detects an abnormality of the working operation of the machine tool 11 to output the abnormality detection signal 147 to the abnormal region modifying section 144 at step ST1, the abnormal region modifying section 144 reads the plural axis characteristic quantity signal 143 at a time of abnormally working from the plural axis characteristic memorizing section 142 at step ST2. Moreover, the abnormal region modifying section 144 reads the signal 145 representing an abnormal working region before the modification from the abnormal region memorizing section 93 at the same time at step ST3, and the abnormal region modifying section 144 updates the data of an abnormal working region by statistically processing the data on the basis of the plural axes characteristic quantity signal 143 at the time of abnormally working and the signal 145 representing an abnormal working region before the modification at step ST4. The abnormal working region data after being updated are outputted to the abnormal region memorizing section 93 as the signal 146 representing an abnormal working region after the modification at step ST5.

Figure 16:
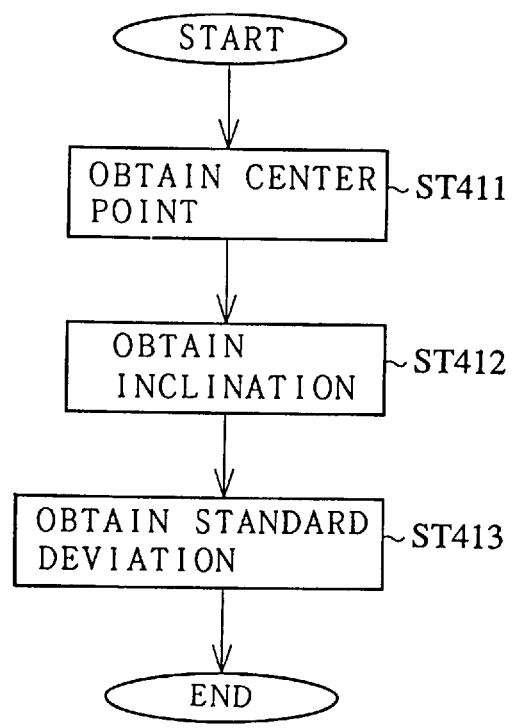
FIG. 16 is a flowchart showing a first actual example of the statistical processing step in FIG. 15.
Figure 17:
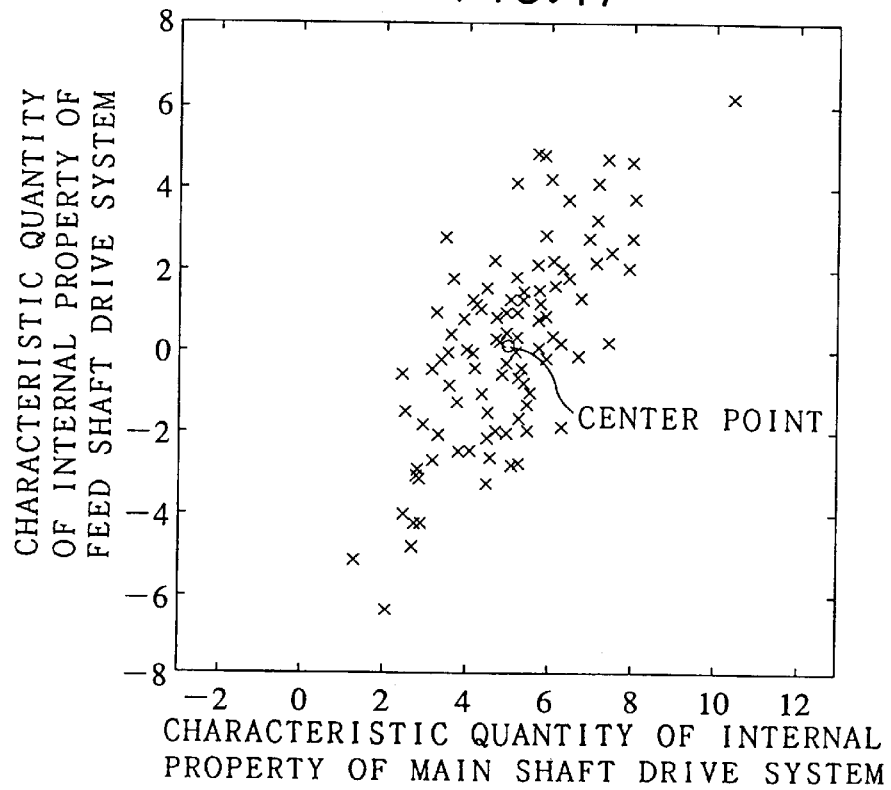
FIG. 17 is a distribution chart showing an example of the distribution state of characteristic quantity data of the embodiment 7.
Figure 18:
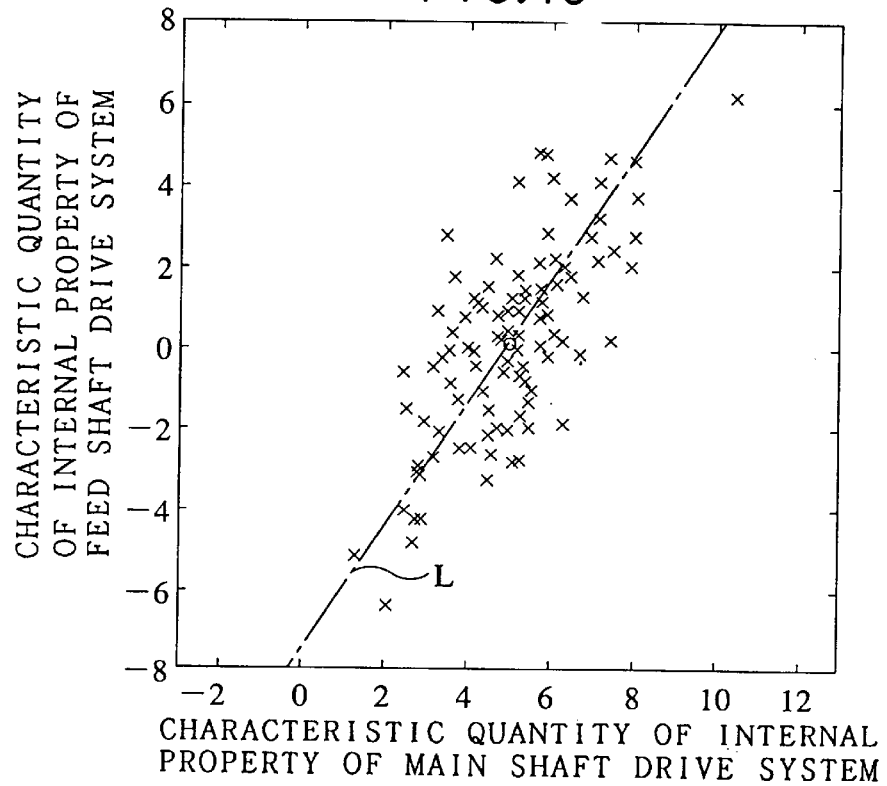
FIG. 18 is a distribution chart showing an example of the distribution state of characteristic quantity data of the embodiment 7.
Figure 19:
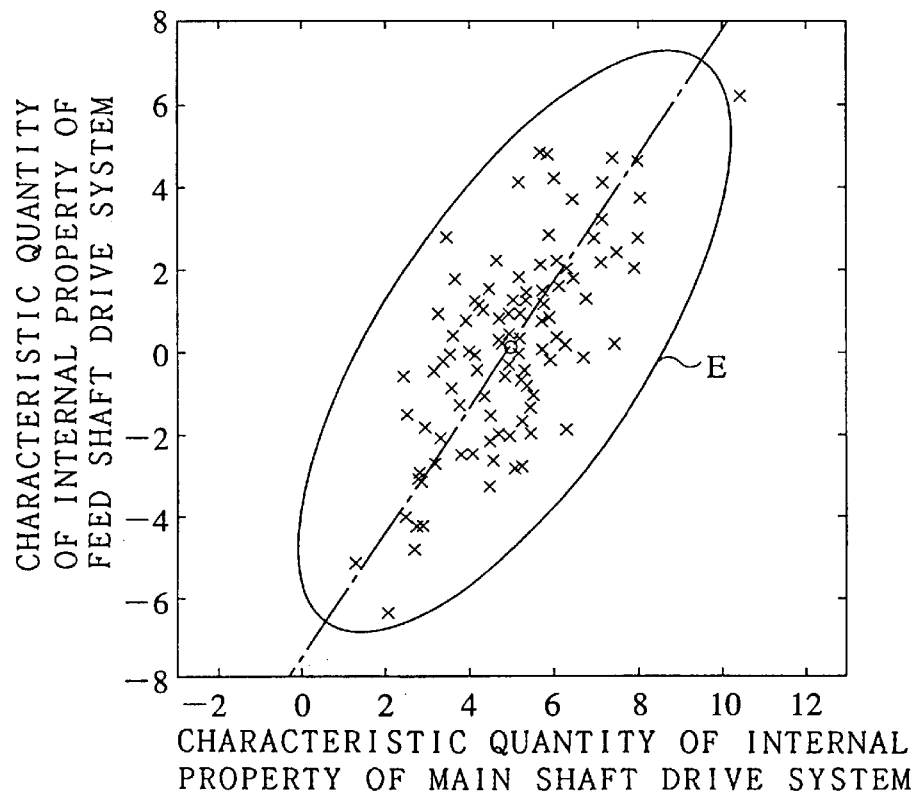
FIG. 19 is a distribution chart showing an example of the distribution state of characteristic quantity data of the embodiment 7.

Next, a first actual example of the statistical processing at step ST4 in FIG. 15 will be described with reference to the flowchart of FIG. 16. FIG. 16 is a flowchart showing a process of the statistical processing in the case where a region in which working abnormalities are generated is represented by an ellipse approximately. In the process shown in FIG. 16, each parameter of an ellipse, which are a center, an inclination and the lengths of each axis are determined in order. In the figure, at first, a center point of the data of the signal 143 representing plural axis characteristic quantities at the time of abnormal working and the signal 145 representing an abnormal working region before modifying is obtained as shown in FIG. 17 at step ST411. After this calculation, the value of the center point is subtracted from each plural characteristic quantity. As a result of that, the center of the distribution of the plural axis characteristic quantities is at the origin. Next, the inclination of the datum group is calculated from the plural axis characteristic quantity signal 143 as shown by the dashed line L in FIG. 18 at step ST412. After this calculation, the component of the inclination is corrected by the data of plural axis characteristic quantities. As a result of that, the distribution of the plural axis characteristic quantities becomes a distribution long from side to side and parallel to one of the axes. Furthermore, at step 413, the standard deviation of each axis is calculated. The lengths of each axis of the ellipse shown by a full line in FIG. 19 is set by multiplying the calculated standard deviation by a constant. The multiplication constant is ordinarily about 3. Enlarging the constant makes the ellipse larger and increases the number of the data contained in the ellipse, but it means that the region is set to be large unnecessarily.

In case of the actual example, the data of an abnormal working region is a center, an inclination and the lengths of each axis all of which are parameters of an ellipse, but in addition the data of plural axis characteristic quantities used for the modification of an abnormal region or intermediate results (or square sums of each characteristic quantity and mutual characteristic quantities at each of the aforementioned steps) used at the calculation are stored in the abnormal region memorizing section 93 as the data of the abnormal working region or the data other than that.

Figure 20:
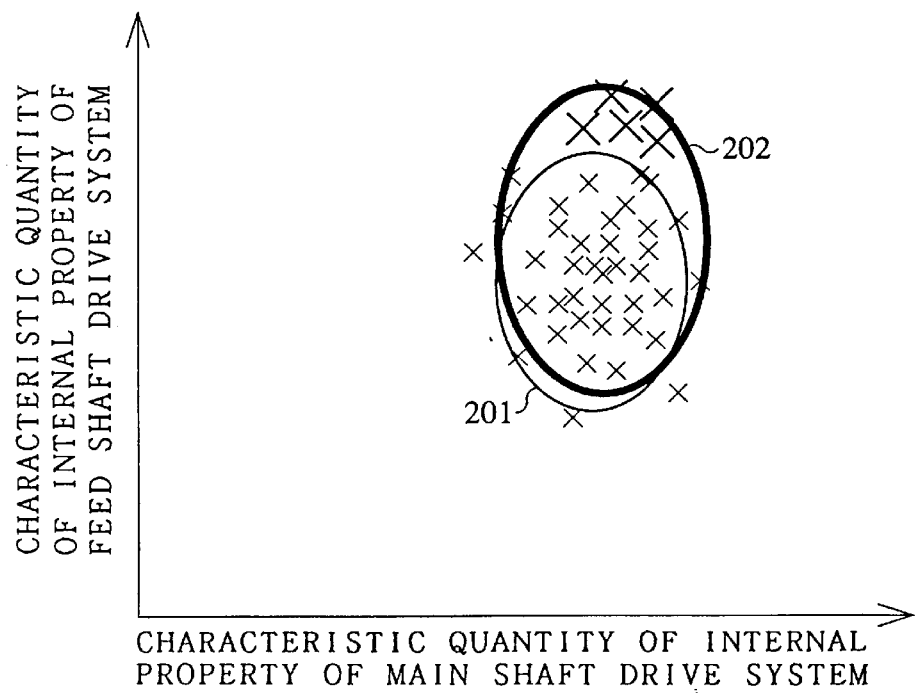
FIG. 20 is a region diagram showing a result of modifying an abnormal working region in conformity with the method of the first actual example of the statistical processing shown in FIG. 16.

FIG. 20 is a region diagram showing a result of modifying an abnormal working region in conformity with the aforementioned method of the first actual example of the statistical processing. In the figure, reference numeral 201 denotes an abnormal working region before the modification; reference numeral 202 denotes an abnormal working region after the modification. It is apparent from the figure that the abnormal working region after the modification 202 is set so as to contain almost all of the characteristic quantities in an abnormal state before the modification (small x) and added characteristic quantities in an abnormal working (large X).

The statistical processing method of the actual example was described about the modification of an abnormal working region, but the method is of course applicable to the modification of a region corresponding to an arbitrary working state.

Figure 21:
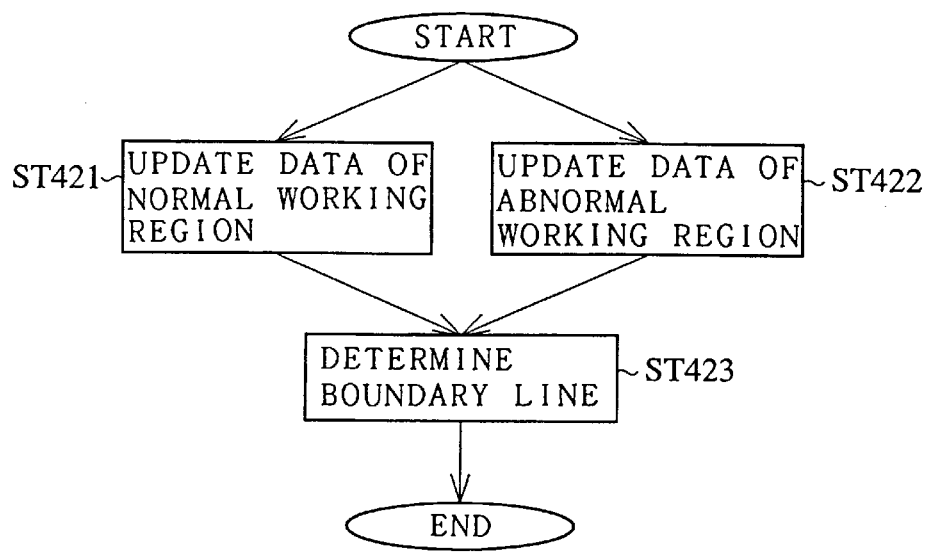
FIG. 21 is a flowchart showing a second actual example of the statistical processing step in FIG. 15.

A second actual example of the statistical processing at step ST4 of FIG. 15 will be described with reference to the flowchart of FIG. 21. FIG. 21 is a flowchart showing a process of the statistical processing in case of using a straight line as an approximation of the boundary between a normal working region and an abnormal working region. At first, the data of a normal working region and the data of an abnormal working region are updated in conformity with the aforementioned method of the first actual example of the statistical processing at steps ST421 and ST422. Next, a straight line which passes on a point on a line segment in a narrow space between the updated normal working region and the updated abnormal working region and has an inclination so that the straight line does not intersect both the regions is selected on the basis of the data of both the regions as a boundary.

Figure 22:
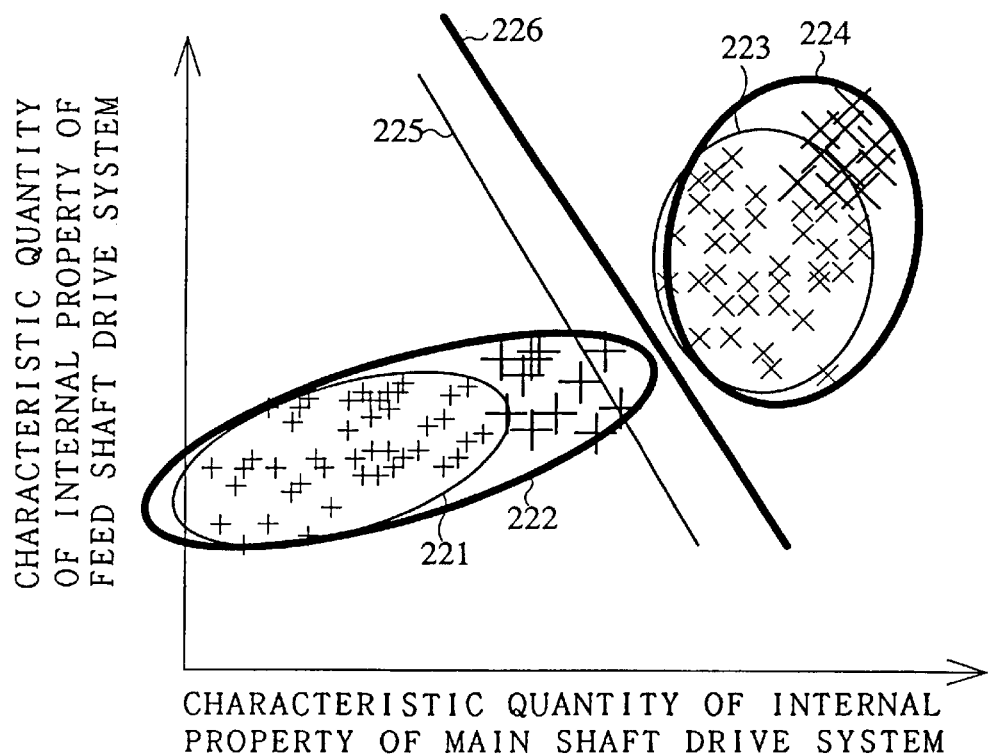
FIG. 22 is a region diagram showing a result of modifying a boundary line in conformity with the method of the second actual example of the statistical processing shown in FIG. 21.

FIG. 22 is a region diagram showing a result of modifying a boundary line in conformity with the method of the second actual example of the statistical processing. In the figure, reference numeral 221 denotes a normal working region before modification; reference numeral 222 denotes a normal working region after modification; reference numeral 223 denotes an abnormal working region before modification; reference numeral 224 denotes an abnormal working region after modification; reference numeral 225 denotes a boundary before modification; and reference numeral 226 denotes a boundary after modification. It is apparent that the boundary after modification is set so as to separate the normal working region after modification 222 and the abnormal working region after modification 224 on the basis of both the regions. In the figure, small + denotes a characteristic quantity in a normal working state before modification; large + denotes an added characteristic quantity in a normal working state; small x denotes a characteristic quantity in an abnormal working state; and large x denotes an added characteristic quantity in an abnormal working state.

The modification of a boundary between a normal working region and an abnormal working region was described. The method of the actual example is of course applicable to a boundary between two regions corresponding to arbitrary two working states.

Figure 23:
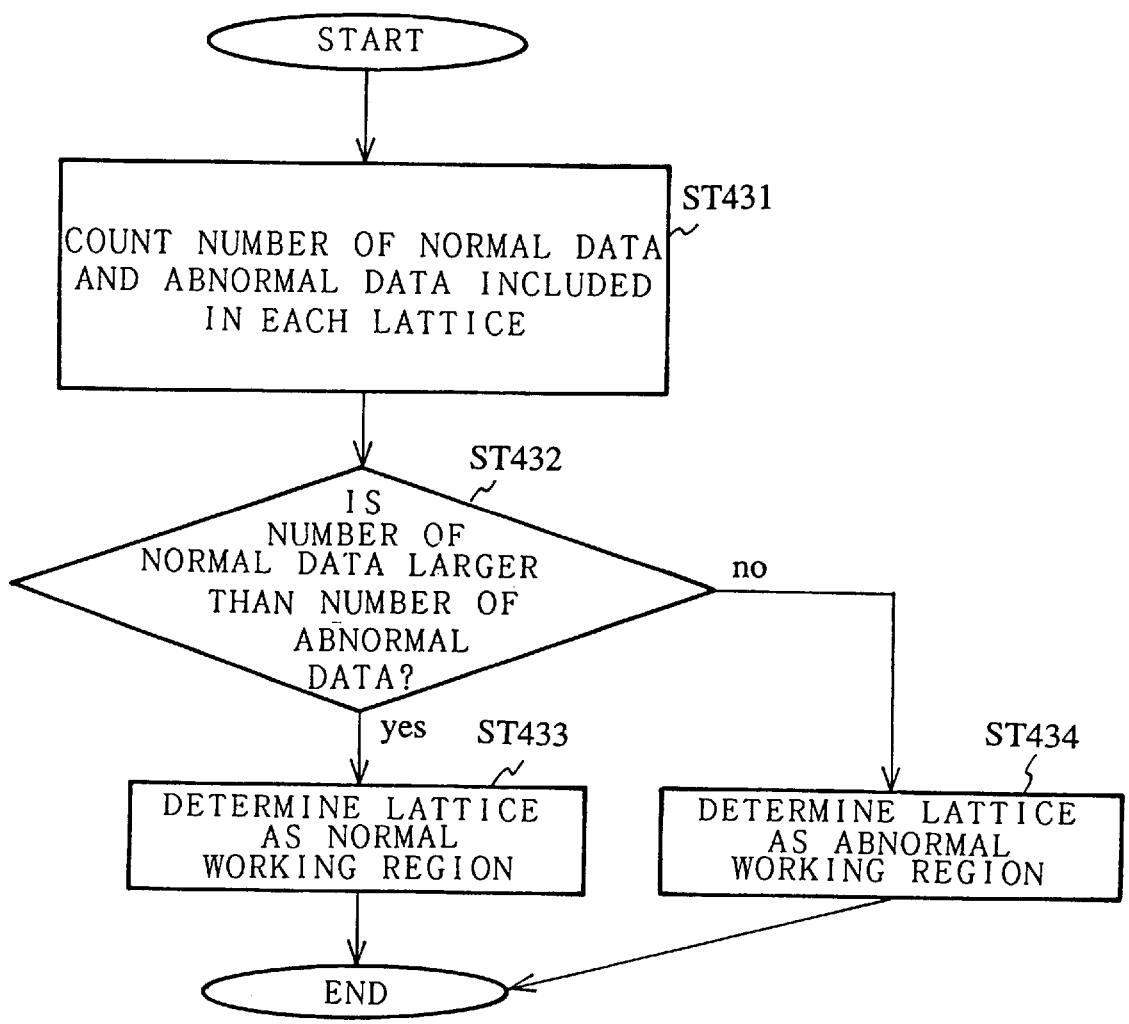
FIG. 23 is a flowchart showing a third actual example of the statistical processing step in FIG. 15.

A third actual example of the statistical processing at step ST4 in FIG. 14 will be described with reference to the flowchart of FIG. 23. FIG. 23 is a flowchart showing a process of the statistical processing in case of defining a normal working region and an abnormal working region by combining segments constituting a lattice. At first, the numbers of normal working data and abnormal working data contained in each segment are counted at step ST431. Next, the counted numbers of normal working data and abnormal working data are compared at step ST432. If the result of the comparison at step ST432 shows that the number of normal working data is larger than the number of abnormal working data, the segment is defined as a normal working region; if not so, the segment is defined as an abnormal working region.

Figure 24:
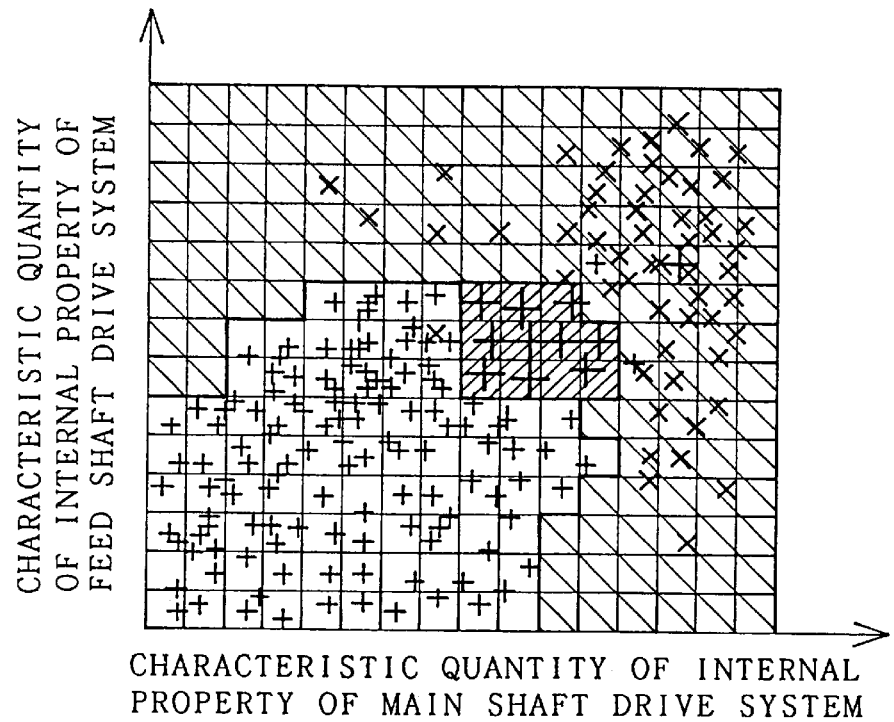
FIG. 24 is a region diagram showing a result of modifying a normal working region and an abnormal working region in conformity with the method of the third actual example of the statistical processing shown in FIG. 23.

FIG. 24 is a region diagram showing a result of modifying a normal working region and an abnormal working region in conformity with the method of the third actual example of the statistical processing. In the figure, since the number of the characteristic quantity data of normal working sates becomes larger than the number of the characteristic quantity data in abnormal working states due to the added characteristic quantity data in normal working states in each segment represented by oblique lines, the segments are added to the normal working region from the abnormal working region. In the figure, a segment having no datum is regarded as an abnormal region. Besides, segments left in white denote normal working regions before modification; segments widely hatched with oblique lines denote abnormal working regions; segment s narrowly hatched with oblique lines denote segments added to the normal working region after modification; small + denotes a characteristic quantity in a normal working state before modification; large + denotes an added characteristic quantity in a normal working state; and small x denotes a characteristic quantity in an abnormal working state before modification.

The modification of the abnormal working region and the normal working region defined by combining segments composing a lattice was described. But, the method of the actual example is of course applicable to regions corresponding to arbitrary plural working states. In this case, the state of each segment is defined by a state represented by data the number of which is largest among the numbers of data contained in each of the segments. In case of defining three working states or more, there is a case where a state having the largest number of data does not have a large majority of data among the whole data contained in a segment and the largest number is not so different from the numbers of the other states. In such a case, the state of the segment may not be determined because the segment has no notable characteristic. Moreover, a segment containing no datum may be regarded as one of the predetermined states, or may not be determined as not modified.

EMBODIMENT 8.

Figure 25:
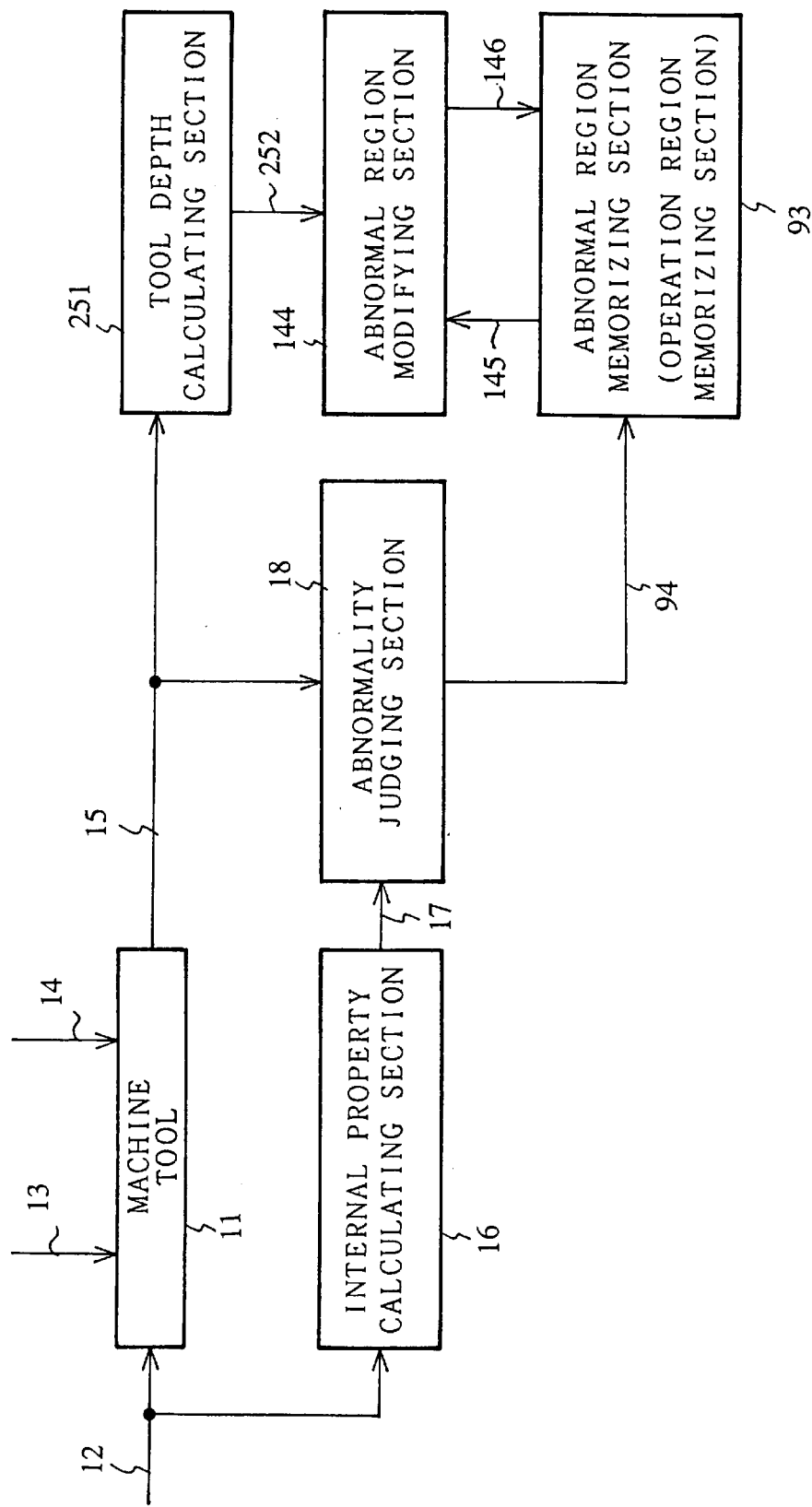
FIG. 25 is a block diagram showing the construction of an eighth embodiment (embodiment 8) of the present invention.

FIG. 25 is a block diagram showing the construction of the embodiment 8 of the present invention. In the figure, reference numeral 251 denotes a tool depth calculating section for calculating a tool depth from the surface of a work piece to the blade tip of a tool or the end of the periphery of the tool; reference numeral 252 denotes a signal representing a tool depth calculated by the tool depth calculating section 251.

In operation, the tool depth calculating section 251 calculates a tool depth on a basis of the internal property signal 15 outputted from the machine tool 11 to output the calculated tool depth to the abnormal region modifying section 144 as the signal 251. The abnormal region modifying section 144 calculates a modifying value of an abnormal region on the basis of the received tool depth signal 252 to output the calculated modifying value to the abnormal region memorizing section 93 as the abnormal region signal 146. An abnormal region memorized in the abnormal region memorizing section 93 is modified in conformity with the abnormal region signal 146.

Figure 26:
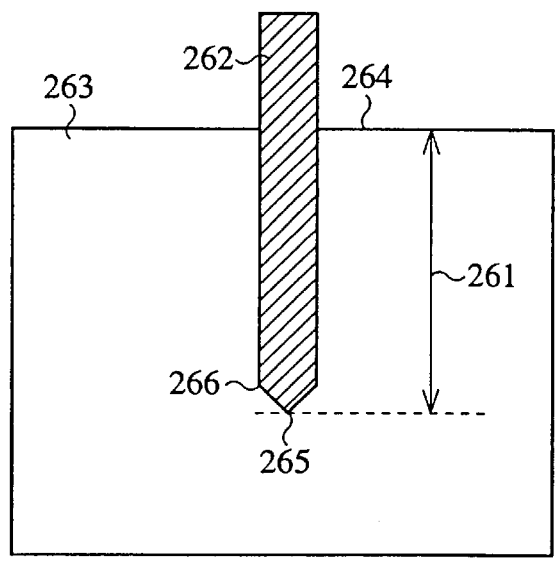
FIG. 26 is an explanatory view for the illustration of the depth of a tool.

Next, the tool depth calculating operation of the tool depth calculating section 251 will be described in detail. At first, FIG. 26 is an explanatory view for the illustration of the tool depth. In the figure, reference numeral 261 denotes a tool depth in case of using the distance from the surface of a work piece to a blade tip as the tool depth; reference numeral 262 denotes a tool such as a bit; reference numeral 263 denotes a work piece being worked by the machine tool 11; reference numeral 264 denotes a surface of the work piece 263; reference numeral 265 denotes the blade tip of the tool 262; reference numeral 266 denotes the periphery end of the tool 262. Since the length from the blade tip 265 to the periphery end 266 in the direction of depth is determined by the shape of a tool and does not vary in accordance with time, the length from the surface 263 to the periphery end 266 may be used as the tool depth. The tool depth 261 is a value varying in accordance with time; the value is zero until the blade tip touches the surface 264, and increases in accordance with the advance of the tool 262 to the target hole depth position direction.

Figure 27:
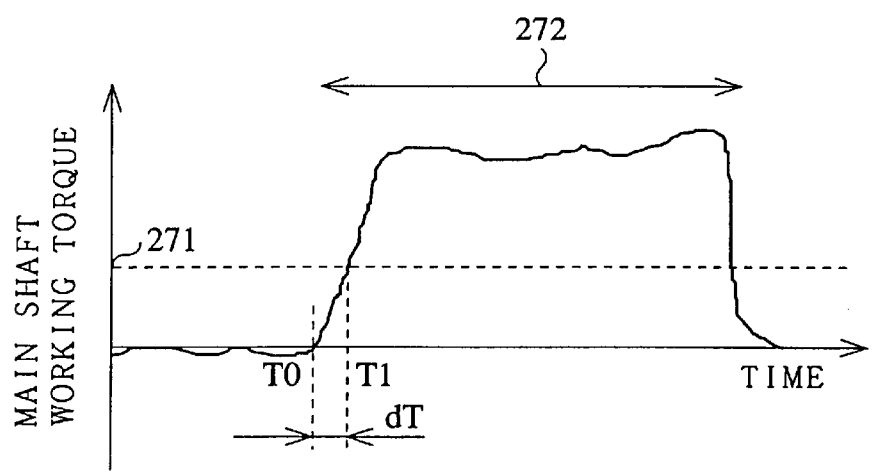
FIG. 27 is a waveform diagram showing the principle of the detection of the touch of the blade tip to a work piece.

FIG. 27 is a waveform diagram showing the principle of the detection of the touch of the blade tip 265, which diagram shows a time waveform of the main shaft working torque of the machine tool 11. Since the main shaft working torque takes a large value while working, the rising of the torque is detected by setting an appropriate threshold value 271. Reference character T1 denotes a time when the rising is detected. Since the rising time dT from the time T0 when the blade tip 265 touches the surface 264 of the work piece 263 to the time T1 can be calculated from the inclination of the rising part, which is determined by the shape of the blade tip 265 of a tool and a feed speed, and the threshold value 271, the time T0 is obtained by subtracting the rising time dT from the time T1. The tool depth calculating section 251 calculates the difference between the position of the tool 262 in the feed shaft direction at the present time and the position thereof in the feed shaft direction at the time T0 when the blade tip 265 touches the surface 264, and sets the value of the difference as the tool depth 261. Reference numeral 272 denotes a period of time of the working operation of the machine tool 11. In this example, the tool depth is obtained by using the main shaft working torque, but any internal property can be used providing that it varies in a step-like state while working. For example, a feed shaft working force will do.

Figure 28:
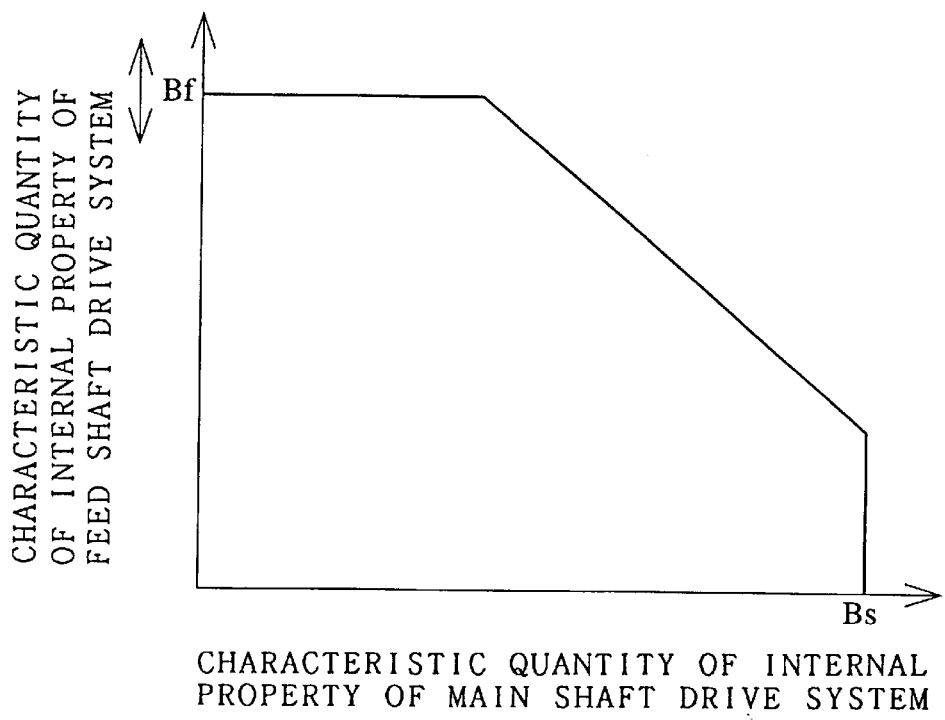
FIG. 28 is a region diagram for the illustration of the modification of a region at the time of just before breakage.

Next, the operation of the abnormal region modifying section 144 will be described by using an example of the modification of a region at the time of just before breakage of the tool 262. FIG. 28 is a region diagram for the illustration of the modification of a region at the time of just before breakage. The boundary between the normal working region and the region at the time of just before breakage is given a pentagon, the intersection of which with the axis of abscissa is Bs and the intersection of which with the axis of ordinates is Bf. Supposing that the breakage phenomenon is caused by buckling, the breakage level in the feed shaft direction is expressed by the following expression.

$$Bf = \pi \times 2 \times E \times Iz/(K^2 \times L^2) \quad (1)$$

In the expression (1), reference letter E denotes the modulus of longitudinal elasticity, and reference letter Iz denotes the geometrical moment of inertia, which is constant in view of time. On the other hand, reference letter K denotes a non-dimensional number having different values in accordance with the support states of the tool 262. The value of K is 0.7 when the blade tip 262 can be regarded as only a supporting end at the time of just after it touches the surface 264, and is 0.5 when the blade tip 262 can be regarded as a fixed end after it completely enter the working piece 263. Reference letter L denotes the length from a tool holder not shown to the surface 264 of the working piece 263; the length L is equal to the length from the tool holder to the blade tip 265 (extrusion quantity) until the blade tip 265 touches the surface 264, and is equal to the value obtained by subtracting the tool depth 261 from the extrusion quantity after the touch. To put in order, since the non-dimensional number K and the length L vary in accordance with the variation of the tool depth 261 with time, the breakage level Bf also varies. Consequently, the intersection of the axis of ordinates Bf varies in conformity with the expression (1). Since the intersection of the axis of abscissa Bs is not related to the tool depth 261 because it is the torque in the torsional direction of the tool, it is fixed. The inclined line portion in the figure is the region at the time of just before the breakage.

EMBODIMENT 9.

Figure 29:
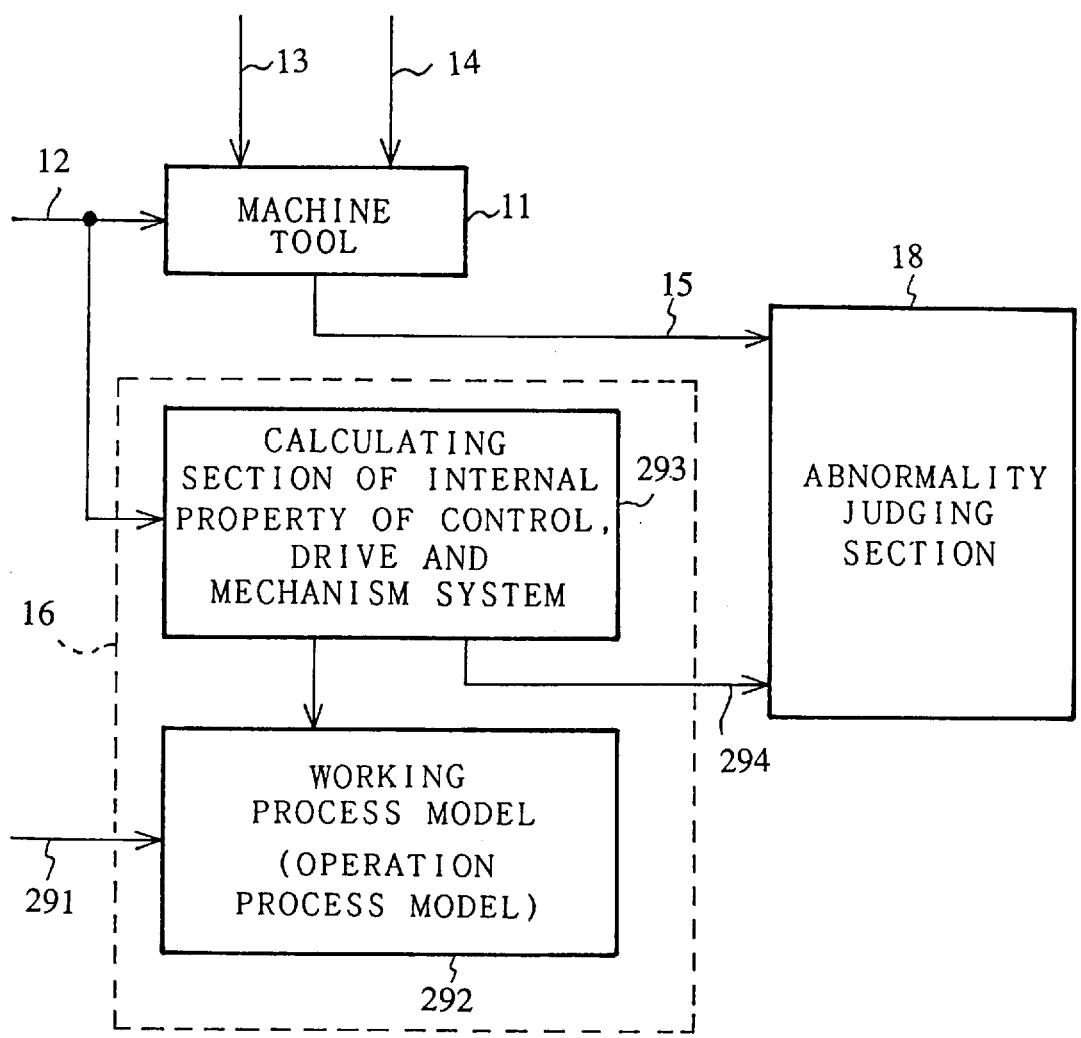
FIG. 29 is a block diagram showing the construction of a ninth embodiment (embodiment 9) of the present invention.

FIG. 29 is a block diagram showing the construction of the embodiment 9 of the present invention. In the figure, reference numeral 291 denotes a signal representing a working condition being a condition under which the machine tool 11 operates; reference numeral 292 denotes a working process model (operation process model) being a model of the working operation process of the internal property calculating section 16 in the machine tool 11; reference numeral 293 denotes an internal property calculating section for calculating internal properties of the control system, the drive system and the mechanism system of the machine tool 11; and reference numeral 294 denotes a signal representing internal properties calculated by the internal property calculating section 293. Internal property calculating section 16 has a working process model 292 in addition to the internal property calculating section 292.

In operation, the signal 291 representing a working condition such as the feed speed and the revolution number of the main shaft of the machine tool 11 is inputted into the working process model 292, and the working process model 292 performs the making of a model of a working process while considering the calculation of the internal property calculating section 293, too. The internal property calculating section 293 calculates internal properties of the control system, the drive system and the mechanism system on the basis of a working process model modeled by the working process model 292. The abnormality judging section 18 performs the abnormality judging of the operation of the machine tool 11 on the basis of the signal 15 representing the internal properties of the machine tool 11 and the signal 294 representing the internal properties calculated by the internal property calculating section 293 in the internal property calculating section 16.

The information which the internal property calculating section 293 and the working process model 292 mutually exchange differs according to the kinds of the working process model 292. For example, if the working process model 292 is a model receiving a working condition and a speed at the position of the blade tip of a tool as the input signal 291 and outputting a feed shaft working force or the main shaft working torque at the time of performing a normal cutting, the internal property calculating section 293 inputs the speed at the position of the blade tip of a tool into the working process model 292, and the working process model 292 inputs the normal value of the feed shaft working force or the main shaft working torque into the internal property calculating section 293. In the embodiment 1, the internal property calculating section 16 calculates the internal properties in case of lacking the disturbance 13, but the present embodiment having the normal feed shaft working force or main shaft working torque, and consequently, the present embodiment calculates the internal properties in case of assuming that normal cutting is performed. And then, the difference between the internal property 15 of the machine tool 11 and the internal property 294 of the internal property calculating section 293 does not include the components by a normal working, but includes only the components by an abnormal working.

As for other kinds of the working process model 292, a working process model having regard to wear, a working process model having regard to temperature, or a working process model having regard to both of them can be considered. In these cases also, the working process model receives a working condition and a speed at the point of the blade tip position as the input signal 291, and outputs a feed shaft working force or the main shaft working torque. The feed shaft working force and the main shaft working torque to be outputted are the feed shaft working force and the main shaft working torque including the increment due to wear, the feed shaft working force and the main shaft working torque including the increment due to temperature, and the feed shaft working force and the main shaft working torque including the increment due to wear and temperature, respectively. The difference between the internal property 15 of the machine tool 11 and the internal property 294 of the internal property calculating section 293 in these cases does not include the components due to wear, temperature or both of them as well as the component due to normal working, but includes only the components due to the other abnormal working.

EMBODIMENT 10.

In the embodiment 9, the working process model 292 is included in the internal property calculating section 16; in the embodiment 10, the working process model 292 is included in the abnormality judging section 18, and the working process model 292 and the internal property calculating section 16 mutually input information into each other.

EMBODIMENT 11.

Figure 30:
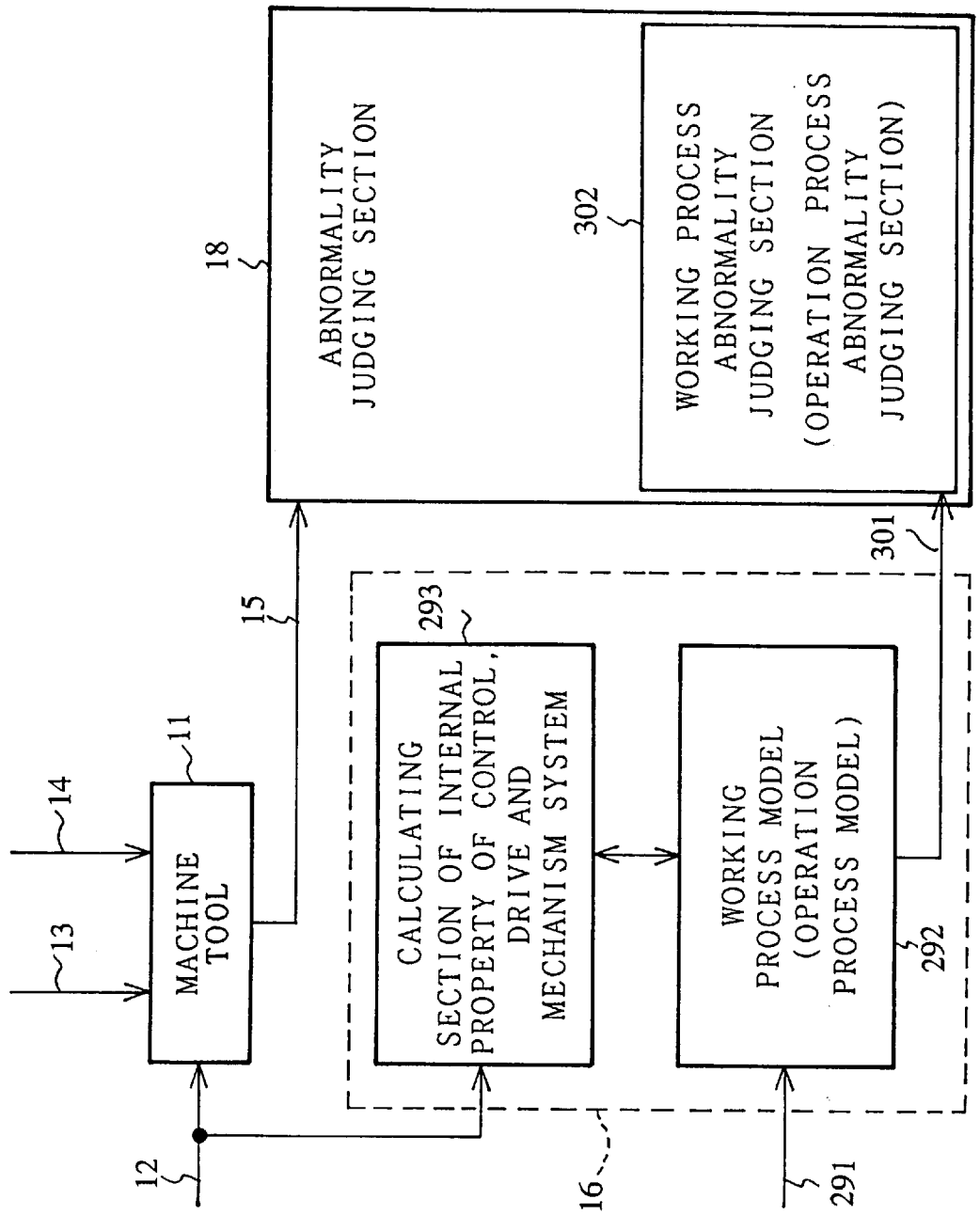
FIG. 30 is a block diagram showing the construction of an eleventh embodiment (embodiment 11) of the present invention.

FIG. 30 is a block diagram showing the construction of the embodiment 11 of the present invention. In the figure, reference numeral 301 denotes a signal representing an internal property of the working process model 301; reference numeral 302 denotes a working process abnormality judging section for judging the existence of abnormalities in the working process of the machine tool 11 on the basis of the signal 301 representing an internal property of the working process model 292.

In operation, the working process abnormality judging section 302 performs the abnormality judgement of the machine tool 11 on the basis of the signal 301 representing an internal property of the working process model 292. For example, a wear quantity or blade tip temperature of a tool is selected as the internal property 301 of the working process model 292; the working process abnormality detecting section 302 performs the abnormality judging of the life of a tool or the seizure of a tool from the wear quantity or the blade tip temperature of a tool respectively.

EMBODIMENT 12.

In the embodiment 9, the working process model 292 is included in the internal property calculating section 16; in the embodiment 12, the working process model 292 is included in the abnormality judging section 18, and the working process model 292 and the internal property calculating section 16 mutually input the aforementioned information into each other. The other parts are the same as those of the embodiment 11.

EMBODIMENT 13.

Figure 31:
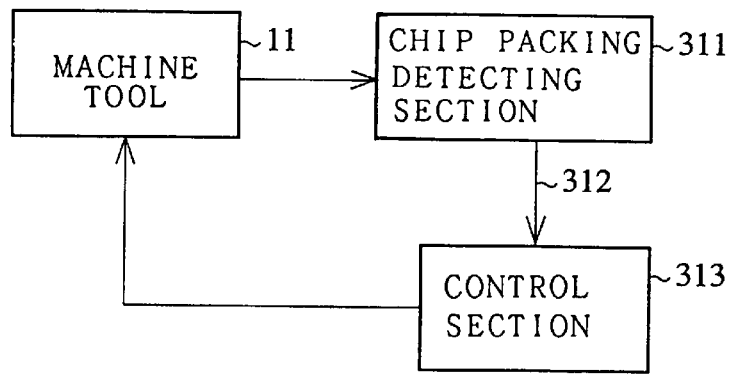
FIG. 31 is a block diagram showing the construction of a thirteenth embodiment (embodiment 13) of the present invention.

FIG. 31 is a block diagram showing the construction of the embodiment 13 of the present invention. In the figure, reference numeral 311 denotes a chip packing detecting section for detecting the chip packing of a tool of the machine tool 11; reference numeral 312 denotes a chip packing detection signal to be outputted at the time when the chip packing detecting section 311 detects chip packing; and reference numeral 313 denotes a control section for controlling the operation of the machine tool 11.

In operation, the chip packing detecting section 311 outputs the chip packing detection signal 312 to the control section 313 when chip packing is generated. When the chip packing detection signal 312 is inputted into the control section 313, the control section 313 controls the machine tool 11 so that a tool of the machine tool 11 is fed in conformity with a step feed having an every time feed quantity which does not exceed at least the present feed quantity at every time. If a tool reaches to a target hole depth position only one time feed, the step feed is regarded as one the feed quantity at every time of which is equal to the length up to the target hole depth position and the times of feed of which is one, and the control section controls the machine tool 11 so as to perform a step feed having a step shorter than the regarded feed quantity.

Figure 32:
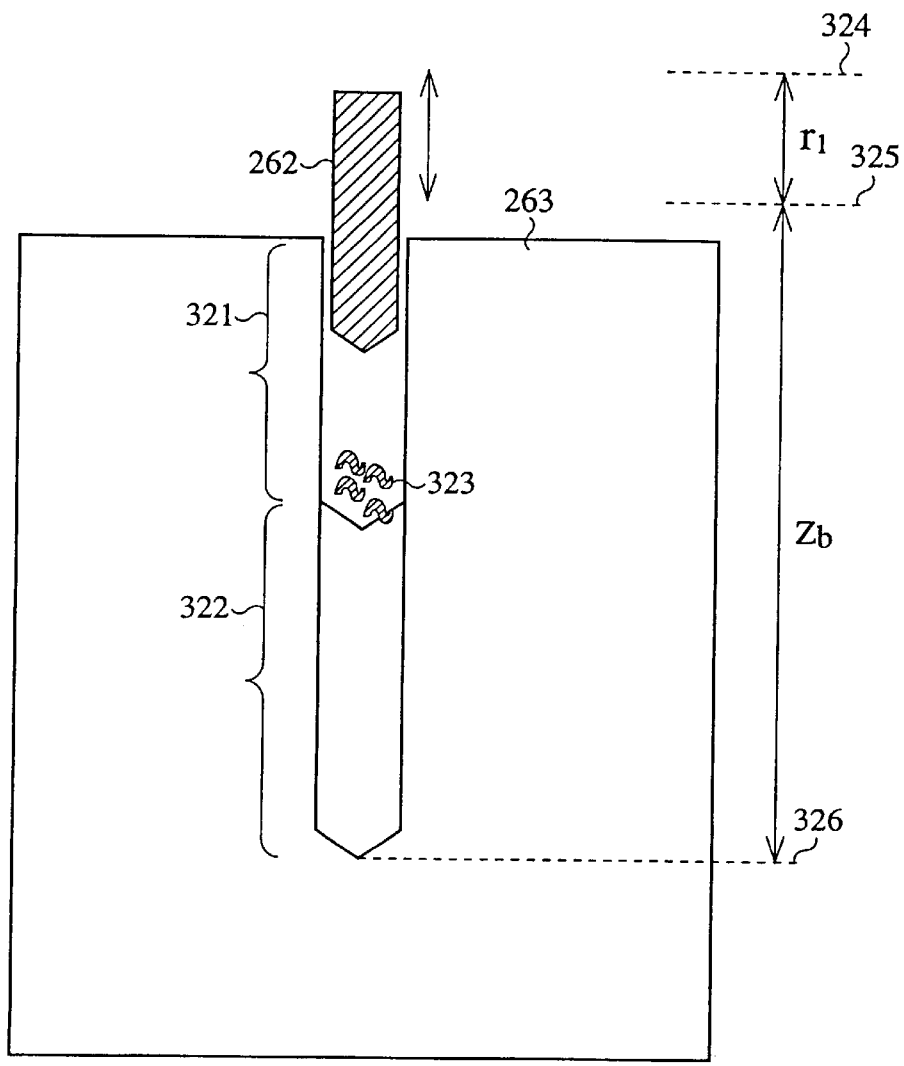
FIG. 32 is an explanatory view for the illustration of the relationships of positions between a tool and a work piece.

FIG. 32 is an explanatory view for the illustration of the relationships of positions between the tool 262 of the machine tool 11 and the work piece 263. In the figure, reference numeral 321 denotes a work portion where working has already been performed; reference numeral 322 denotes a work portion where working has not yet been performed; reference numeral 323 denotes a chip; reference numeral 324 denotes the height of an initial point of the tool 262; reference numeral 325 denotes the height of the R-point; and reference numeral 326 denotes a target hole depth position. The tool 262 is located at a position (initial point) sufficiently far from the working piece 263 on the center line of a hole, and then it is fast-forwarded to a point (R-point) sufficiently near to the working piece on the center line of the hole. After that, working is begun to the target hole depth position 326 by means of cutting-feed. When the chip packing of the tool 262 is detected by the chip packing detecting section 311, the tool 262 is once returned to begin working again. After the tool 262 reaches to the target hole depth position 326 finally, the tool 262 returns to the R-point or the initial point.

Figure 33:
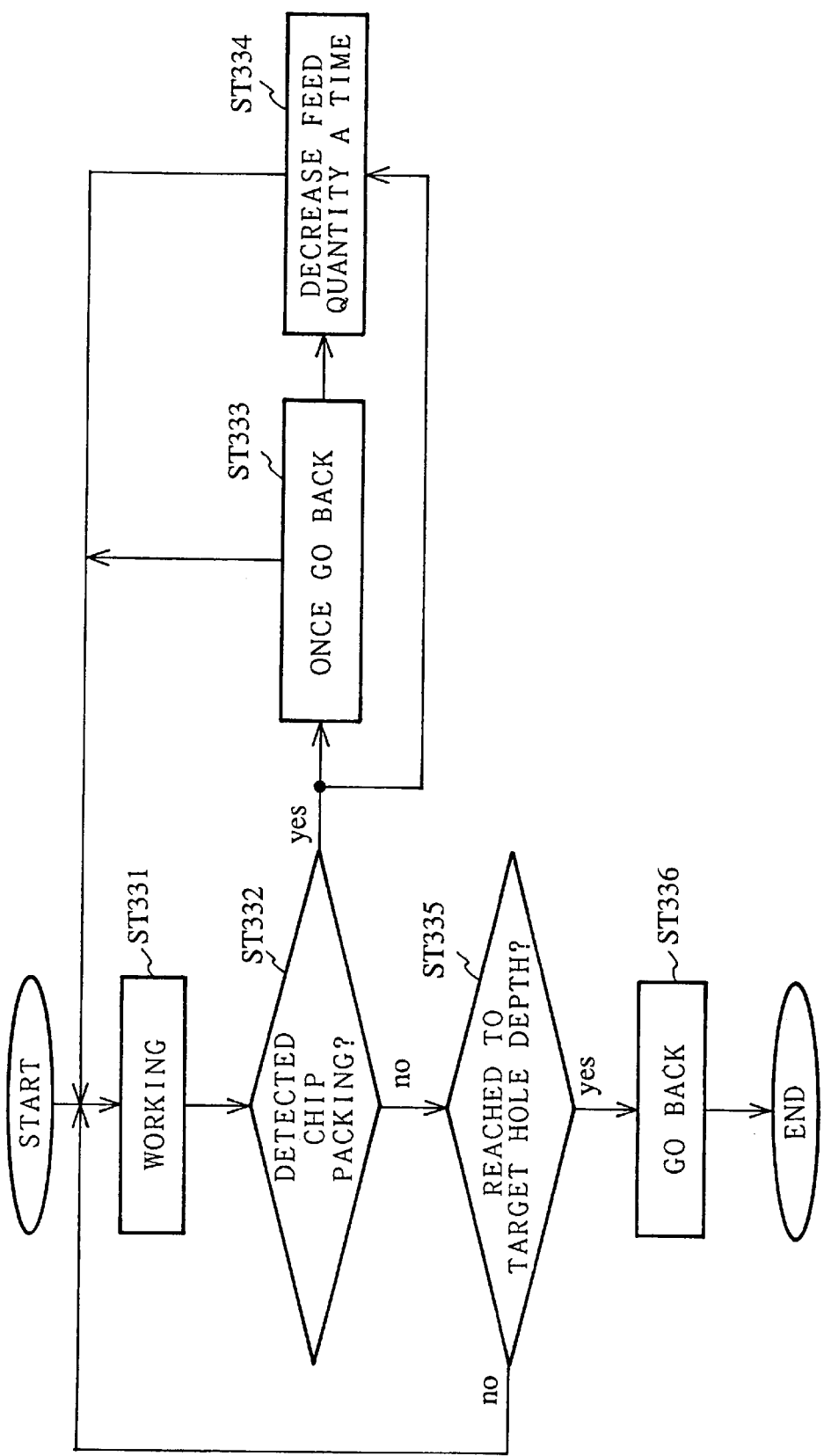
FIG. 33 is a flowchart showing the control procedure of the machine tool of the embodiment 13.

The control process of the aforementioned machine tool 11 will be described in detail with reference to the flowchart of FIG. 33. At first, the machine tool 11 begins to work the work piece 263 at step ST331. The chip packing detecting section 311 checks the existence of chip packing at step ST332. If chip packing is detected, the machine tool 11 once returns the tool 262 at step ST333, and decreases the feed quantity of the tool 262 at every time at step ST334. And then the machine tool 11 returns to step ST331. On the contrary, if no chip packing is detected at step ST332, the machine tool 11 checks whether the tool 262 has reached to the target hole depth position 326 or not at step ST335. If the tool 262 has reached to the target hole depth position 326, the machine tool 11 returns the tool 262 at step ST336 to finish the working. On the contrary, if the tool 262 has not reached to the target hole depth position 326, the machine tool 11 returns to the step ST331 to continue the working.

Figure 34:
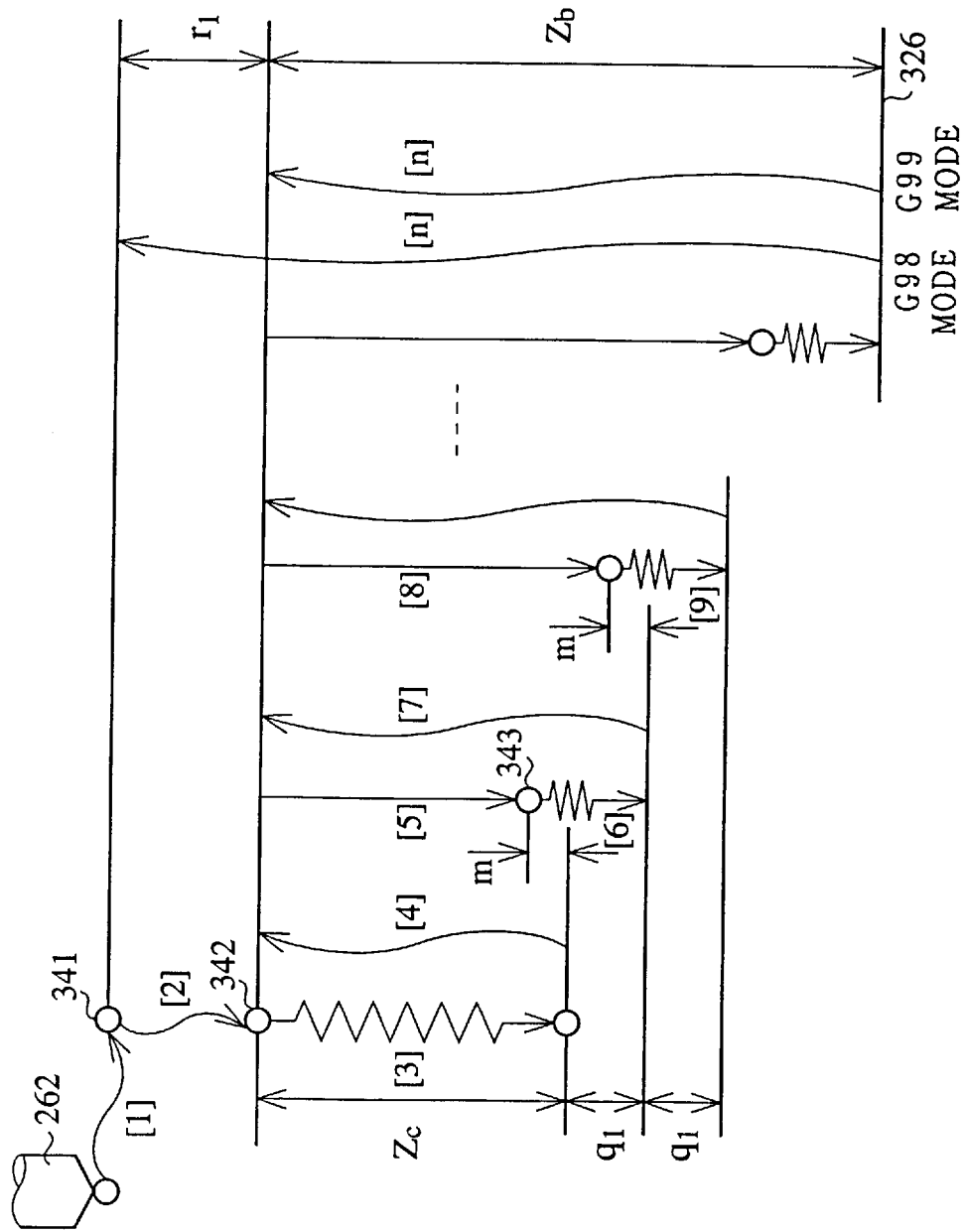
FIG. 34 is an operation route map showing a first actual example of the operation route of a tool.

Next, some examples of operation routes of the tool 262 in case of working in conformity with the present embodiment will be shown. FIG. 34 is an operation route map showing a first actual example of the operation route of the tool 262. In the figure, reference numeral 341 denotes an initial point; reference numeral 342 denotes an R-point. Wavy lines denote the fast-forwarding of the tool 262; notched lines denote feed while cutting; and reference letter m denotes a clearance quantity. At first, the tool 262 is positioned to the initial point 341 by being fast-forwarded along the route [1]. Next, the tool 262 is descended up to the R-point 342 by being fast-forwarded along the route [2] to begin the working of the work piece 263. Then, the work piece 263 is worked by being fed while being cutting along the route [3]. When chip packing is detected at the depth $Z_c$, the control section 313 returns the tool 262 to the R-point 342 by being fast-forwarded along the routes [4]. And the control section 313 switches the feed way of the tool 262 to a step feed having a feed quantity $q_1$ of the tool 262 at every time. Accordingly, the control section 313 moves the tool 262 to the point 343 shallower than the depth $Z_c$ by the clearance quantity m by step feed along the route [5], and then from that point 343 cutting is begun along the route [6] by step feed having a feed quantity $q_1$. The control section 313 controls the tool 262 similarly at the following operations along the routes [7], [8], [9], [10], . . . . That is to say, the control section 313 returns the tool 262 to the R-point 342 at every time of detecting chip packing, switches to the step feed of a feed quantity $q_1$, performs cutting after moving the tool 262 to the position shallower by the clearance quantity m, returns the tool 262 up to the initial point 341 (in case of G98 mode) or the R-point 342 (in case of G99 mode) by fast-forwarding after the tool 262 has reaches to the target hole depth position 326. By switching to the step feed as described above, the probability of the recurrence of chip packing can be reduced. In particular, by setting the feed quantity $q_1$ at every time not to exceed one through three times of the diameter of a work hole, at which distance chip packing is said not to occur, the possibility of the recurrence of chip packing is made near to zero.

Figure 35:
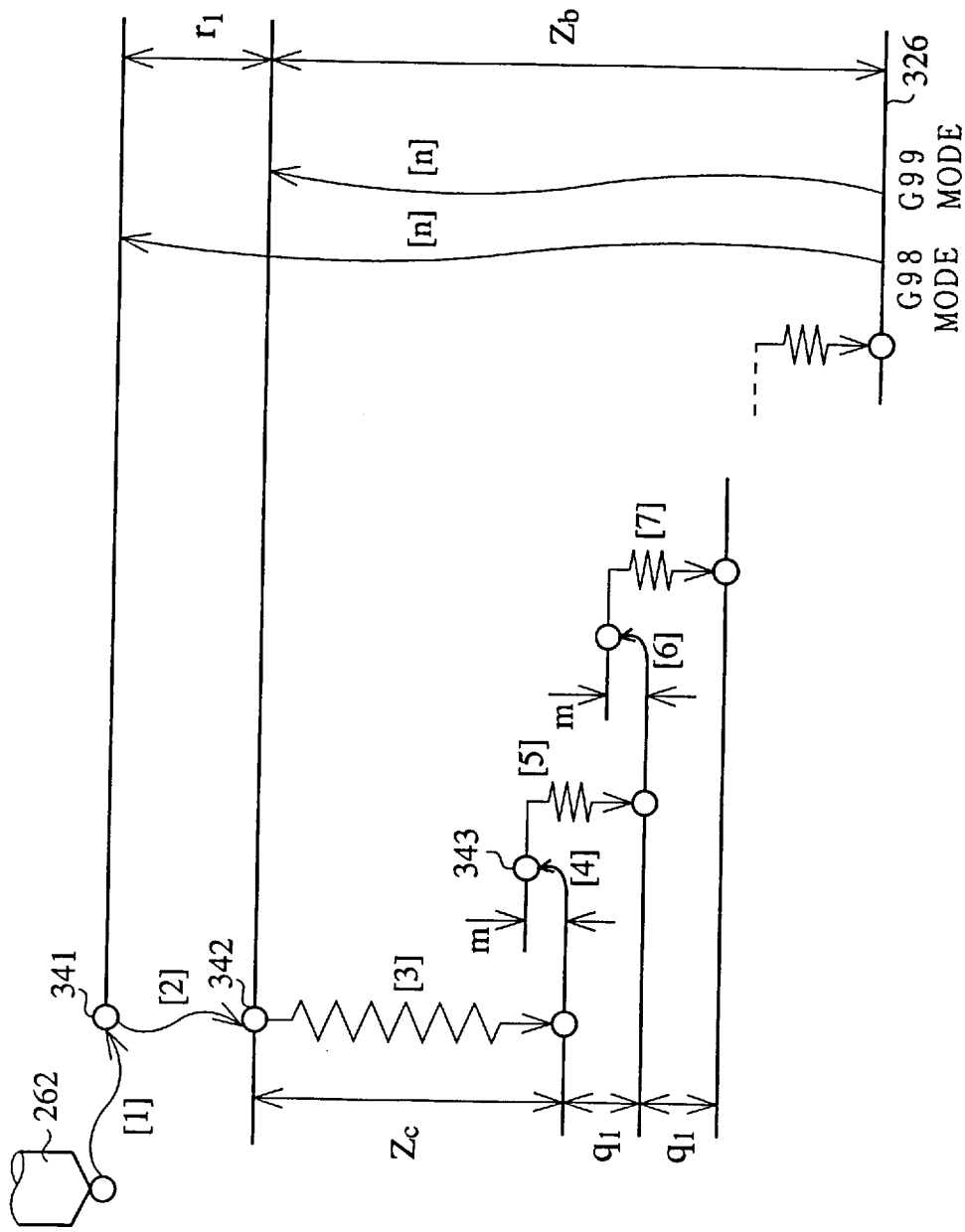
FIG. 35 is an operation route map showing a second actual example of the operation route of a tool.

FIG. 35 is an operation route map showing a second actual example of the operation route of the tool 262. The machine tool 11 proceeds with the cutting of the work piece 263 to switch to a step feed of the feed quantity $q_1$ at every time so as to return by the clearance quantity m after detecting a chip at the depth $Z_c$. The operation route of the present actual example can shorten the time of working to the operation route shown in FIG. 34, but the ability of discharging chips is somewhat inferior because the tip of a tool does not get out of the work piece 263.

Figure 36:
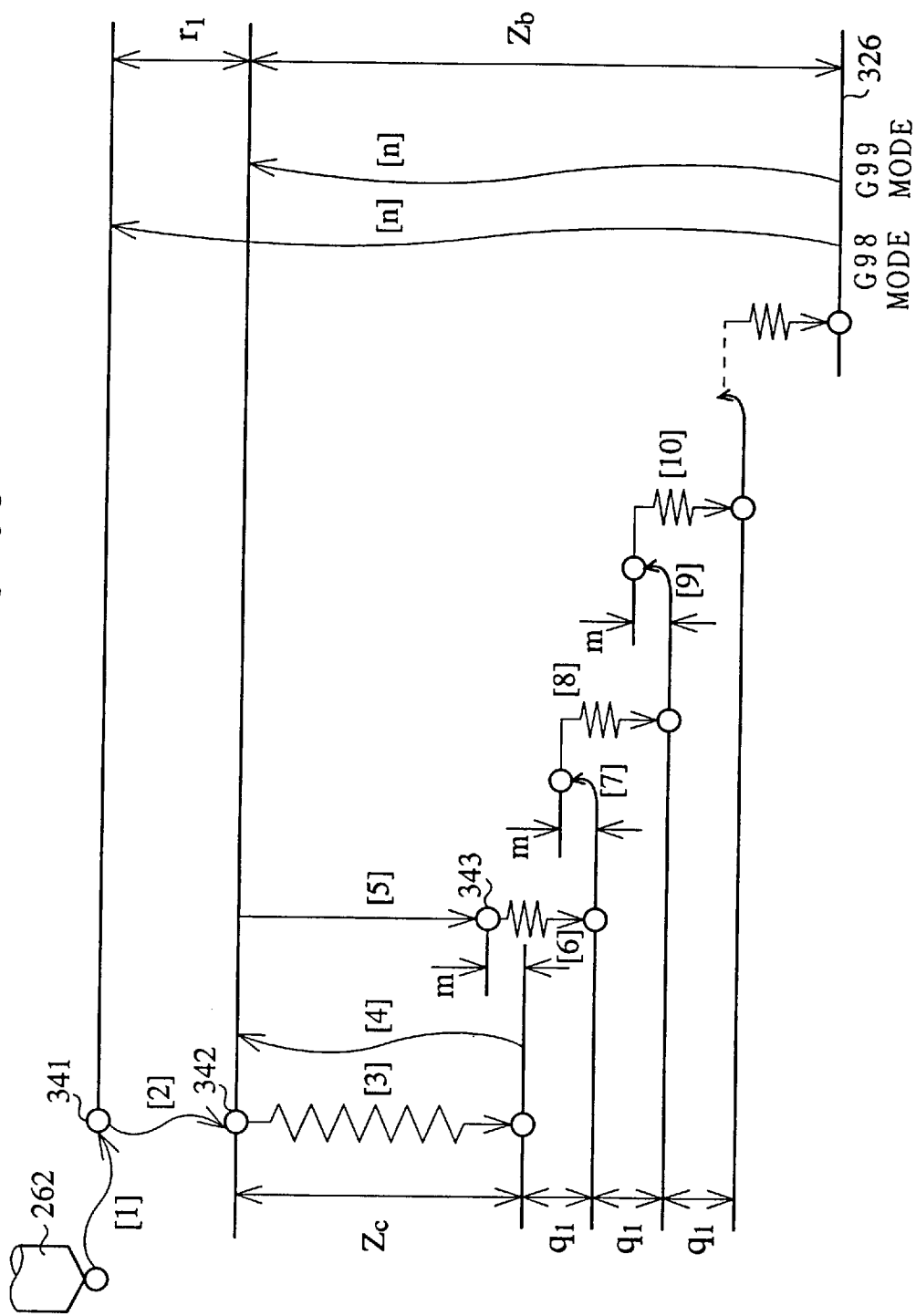
FIG. 36 is an operation route map showing a third actual example of the operation route of a tool.

FIG. 36 is an operation route map showing a third actual example of the operation route of the tool 262. After detecting a chip at the depth $Z_c$ in the work piece 263, the machine tool 11 switches to a step feed of the feed quantity $q_1$ at every time so as to return up to the R-point 342 at the first time and return by the clearance quantity m at the second time and after. Since the operation route of the present actual example returns the tool 262 up to the R-point 342 after detecting a chip at the first time, almost all of the chips are discharged out of the work piece 263 at that time, and consequently, the operation route has an intermediate effect between those of the operation route shown in FIG. 34 and the operation route shown in FIG. 35.

EMBODIMENT 14.

Figure 37:
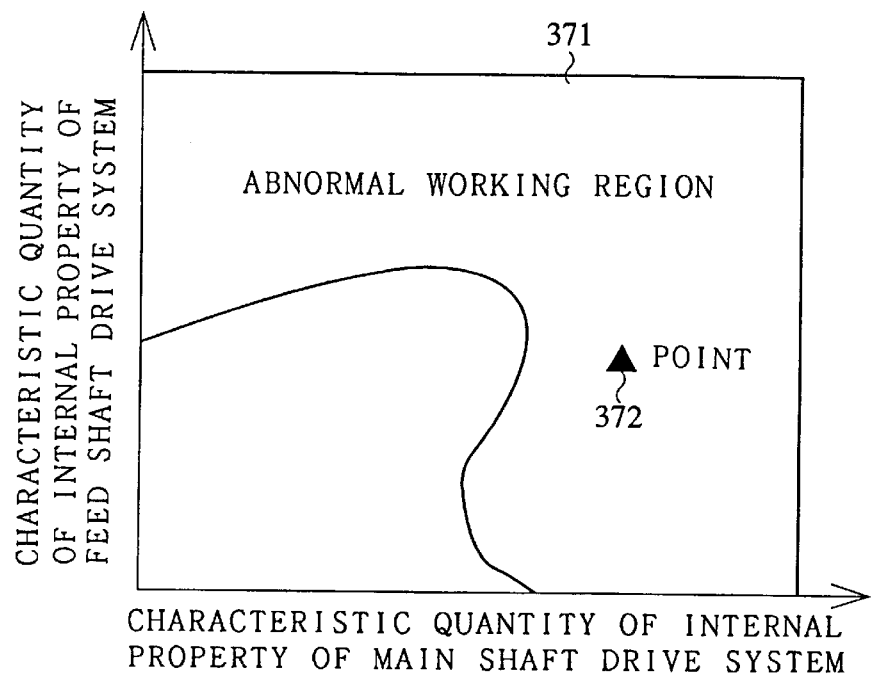
FIG. 37 is an example of region diagrams showing a fourteenth embodiment (embodiment 14) of the present invention.
Figure 38:
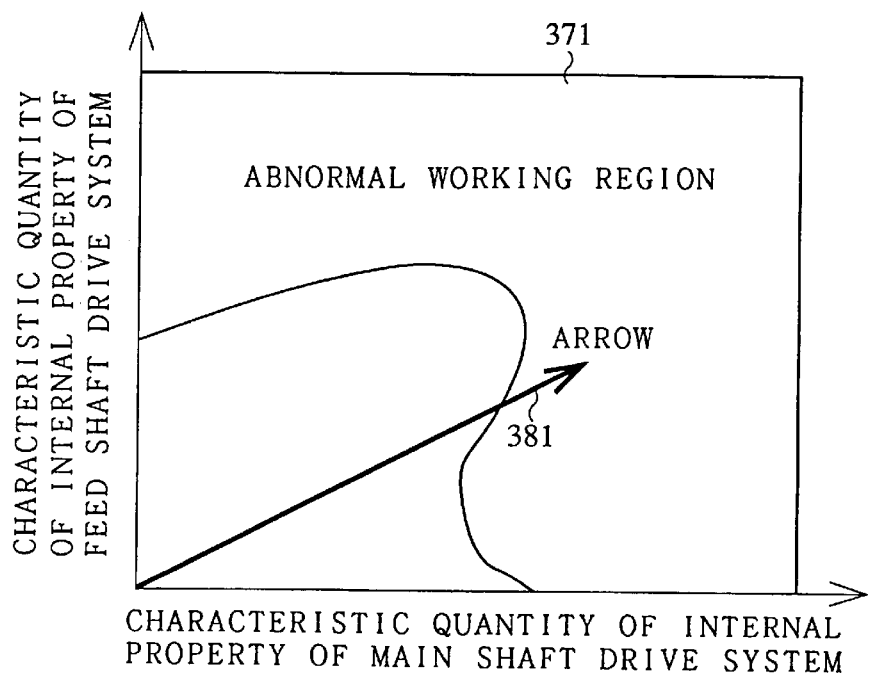
FIG. 38 is another example of region diagrams of the embodiment 14.

FIG. 37 is an example of region diagrams showing the embodiment 14 of the present invention. Hereinafter an example of the region diagram displaying as to two shafts of a main shaft and a feed shaft will be described, but the kind of a shaft and the number of shafts are arbitrary. In FIG. 37, reference numeral 371 denotes an abnormal working region; reference numeral 372 denotes a point representing an internal property. FIG. 37 shows a plural axis characteristic quantity the elements of which are the characteristic quantity of the internal property of a main shaft drive system and the characteristic quantity of the internal property of a feed shaft drive system by a point on a two dimensional graph composed of an axis indicating a characteristic quantity of the internal property of the main shaft drive system and the other axis indicating a characteristic quantity of the internal property of the feed shaft drive system. The kind of the mark of the point may be arbitrary. For example, an arrow 381 as shown in FIG. 38 is applicable. Although the abnormal working regions are shown in FIG. 37 and FIG. 38, it will do to display a normal working region, a boundary, or plural kinds of regions and boundaries.

EMBODIMENT 15.

Figure 39:
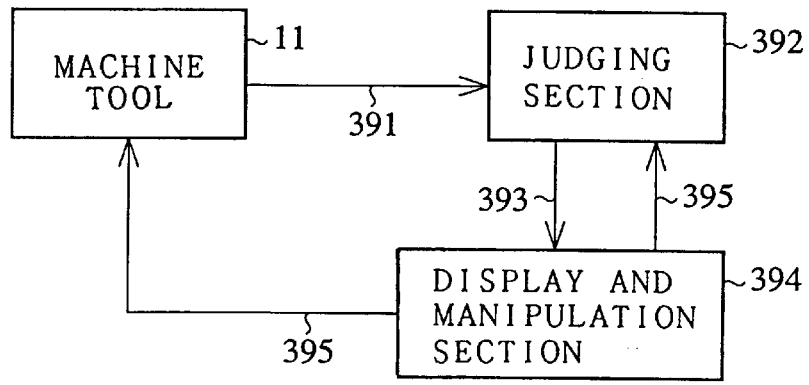
FIG. 39 is a block diagram showing the construction of a fifteenth embodiment (embodiment 15) of the present invention.
Figure 45:
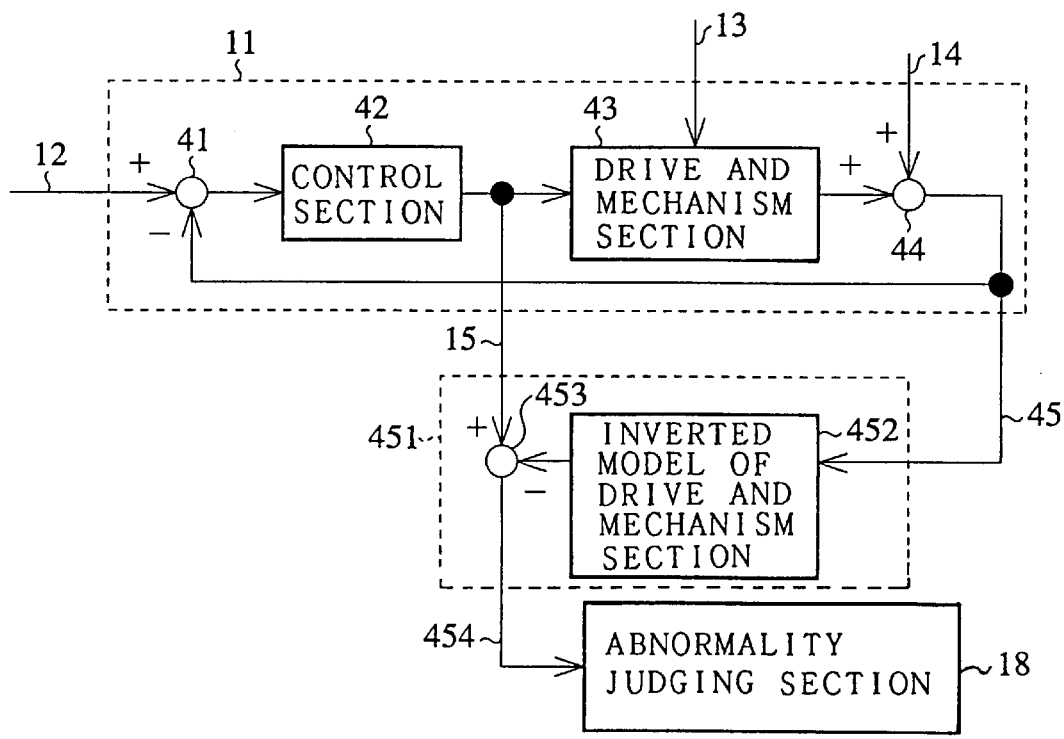
FIG. 45 is a block diagram showing a first prior art apparatus for detecting an abnormality of a control system.

FIG. 39 is a block diagram showing the construction of the embodiment 15 of the present invention. In the figure, reference numeral 391 denotes a signal representing characteristic quantities of plural internal properties of the machine tool 11; reference numeral 392 denotes a judging section for judging the operation state of the machine tool 11 from the present position of plural characteristic quantities on a transition route pursued by the plural characteristic quantities from a normal operation state of the machine tool 11 up to an abnormal operation state thereof on a basis of the signal 391; reference numeral 393 denotes a signal representing a present working state judged by the judging section 392; and reference numeral 394 denotes a display and manipulation section displaying the working state of the machine tool 11 on the basis of the signal 393 for inputting the command signal 395 into the judging section 392 and the machine tool 11.

In operation, the judging section 392 obtains a transition route pursued by the plural characteristic quantities on the basis of the signal 391 representing the plural characteristic quantities, and judges the working state of the machine tool 11 from the present position of the plural characteristic quantities to the transition route. The display and manipulation section 394 performs a display operation on the display section of the display and manipulation section 394 on the basis of the signal 393 representing the present working state and inputted from the judging section 392. An operator transmits an appropriate command signal 395 to the machine tool 11 and the judging section 392 by manipulating the manipulation section of the display and manipulation section 394 on the basis of the display displayed on the display section.

Next, the aforementioned transition routes of the characteristic quantities will be described as to actual examples. The transition routes are given as, for example, a directional straight line from an end thereof representing a normal state and the other end thereof representing an abnormal state, a curved line or a curved line with width.

Figure 40:
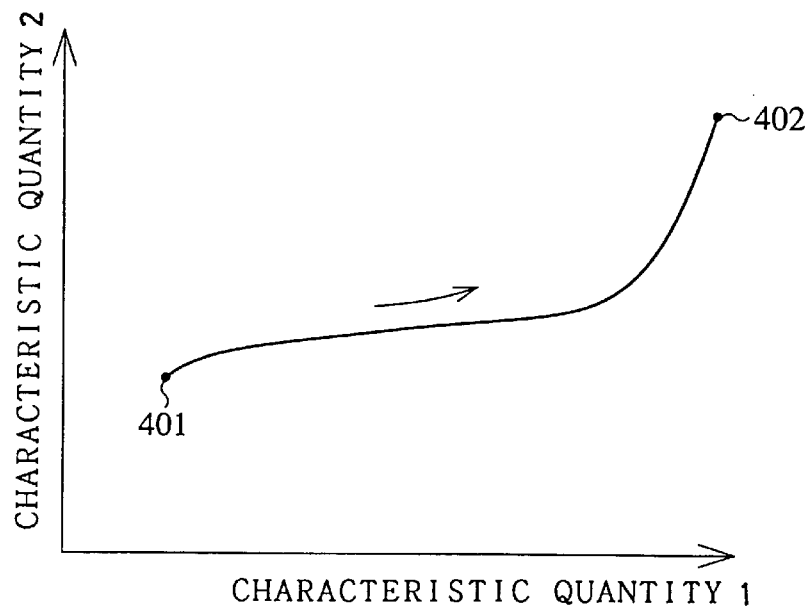
FIG. 40 is a transition route diagram showing a transition route of a characteristic quantity represented by a curved line.
Figure 41:
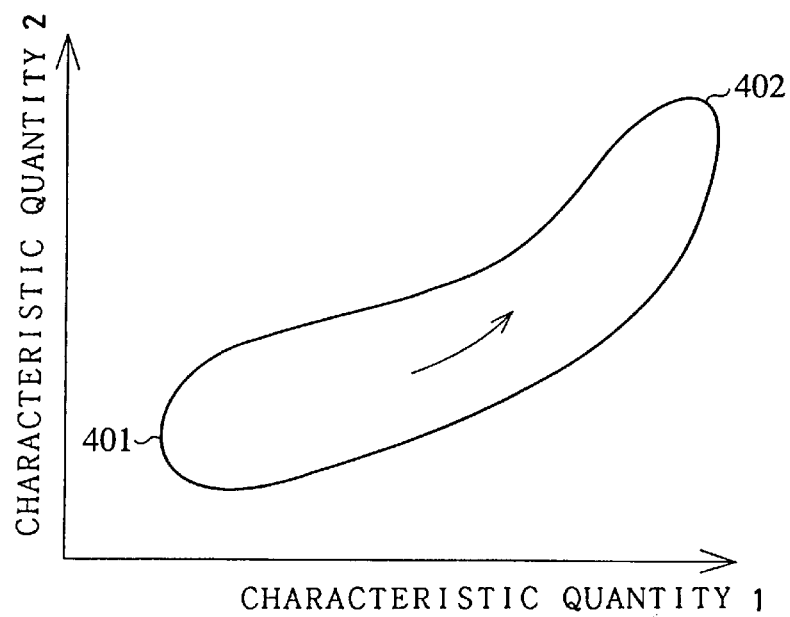
FIG. 41 is a transition route diagram showing a transition route of a characteristic quantity represented by a curved line having a width.

FIG. 40 is a transition route diagram showing a transition route given with a curved line. In the figure, the transition route is defined by a two-dimensional space composed of a characteristic quantity 1 and a characteristic quantity 2, and expressed as a directional curved line from an end 401 thereof representing a normal state through the other end 402 thereof. FIG. 41 is a transition route diagram showing a transition route given with a curved line having a width. The transition route is defined by a two-dimensional space composed of a characteristic quantity 1 and a characteristic quantity 2, and expressed as a directional curved line with a width from an end 401 thereof representing a normal state through the other end 402 thereof.

Figure 42:
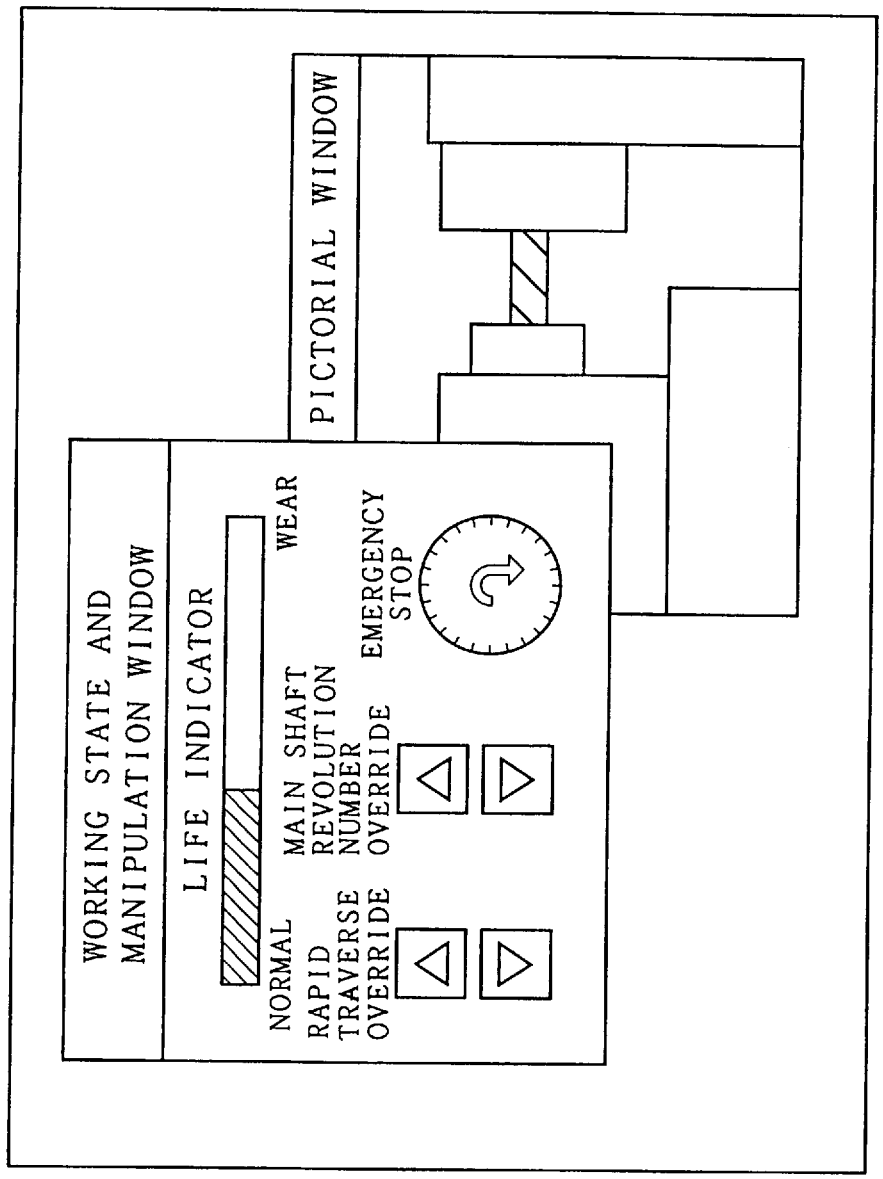
FIG. 42 is a diagram showing windows for display and manipulation.

Next, the display and the manipulation of a working state will be described by means of an actual example. FIG. 42 is a diagram showing windows for display and manipulation. The window for displaying a working state and for manipulation displays the degree of wear by a life indicator; the manipulation of the machine tool 11 is executed by means of the rapid traverse override changing key, the main shaft revolution number override changing key and the emergency stop button. In the pictorial window, a moving picture of a working state is displayed. The existence of the windows, constructing elements in the windows and properties of the elements are set to be variable according to the degree of wear. For example, the moving picture is not displayed when the machine tool 11 operates normally, and it is displayed according to the proceeding of wear; or the number of elements of a picture is increased or the time interval of updating a picture is shortened according to the proceeding of wear. By making it possible to display only the truly necessary information in accordance with the degree of wear at a good timing, or by allowing only truly necessary manipulations to be carried out, it becomes easier for an operator to recognize a working state, and the possibility of mis-operation decreases. If a great deal of data such as a picture showing a working state are displayed on a monitor at a time of remote supervising, there is a problem that communications traffic on a channel from a machine tool to a monitor becomes enormous. But the method of the present embodiment can reduce the communications traffic by communicating not always but only at a necessary time.

EMBODIMENT 16.

Figure 43:
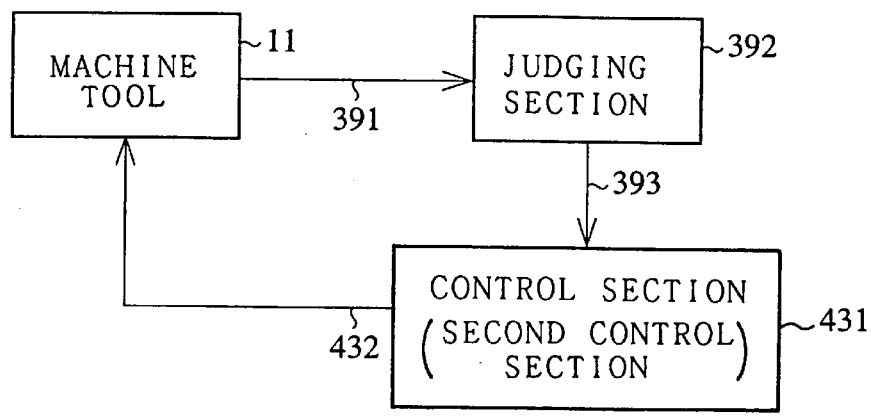
FIG. 43 is a block diagram showing the construction of a sixteenth embodiment (embodiment 16) of the present invention.

FIG. 43 is a block diagram showing the construction of the embodiment 16 of the present invention. In the figure, reference numeral 431 denotes a control section (a second control section) for controlling the operation of the machine tool 11 so that the plural characteristic quantities change along a transition route of the plural characteristic quantities on the basis of the signal 393 representing a present working state and inputted from the judging section 392; and reference numeral 432 denotes a command signal for commanding the machine tool 11 so that the characteristic quantities of the machine tool operate in conformity with the aforementioned transition route.

In operation, the judging section 392 obtains a transition route pursued by the plural characteristic quantities of the machine tool 11 on the basis of the signal 391 representing the plural characteristic quantities, and judges the working state of the machine tool 11 from a present position of the plural characteristic quantities to the transition route. The control section 431 controls the machine tool 11 so that the plural characteristic quantities of the machine tool 11 change along the transition route on the basis of the signal 393 representing a present working state of the machine tool 11 and inputted from the judging section 392.

The aforementioned transition route is given as, for example, a straight line, a curved line or a curved line with a width having a directionality from an end representing a normal state through the other end representing an abnormal state.

Figure 44:
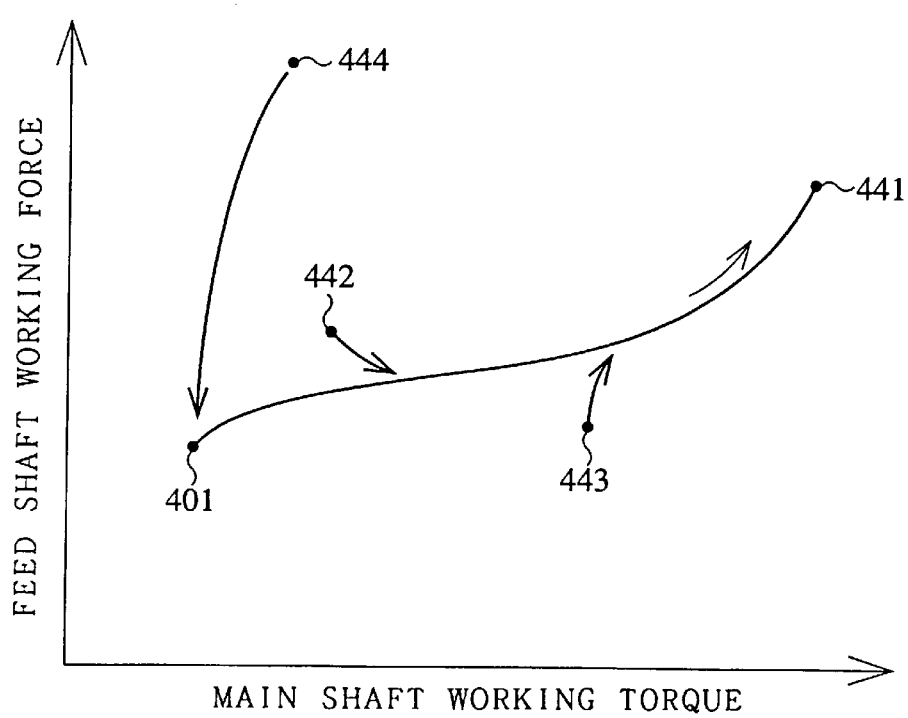
FIG. 44 is a graph showing transition routes from a normal state to a worn state at a time of drill working.
Figure 46:
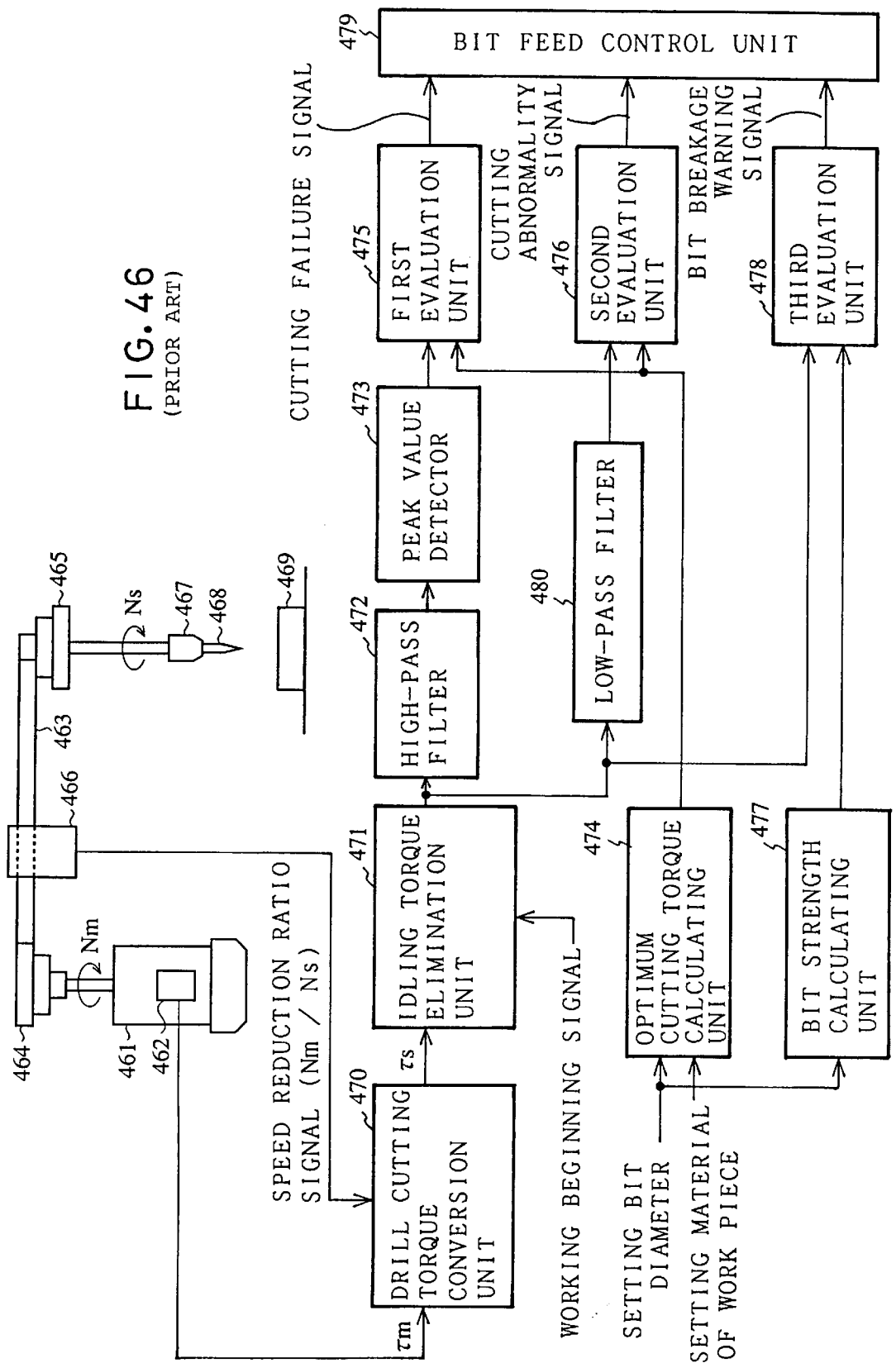
FIG. 46 is a block diagram showing a second prior art apparatus for detecting an abnormality of a control system.
Figure 47:
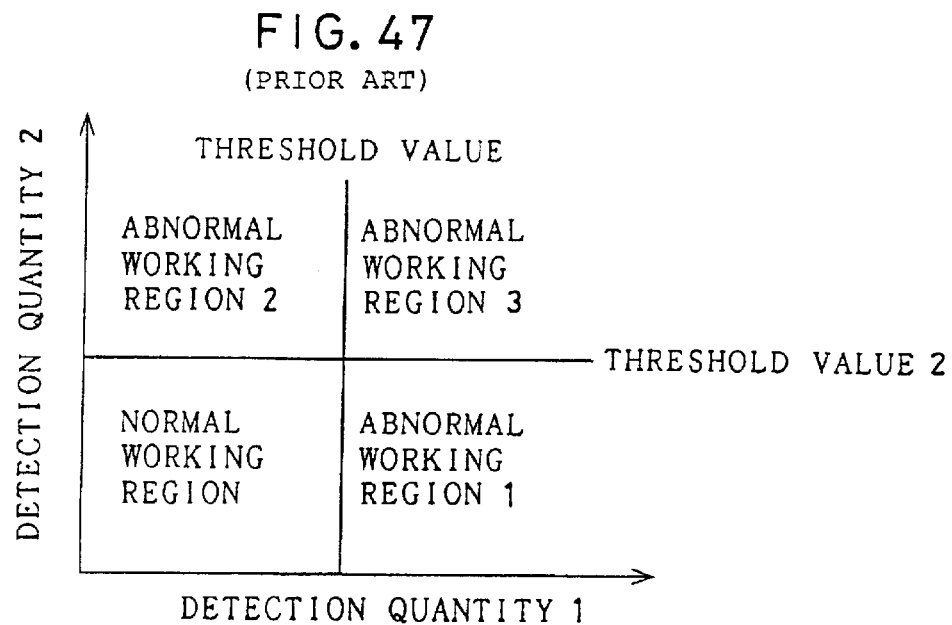
FIG. 47 is a region diagram showing the principle of the abnormality detection of the second prior art apparatus.
Figure 49:
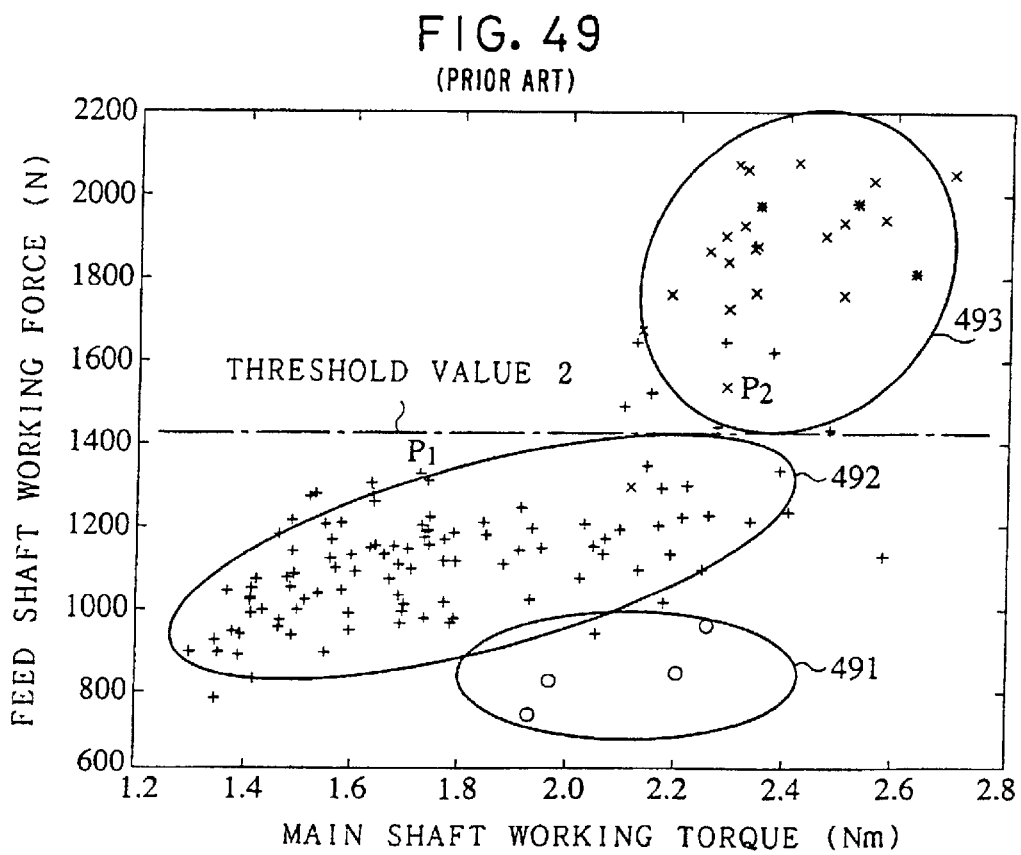
FIG. 49 is a graph made up by plotting the data having the maximum values in regard to each hole of the experiment the results of which are shown in FIG. 48(1) and FIG. 48(2)
Figure 50:
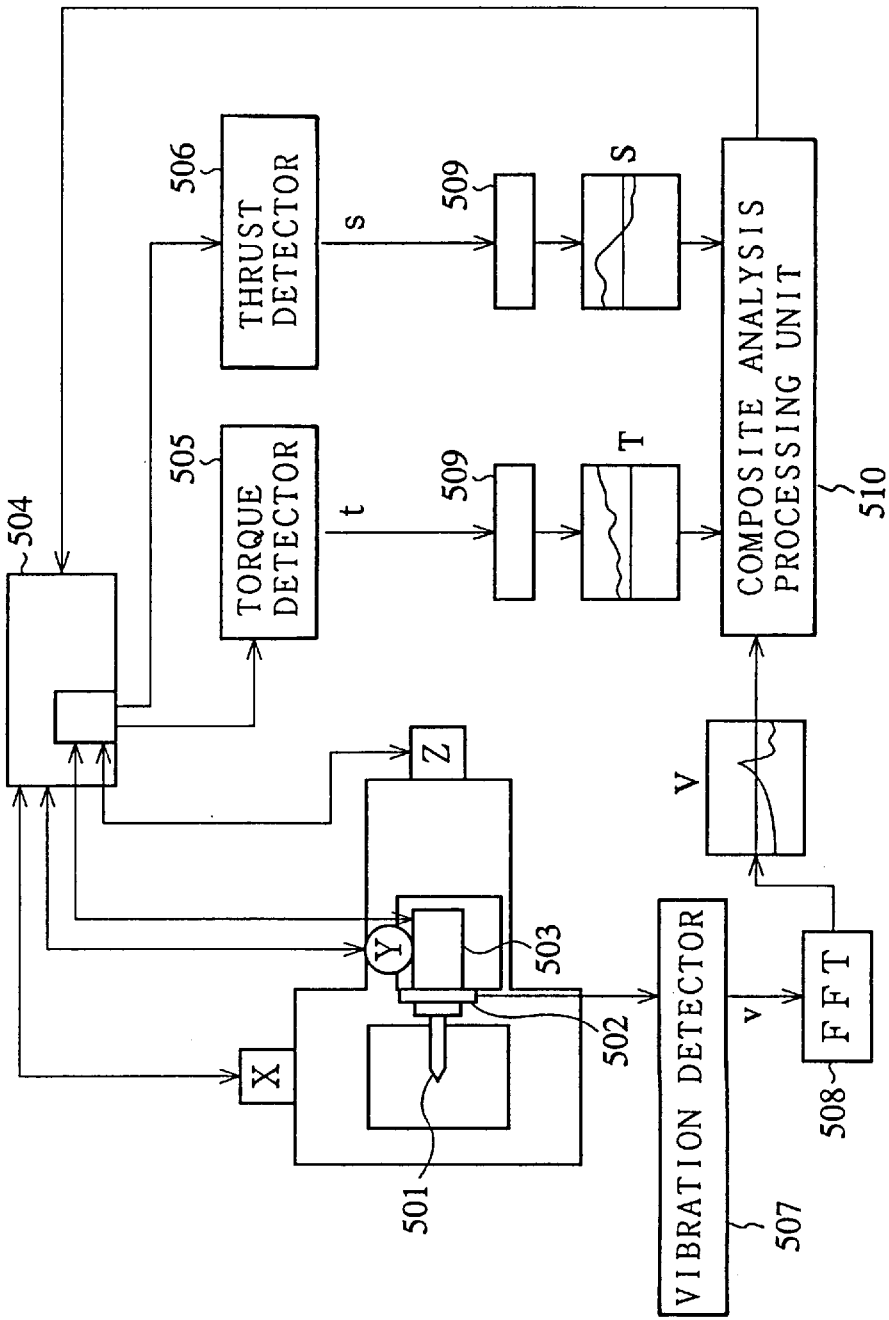
FIG. 50 is a block diagram of a third prior art apparatus for detecting an abnormality of a control system.
Figure 51:
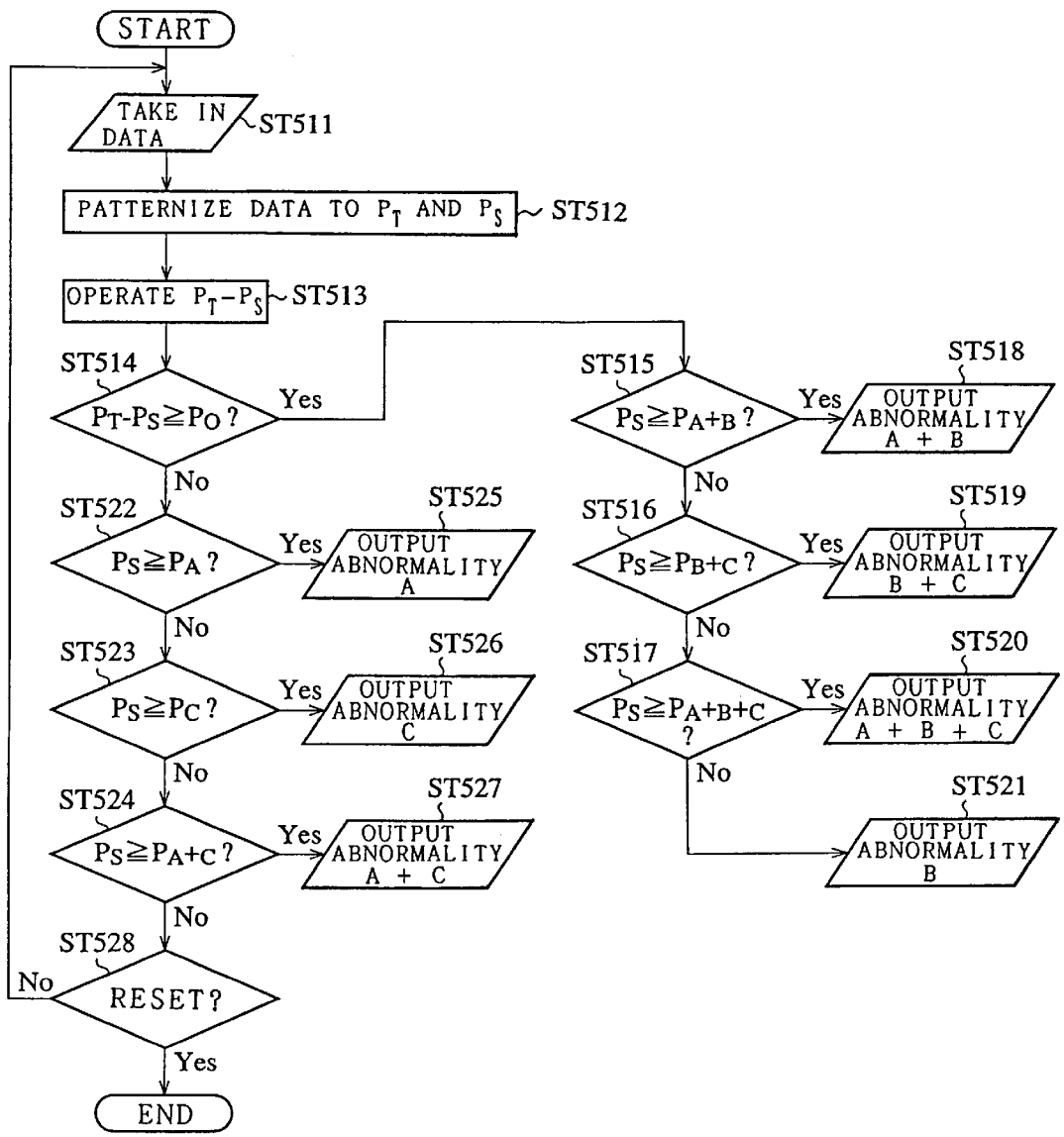
FIG. 51 is a block diagram showing the operation of a fourth prior art apparatus for detecting an abnormality of a control system.
Figure 52:
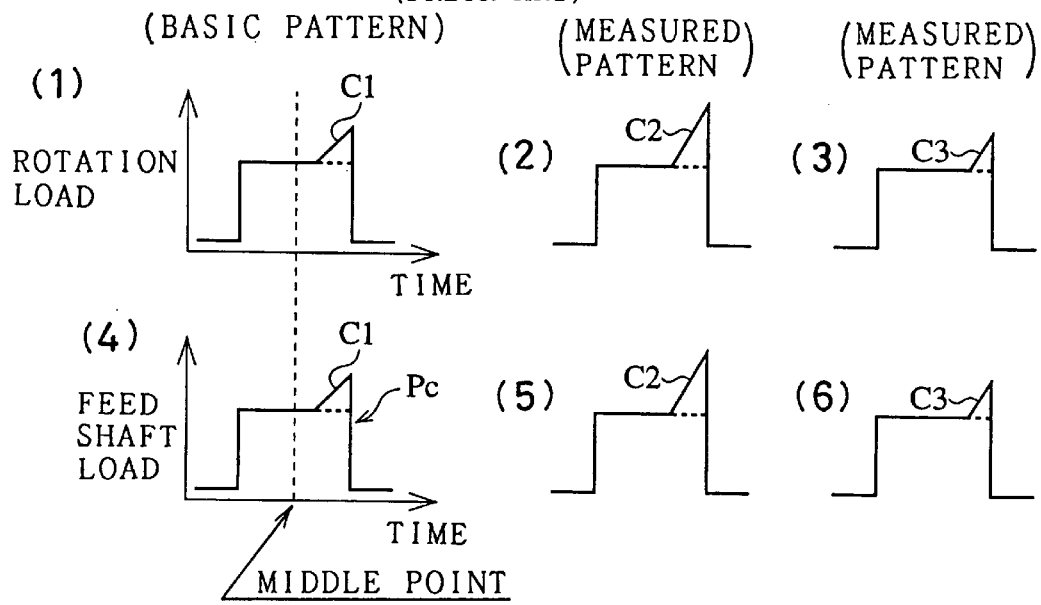
FIG. 52 contains waveform diagrams showing some of the waveforms of reference patterns of the fourth prior art apparatus.
Figure 54:
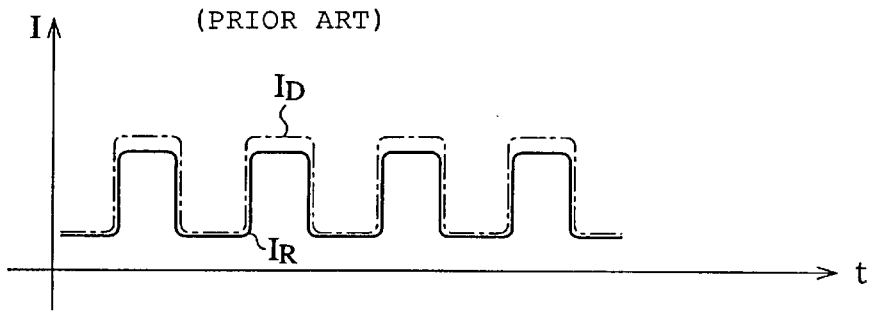
FIG. 54 is a waveform diagram for the illustration of the principle of the abnormality judgement of a sixth prior art apparatus for detecting an abnormality of a control system.
Figure 55:
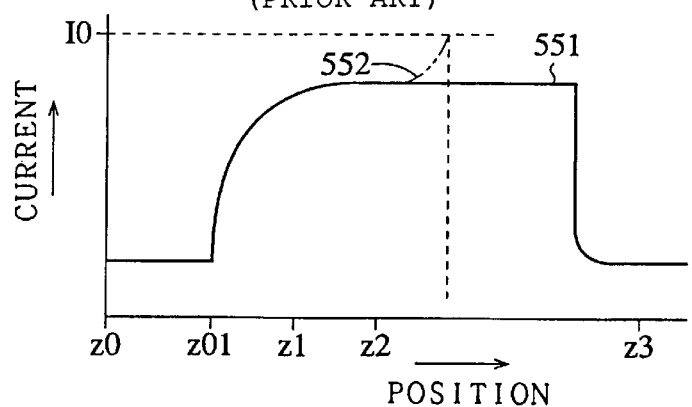
FIG. 55 is a waveform diagram for the illustration of the principle of the abnormality judgement of a seventh prior art apparatus for detecting an abnormality of a control system.
Figure 53:
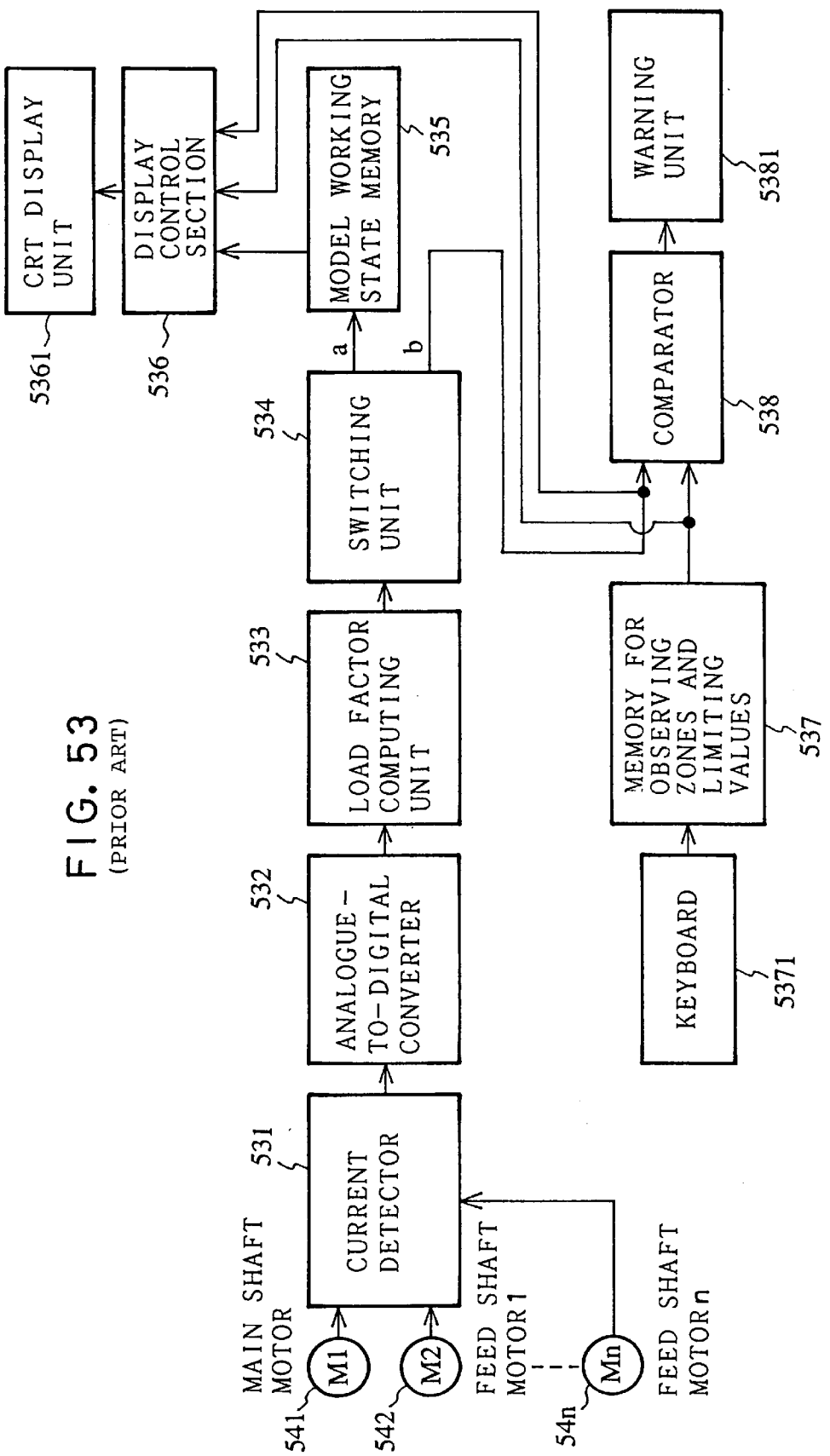
FIG. 53 is a block diagram showing a fifth prior art apparatus for detecting an abnormality of a control system.
Figure 56:
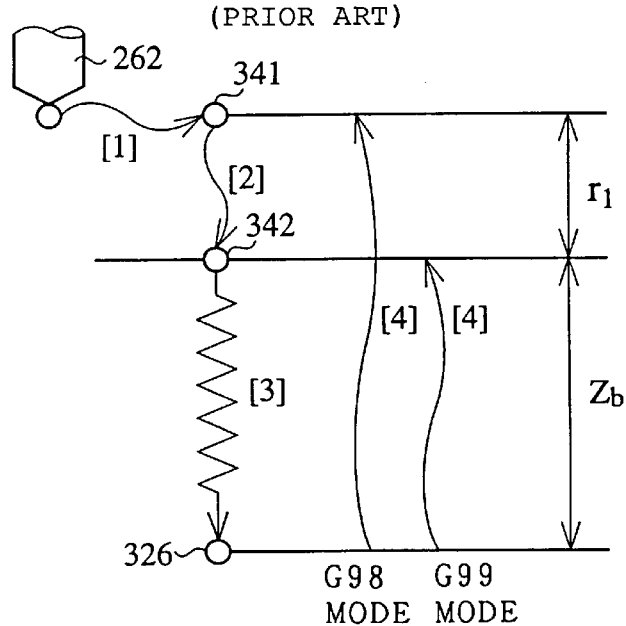
FIG. 56 is an operation route map for the illustration of the operation of an eighth prior art apparatus for detecting an abnormality of a control system.
Figure 59:
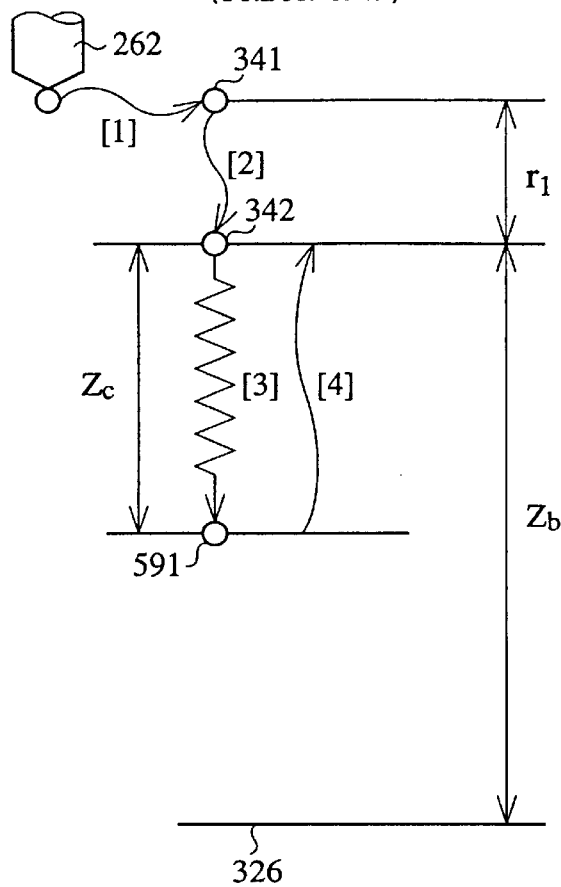
FIG. 59 is an operation route map for the illustration of the operation of an eleventh prior art apparatus for detecting an abnormality of a control system.
Figure 57:
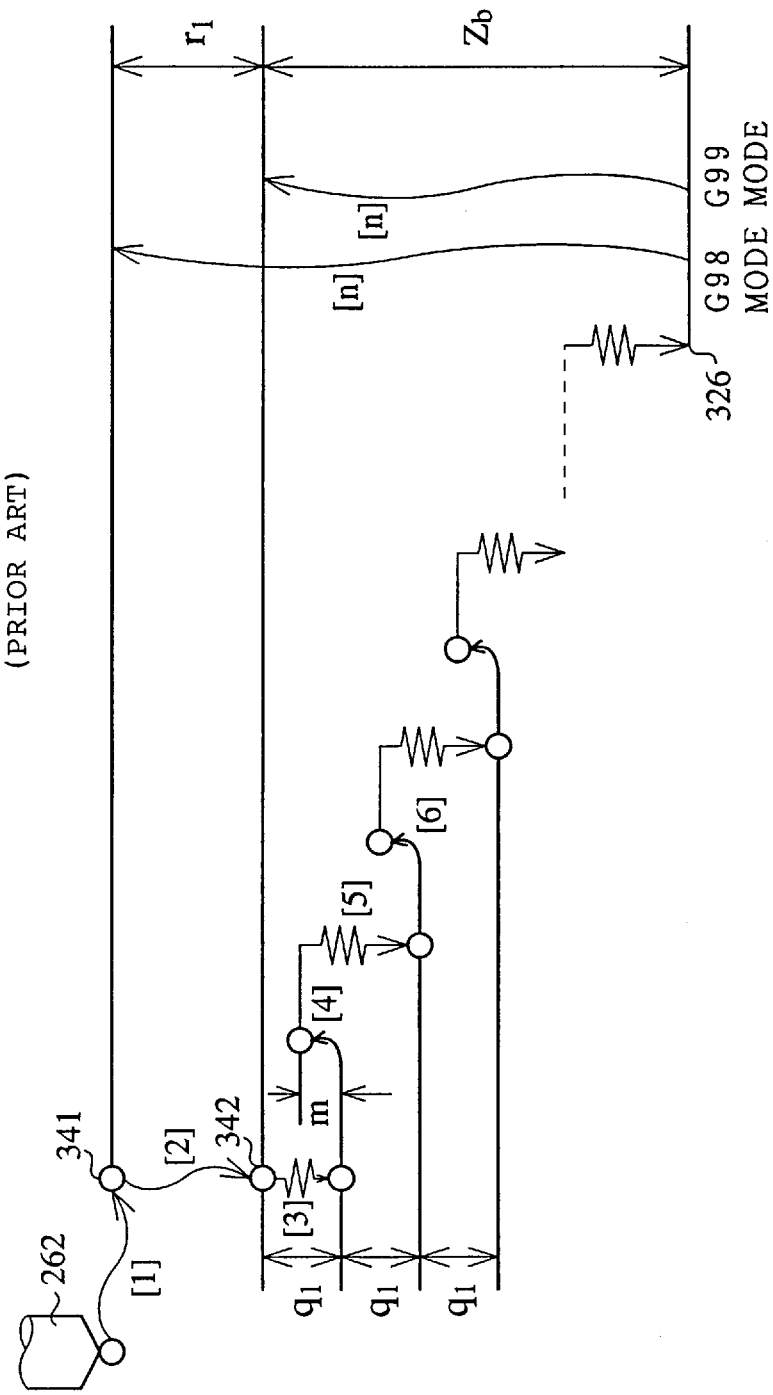
FIG. 57 is an operation route map for the illustration of the operation of a ninth prior art apparatus for detecting an abnormality of a control system.
Figure 58:
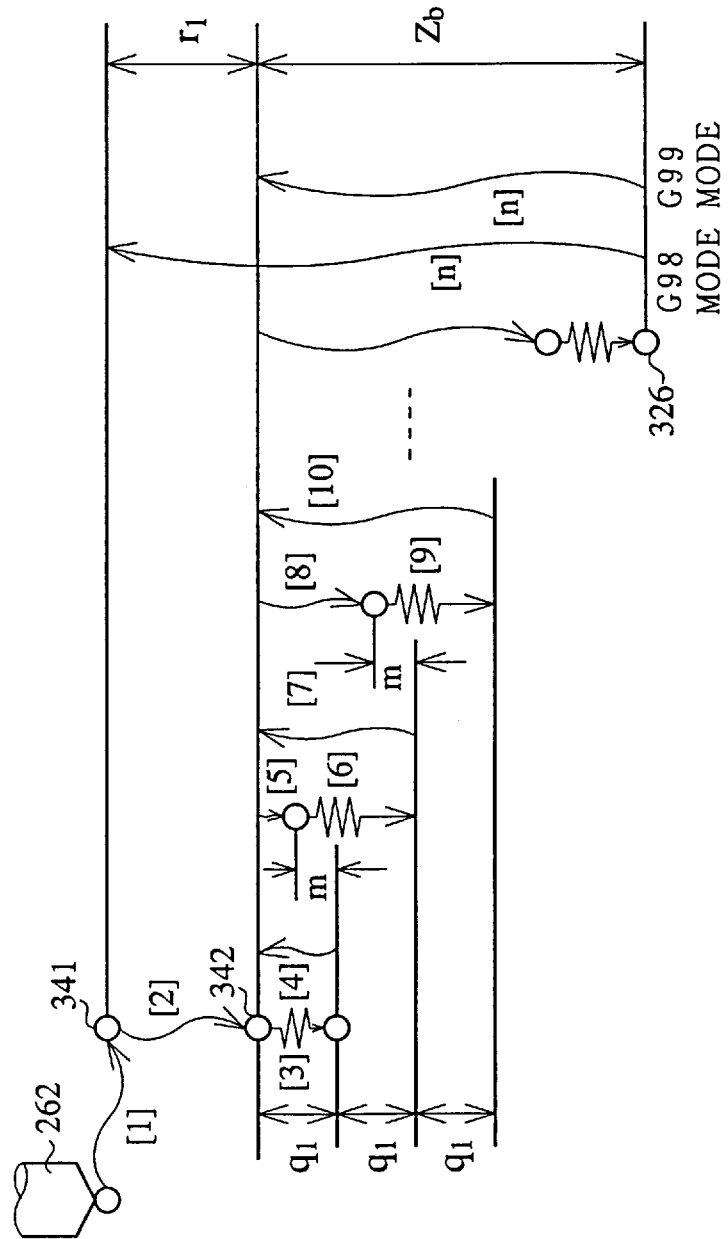
FIG. 58 is an operation route map for the illustration of the operation of a tenth prior art apparatus for detecting an abnormality of a control system.

Next, the control operation of the controlling section 431 will be described by means of an actual example. FIG. 44 is a graph the axis of abscissas of which indicates main shaft working torque and the axis of ordinates of which indicates a feed shaft working force; the graph shows transition routes from a normal state 401 to a worn state 441 at a time of drilling. The transition routes aim to allow ordinary wear and avoid abnormalities other than the ordinary wear, because it is impossible to avoid a wear phenomenon which is gradually progressing even if ordinary working is being carried out. Supposing that a present position is positioned at the present position 442 where thrust is larger and torque is smaller in comparison with the transition route, the operation of the machine tool 11 is controlled so as to approach to the transition route without moving backward to the advancing direction of the transition route. For example, a feed which influences the feed shaft working force is decreased, and the cutting speed thereof is increased by the degree equal to the decreased quantity. In this case, since the cutting speed is increased by the quantity of the decreased feed, the efficiency of working does not decrease. Next, supposing that a present position is positioned at the present position 443 where thrust is smaller and torque is larger than those at the transition route, for example the cutting speed is decreased and the feed is increased by that quantity in this case. Moreover, for example, supposing that a present position is positioned at the present position 444, some abnormality other than wear is considered to be occurred because the present position 444 is greatly distant from the transition route. In this case, for example, by changing a tool or grinding it again, the machine tool 11 returns to a normal state.

While preferred embodiments of the present invention have been described using specific terms, such description is for illustrative purposes only, and it is to be understood that changes and variations may be made without departing from the spirit or scope of the following claims.

What is claimed is:

1. An apparatus for detecting an abnormality of a control system having a control section, said apparatus comprising:

an internal property calculating section for calculating an internal property of said control system by being supplied with only a command value inputted into said control section and representing a position or a speed parameter of said control system, an abnormality judging section for judging abnormalities of operation of said control system on a basis of only an internal state calculated by said internal property calculating section and an actual internal state of said control system, wherein said control system has a drive and mechanism section for executing driving operation, further comprising an operation region memorizing section for memorizing an abnormal operation region in which characteristic quantities of internal property quantities calculated by said internal property calculating section in order to correspond to operation at a time of abnormal operation of said control system are distributed, or memorizing a normal operation region in which characteristic quantities of internal property quantities calculated by said internal property calculating section in order to correspond to operation at a time of normal operation of said control system are distributed, wherein said abnormality judging section calculates a characteristic quantity of a plural axes driving means in said drive and mechanism section from the internal property calculated by said internal property calculating section, and judges operation of said control system to be abnormal when the calculated characteristic quantity is in the abnormal operation region memorized in said operation region memorizing section or when the calculated characteristic quantity is not in the normal operation region memorized in said operation region memorizing section.

2. An apparatus for detecting an abnormality of a control system according to claim 1, wherein said control system has a drive and mechanism section for executing driving operation and wherein said internal property calculating section comprises:

a control section model being a model of said control section, and a drive and mechanism model being a model of said drive and mechanism section of said control system.

3. An apparatus for detecting an abnormality of a control system according to claim 1, wherein said control system has a drive and mechanism section for executing driving operation, wherein a driving means of said drive and mechanism section is an electric motor, and wherein said internal property quantity of said control system is one of a command value of a drive current of said electric motor, a feedback value of the drive current, a command value of produced torque to the electric motor and a feedback value of the produced torque, or a combination of them.

4. An apparatus for detecting an abnormality of a control system according to claim 1, which further comprises:

an abnormality detecting section for detecting an abnormality and generating an abnormality detection signal, a plural axis characteristic quantities memorizing section for memorizing characteristic quantities of plural axes, and an operation region modifying section for modifying an abnormal operation region or a normal operation region memorized in said operation region memorizing section on a basis of the characteristic quantities of plural axes memorized in said plural axis characteristic quantities memorizing section at a time of receiving said abnormality detection signal.

5. An apparatus for detecting an abnormality of a control system according to claim 1, which further comprises:

a tool depth calculating section for calculating a tool depth from a surface of a work piece to a blade tip of a tool of said control system or a peripheral end of the tool, and an operation region modifying section for modifying the abnormal operation region or the normal operation region memorized in said operation region memorizing section in accordance with the tool depth calculated by said tool depth calculating section.

6. An apparatus for detecting an abnormality of a control system according to claim 1, wherein said control system is a machine tool for working, and wherein said internal property calculating section or said abnormality judging section includes a working process model being a model of a working process of said machine tool.

7. An apparatus for detecting an abnormality of a control system according to claim 6, wherein said abnormality judging section comprises a working process abnormality judging section for judging abnormalities of a working process of said machine tool on a basis of an internal property of said working process model.

8. An apparatus for detecting an abnormality of a control system comprising:

a drive and mechanism section for executing driving operation;

a control section for controlling operation of the drive and mechanism section, wherein said control section is a machine tool for working a work piece by using a tool;

a chip packing detecting section for detecting chip packing of said tool, and wherein said control section switches a feed pattern of said tool from a non-step feed pattern used at a time of an ordinary operation to a step feed pattern on the basis of an output from said chip packing detecting section when chip packing is detected during a working.

9. An apparatus for detecting an abnormality of a control system having a drive and mechanism section for executing driving operation and a control section for controlling operation of the drive and mechanism section, wherein said control system is a machine tool having plural axes, and wherein said apparatus is provided with a diagramming means for diagramming an abnormal working region and present characteristic quantities of the plural axes on a graph having plural dimensions, said graph composed of plural axes corresponding to said characteristic quantities of plural axes.

10. An apparatus for detecting an abnormality of a control system having a drive and mechanism section for executing driving operation and a control section for controlling operation of the drive and mechanism section, said apparatus comprising:

a judging section for judging an operation state of said drive and mechanism section from present positions of plural characteristic quantities of plural internal properties of said drive and mechanism section on a transition curve followed by said characteristic quantities from a normal operation state of said drive and mechanism section up to an abnormal operation state thereof on a basis of said plural characteristic quantities, said plural characteristic quantities outputted from said control section, even if the abnormal operation state is not independent from each of the plural characteristic quantities, and a display and manipulation section for displaying an operation state judged by said judging section, and inputting an instruction signal to said judging section or said control system.

11. An apparatus for detecting an abnormality of a control system having a drive and mechanism section for executing driving operation and a first control section for controlling operation of the drive and mechanism section, said apparatus comprising:

a judging section for judging an operation state of said drive and mechanism section from present positions of plural characteristic quantities of plural internal properties of said drive and mechanism section on a transition curve followed by said characteristic quantities from a normal operation state of said drive and mechanism section up to an abnormal operation state thereof on a basis of said plural characteristic quantities outputted from said first control section, even if the abnormal operation state is not independent from each of the plural characteristic quantitities, and a second control section for controlling an operation of said control system so that said plural characteristic quantities shift along said transition route on a basis of an operation state judged by said judging section.

* * * * *